(12) United States Patent
Bowman et al.

(10) Patent No.: US 12,214,819 B2
(45) Date of Patent: Feb. 4, 2025

(54) WAGON WITH ADAPTER FOR INSTALLING CHILD SEAT

(71) Applicant: VEER GEAR, LLC, Milton, GA (US)

(72) Inventors: Andrew Bowman, Milton, GA (US); Brady Schroeder, Milton, GA (US)

(73) Assignee: VEER GEAR LLC, Milton, GA (US)

( * ) Notice: Subject to any disclaimer, the term of this patent is extended or adjusted under 35 U.S.C. 154(b) by 0 days.

(21) Appl. No.: 18/464,734

(22) Filed: Sep. 11, 2023

(65) Prior Publication Data

US 2023/0415804 A1 Dec. 28, 2023

Related U.S. Application Data

(63) Continuation of application No. 17/450,026, filed on Oct. 5, 2021, now Pat. No. 11,787,460, which is a
(Continued)

(51) Int. Cl.
*B62B 3/02* (2006.01)
*B62B 3/00* (2006.01)
(Continued)

(52) U.S. Cl.
CPC .............. *B62B 5/082* (2013.01); *B62B 3/007* (2013.01); *B62B 3/022* (2013.01); *B62B 5/067* (2013.01);
(Continued)

(58) Field of Classification Search
CPC ......... B62B 3/022; B62B 3/007; B62B 5/082; B62B 5/067; B62B 2202/52; B62B 2205/20
See application file for complete search history.

(56) References Cited

U.S. PATENT DOCUMENTS 1,059,504 A 4/1913 Teppert
2,563,995 A 8/1951 East
(Continued)

FOREIGN PATENT DOCUMENTS

CN 1210701 3/1999
CN 101190686 6/2008
(Continued)

OTHER PUBLICATIONS

Chinese Application No. CN202111038770.1, Office Action, Mailed on Jun. 27, 2023, 19 pages.
(Continued)

*Primary Examiner* — Bryan A Evans
(74) *Attorney, Agent, or Firm* — Harness, Dickey & Pierce, P.L.C.

(57) ABSTRACT

A seat adapter removably mounts a child seat to a wagon having two opposing walls and an interposed connecting wall, and includes two latch components that mount to the wagon's opposing walls. In some embodiments, the seat adapter includes a cross-member extending between the latch components so that the cross-member provides structural integrity to the wagon if the connecting wall is displaced from its upright use position. In some embodiments, the seat adapter and the child seat can be mounted to the wagon for use with the connecting wall in its upright use position, and in some embodiments the seat adapter and the child seat can be mounted to the wagon for use whether the connecting wall is in its upright use position or its displaced position, with no mechanical interference between any part of the wagon and any part of the adapter or the child seat mounted to it.

31 Claims, 40 Drawing Sheets

Related U.S. Application Data continuation of application No. 16/795,010, filed on Feb. 19, 2020, now Pat. No. 11,214,291, which is a continuation of application No. 16/132,764, filed on Sep. 17, 2018, now Pat. No. 10,597,058, which is a continuation of application No. 15/284,166, filed on Oct. 3, 2016, now Pat. No. 10,077,062, which is a continuation-in-part of application No. 14/750,344, filed on Jun. 25, 2015, now Pat. No. 9,469,324.

(60) Provisional application No. 62/030,284, filed on Jul. 29, 2014.

(51) Int. Cl.
B62B 5/08 (2006.01)
B62B 5/06 (2006.01)

(52) U.S. Cl.
CPC ....... *B62B 2202/52* (2013.01); *B62B 2205/20* (2013.01)

(56) References Cited

U.S. PATENT DOCUMENTS

| | | | |
|---|---|---|---|
| 2,767,996 A | 10/1956 | Seyforth | |
| 2,879,072 A | 3/1959 | Rear et al. | |
| 4,597,116 A | 7/1986 | Kassai | |
| 4,624,467 A | 11/1986 | Burns | |
| 4,768,806 A | 9/1988 | Tetreault | |
| 4,811,968 A | 3/1989 | Bolden | |
| 4,887,836 A | 12/1989 | Simjian | |
| 5,056,805 A | 10/1991 | Wang | |
| 5,360,222 A | 11/1994 | Bro et al. | |
| 5,538,267 A | 7/1996 | Pasin et al. | |
| 5,772,279 A | 6/1998 | Johnson, Jr. | |
| 5,794,951 A | 8/1998 | Corley et al. | |
| 5,833,251 A | 11/1998 | Peck | |
| 5,887,935 A | 3/1999 | Sack | |
| 5,957,482 A | 9/1999 | Shorter | |
| 6,053,515 A | 4/2000 | Kelley | |
| 6,220,611 B1 | 4/2001 | Shapiro | |
| 6,286,844 B1 | 9/2001 | Cone et al. | |
| 6,641,149 B2 | 11/2003 | Chiappetta et al. | |
| 6,733,026 B1 | 5/2004 | Robberson et al. | |
| 6,845,991 B1 | 1/2005 | Ritucci et al. | |
| 6,902,184 B2 | 6/2005 | Hsu | |
| 6,916,028 B2 | 7/2005 | Shapiro | |
| 6,962,370 B2 | 11/2005 | Simpson | |
| 7,462,009 B2 | 12/2008 | Hartmann et al. | |
| 7,487,977 B2 | 2/2009 | Johnson | |
| 7,523,955 B2 | 4/2009 | Blair | |
| 7,866,686 B2 | 1/2011 | Conaway et al. | |
| 7,992,882 B2 | 8/2011 | Engelman | |
| 8,091,916 B2 | 1/2012 | Shapiro | |
| 8,191,907 B2 * | 6/2012 | Watson | B62B 3/007 280/30 |
| 8,388,015 B2 | 3/2013 | Chen | |
| 8,453,771 B1 | 6/2013 | Hirschfeld | |
| 8,456,771 B2 | 6/2013 | Weber et al. | |
| 8,622,404 B2 | 1/2014 | Chen et al. | |
| 8,827,282 B2 | 9/2014 | Schlegel et al. | |
| 8,851,505 B2 | 10/2014 | Van Gelderen et al. | |
| 8,955,855 B2 | 2/2015 | Herlitz et al. | |
| 8,955,869 B2 | 2/2015 | Zehfuss | |
| 9,108,656 B1 | 8/2015 | Nolan et al. | |
| 9,199,659 B2 | 12/2015 | Chen et al. | |
| 9,327,749 B2 | 5/2016 | Young et al. | |
| 9,333,977 B2 | 5/2016 | Herlitz et al. | |
| 9,365,225 B2 | 6/2016 | Henao | |
| 9,469,324 B2 | 10/2016 | Bowman et al. | |
| 10,077,062 B2 | 9/2018 | Bowman et al. | |
| 10,106,186 B2 | 10/2018 | Choi | |
| 10,507,857 B2 | 12/2019 | Bowman et al. | |
| 10,597,058 B2 | 3/2020 | Bowman et al. | |
| 11,198,460 B2 | 12/2021 | Bowman et al. | |
| 11,214,291 B2 | 1/2022 | Bowman et al. | |
| 11,787,460 B2 | 10/2023 | Bowman et al. | |
| 2002/0121753 A1 | 9/2002 | Suzuki | |
| 2003/0025301 A1 | 2/2003 | Banuelos, III | |
| 2003/0071427 A1 | 4/2003 | Simione | |
| 2003/0075903 A1 | 4/2003 | Hsia | |
| 2005/0012307 A1 | 1/2005 | Shapiro | |
| 2007/0228697 A1 | 10/2007 | Miller et al. | |
| 2007/0284900 A1 | 12/2007 | Sze | |
| 2008/0174155 A1 | 7/2008 | Engelman | |
| 2009/0033066 A1 | 2/2009 | Saville et al. | |
| 2010/0109271 A1 | 5/2010 | Funakura | |
| 2010/0156060 A1 | 6/2010 | Dotsey et al. | |
| 2010/0194065 A1 | 8/2010 | Mountz et al. | |
| 2011/0025005 A1 | 2/2011 | Howell | |
| 2011/0101649 A1 | 5/2011 | Harding | |
| 2011/0115176 A1 | 5/2011 | Giampavolo et al. | |
| 2011/0169235 A1 | 7/2011 | Moster | |
| 2011/0170948 A1 | 7/2011 | Williams et al. | |
| 2011/0175332 A1 | 7/2011 | Jones et al. | |
| 2012/0056452 A1 | 3/2012 | Longenecker et al. | |
| 2012/0119457 A1 | 5/2012 | Williams | |
| 2012/0235372 A1 | 9/2012 | Herlitz et al. | |
| 2012/0261961 A1 | 10/2012 | Heisey et al. | |
| 2014/0319884 A1 | 10/2014 | Doucette et al. | |
| 2014/0353945 A1 | 12/2014 | Young et al. | |
| 2015/0210307 A1 | 7/2015 | Kalinin et al. | |
| 2015/0344057 A1 | 12/2015 | Dehmer | |
| 2016/0023674 A1 | 1/2016 | Nolan et al. | |
| 2016/0031469 A1 | 2/2016 | Bowman et al. | |
| 2017/0021850 A1 | 1/2017 | Bowman et al. | |
| 2017/0326019 A1 | 11/2017 | Bramsiepe et al. | |
| 2020/0255046 A1 | 8/2020 | Bowman et al. | |

FOREIGN PATENT DOCUMENTS

| | | | |
|---|---|---|---|
| CN | 101161603 Y | 12/2008 | |
| CN | 203832526 | 9/2014 | |
| CN | 204236534 U | 4/2015 | |
| CN | 105946947 A | 9/2016 | |
| CN | 109843695 A | 6/2019 | |
| DE | 202006012430 | 10/2006 | |
| EP | 1167157 A1 | 1/2002 | |
| EP | 1479590 | 11/2004 | |
| EP | 2371231 | 10/2011 | |
| ES | 2067409 A2 | 3/1995 | |
| GB | 201116363 | 11/2011 | |
| GB | 2494897 | 3/2013 | |
| GB | 2494897 A * | 3/2013 | ........... B62B 3/1444 |
| KR | 20000038219 A | 7/2000 | |
| KR | 20120096168 A | 8/2012 | |
| KR | 101573235 B1 | 11/2015 | |
| NL | 2007020 C2 | 6/2011 | |
| NL | 2007020 | 1/2013 | |
| WO | 2004002802 | 1/2004 | |
| WO | 2013002642 A1 | 1/2013 | |
| WO | 2015038373 | 3/2015 | |
| WO | 2016018713 | 2/2016 | |
| WO | 2018067450 | 4/2018 | |

OTHER PUBLICATIONS

European Application No. EP17785117.7, Office Action, Mailed on Nov. 24, 2022, 5 pages.
Britax B-Agile Lightweight Stroller, Black | One Hand Fold + Easy to Maneuver + Large UV50+ Canopy: Baby, Amazon.com, 2013, 16 pages.
Bugaboo Car Seat Adapter Donkey, 2013, 4 pages.
Litigation-Civil Coversheet filed Jan. 28, 2020, 2 pages.
Combo Pram Luna Milano Violet-Prams-BambinoWorld, Pram Luna, 2014, 3 pages.
Complaint for Declaratory Judgement of Invalidity, Litigation, Case: 3:20-cv-00030-TMR Doc#: 1, Jan. 27, 2020, 8 pages.
Evenflo Company Inc's Answer to Vear Geer LLC's Counterclaim for Patent Infringement and Counterclaim for Declaratory Judgment of Invalidity, Litigation, Case No. 3:20-cv-00030, May 19, 2020, 11 pages.

(56) References Cited

OTHER PUBLICATIONS

Jeep Wrangler Stroller Wagon with Included Car Seat Adapter by Delta Children—Gray : Target, Bedford Park, 2019, 10 pages.

Joint Claim Construction and Prehearing Statement Pursuant to S.D. Ohio Pat. R. 105.2 (D), Litigation-Joint Claim, Case No. 3:20-cv-00030, Jan. 28, 2021, 34 pages.

Litigation—Defendant Veer Gear LLC's Opening Claim Constructions Brief, Case: 3:20-cv-00030-TMR Doc#, Apr. 13, 2021, 39 pages.

Litigation—Defendant Veer Gear's Reply in Support of Opening Claim Construction Brief, United States District Court for the Southern District of Ohio Western Division, May 27, 2021, 26 pages.

Litigation—Plaintiff/Counterclaim Defendant Evenflo Company, Inc.'s, S.D. Ohio Pat. R. 105.4(a) Opening Claim Construction Brief, Apr. 13, 2021, 22 pages.

Litigation—Memorandum Opinion, Signed by Judge Thomas M. Rose, Aug. 24, 2021, pp. 1-20.

Veer Gear LLC's Answer to Evenflo Company Inc.'s Complaint for Declaratory Judgment of Invalidity and CounterClaim for Patent Infringement, Litigation, Case No. 3:20-cv-00030, Apr. 28, 2020, 280 pages.

Veer Gear LLC's Answer to Evenflo Company Inc.'s Counterclaim for Declaration Judgment of Invalidity of U.S. Pat. No. 10,597,058, Case: 3:20-cv-00030-TMR Doc#: 11, Jun. 8, 2020, 4 pages.

Chinese Application No. CN201780061161.3, Office Action, Mailed on Dec. 31, 2020, 22 pages.

International Application No. PCT/US2014/053780, International Search Report and Written Opinion, Mailed on Feb. 6, 2015, 11 pages.

International Application No. PCT/US2015/041743, International Search Report and Written Opinion, Mailed on Oct. 9, 2015, 9 pages.

International Application No. PCT/US2017/054739, International Search Report and Written Opinion, Mailed on Dec. 15, 2017, 14 pages.

Schroeder, "Standard Consumer Safety Performance Specification for Carriages and Strollers", ASTM, Designation: F833-15, Feb. 13, 2016, 23 pages.

International Application No. PCT/US2014/053780, International Search Report, Mailed on Apr. 4, 2017, 8 pages.

U.S. Appl. No. 14/750,344, Notice of Allowance, Mailed on Jun. 20, 2016, 8 pages.

U.S. Appl. No. 15/284,166, Non-Final Office Action, Mailed on Oct. 2, 2017, 9 pages.

U.S. Appl. No. 15/284,166, Notice of Allowance, Mailed on May 18, 2018, 6 pages.

U.S. Appl. No. 16/132,764, Non-Final Office Action, Mailed on Jan. 28, 2019, 11 pages.

U.S. Appl. No. 16/132,764, Notice of Allowability, Aug. 28, 2019, 5 pages.

U.S. Appl. No. 16/132,764, Notice of Allowance, Mailed on Jun. 26, 2019, 8 pages.

U.S. Appl. No. 16/132,764, Notice of Allowance, Mailed on Nov. 22, 2019, 8 pages.

U.S. Appl. No. 16/795,010, "Corrected Notice of Allowability", Nov. 24, 2021, 5 pages.

U.S. Appl. No. 16/795,010, "Corrected Notice of Allowability", Oct. 27, 2021, 5 pages.

U.S. Appl. No. 16/795,010, Non-Final Office Action, Mailed on Oct. 7, 2020, 7 pages.

U.S. Appl. No. 16/795,010, Notice of Allowance, Mailed on Jul. 14, 2021, 8 pages.

Chinese Application No. CN201780061161.3, Notice of Decision to Grant, Mailed on Jun. 23, 2021, 6 pages.

European Application No. EP17785117.7, Office Action, Mailed on Feb. 8, 2021, 4 pages.

European Application No. EP17785117.7, Office Action, Mailed on Apr. 23, 2020, 5 pages.

International Application No. PCT/US2015/041743, International Preliminary Report on Patentability, Mailed on Jan. 31, 2017, 7 pages.

International Application No. PCT/US2017/054739, International Preliminary Report on Patentability, Mailed on Apr. 18, 2019, 11 pages.

EP Application No. EP17785117.7 , Office Action, Mailed on Dec. 22, 2021, 6 pages.

Veer Gear LLC's Answer to Evenflo Company Inc.'s Complaint for Declaratory Judgment of Invalidity and Supplemental CounterClaims for Patent Infringement, Litigation, Case No. 3:20-cv-00030, Feb. 15, 2022, 32 pages.

Evenflo Company Inc.'s Answer to Veer Gear LLC's Supplemental CounterClaims for Patent Infringement, Litigation, Case No. 3:20-cv-00030, Mar. 7, 2022, 16 pages.

Litigation—Plaintiff Evenflo Company, Inc.'s Amended Invalidity Contentions, Case 3:20-cv-00030, Apr. 4, 2022, 66 pages.

Litigation—Plaintiff Evenflo Company, Inc.'s S.D. Ohio Pat. R. 103.4 Disclosure of Amended Invalidity Contentions, Case No. 3:20-cv-00030, Oct. 7, 2021, 194 pages.

Litigation—Plaintiff Evenflo Company, Inc.'s S.D. Ohio Pat. R. 103.4 Disclosure of Invalidity Contentions, Case No. 3:20-cv-00030, Oct. 26, 2020, 150 pages.

Invalidity Chart for U.S. Pat. No. 10,106,186 titled "Baby Wagon with Improved Ease of Use" to Yejin Choi ("Choi '186"), Apr. 4, 2022, 198 pages.

Invalidity Chart for U.S. Patent Publication No. 2010/0156060 titled "Reversible Stroller Handle" to Michael A. Dotsey, et al. ("Dotsey '6060"), Apr. 4, 2022, 127 pages.

Invalidity Chart for U.S. Pat. No. 6,916,028 titled "Collapsible Compact Carrier Device with Collapsible Wheel Construction" to Richard N. Shapiro ("Shapiro '028"), Apr. 4, 2022, 314 pages.

Invalidity Chart for U.S. Pat. No. 4,116,465 titled "Baby Carriages" to Owen F. Maclaren ("MacLaren '465"), Apr. 4, 2022, 183 pages.

Invalidity Chart for U.S. Patent Publication No. 2017/0326019 titled "Mobile Walking and Transport Aid Device" to Hodger Bramsiepe and Guenter Kurt Rood ("Bramsiepe '6019"), Apr. 4, 2022, 162 pages.

Invalidity Chart for U.S. Pat. No. 9,327,749 titled "Foldable Wagon" to Matthew E. Young, Randall A. Sandlin, Thomas K. Schlegel, and Cameron Eckert ("Young '749"), Apr. 4, 2022, 220 pages.

Invalidity Chart for U.S. Pat. No. 4,746,140 titled "Baby Carriage" to Kenzou Kassai ("Kassai '140"), Apr. 4, 2022, 221 pages.

Invalidity Chart for U.S. Pat. No. 4,834,415 titled "Dual-Seat Foldable Baby Cart" to Bruce Yee ("Yee '415"), Apr. 4, 2022, 164 pages.

Invalidity Chart for U.S. Patent Publication No. 2002/0121753 titled Folder Stroller to Yoshiyuki Suzuki ("Suzuki '1753"), Apr. 4, 2022, 125 pages.

Invalidity Chart for U.S. Pat. No. 5,056,805 titled "Stroller" to Chia-Ho Wang ("Wang '805"), Apr. 4, 2022, 129 pages.

Invalidity Chart with Combination Citations, Apr. 4, 2022, 215 pages.

Invalidity Chart for U.S. Pat. No. 9,108,656 titled "Collapsible Wagon" to Patrick Nolan, Mike Dotsey, Noah Dingler, and Brady Schroeder ("Nolan '656"), Apr. 4, 2022, 199 pages.

Invalidity Chart for U.S. Patent Publication No. 2010/0109271 titled "Stroller" to Funakura ("Funakura '9271"), Apr. 4, 2022, 174 pages.

Invalidity Chart for U.S. Pat. No. 9,365,225 titled "Transformative Hand Cart" to Elvis Henao ("Henao '225"), Apr. 4, 2022, 330 pages.

Invalidity Chart for U.S. Patent Publication No. 2010/0156069 A1 titled "Wagon with Seats" to Zhaosheng Chen ("Chen '6069"), Apr. 4, 2022, 326 pages.

Joint Claim Construction and Pre-Hearing Statement, Litigation, Case No. 3:20-cv-00030, May 27, 2022, 15 pages.

U.S. Appl. No. 62/307,726, Appendix to Joint Claim Construction and Pre-Hearing Statement, Litigation, Case No. 3:20-cv-00030, Jun. 27, 2022, 44 pages.

U.S. Appl. No. 62/305,017, Appendix to Joint Claim Construction and Pre-Hearing Statement, Litigation, Case No. 3:20-cv-00030, Jun. 27, 2022, 39 pages.

(56) References Cited

OTHER PUBLICATIONS

Dictionary Definitions, Appendix to Joint Claim Construction and Pre-Hearing Statement, Litigation, Case No. 3:20-cv-00030, Jun. 27, 2022, 229 pages.
Dictionary Definitions, Corrected Appendix to Joint Claim Construction and Pre-Hearing Statement, Litigation, Case No. 3:20-cv-00030, Jul. 5, 2022, 234 pages.
Brief by Plaintiff Evenflo Company, Inc., Case No. 3:20-cv-00030, Jul. 29, 2022, 25 pages.
Brief by Defendant Veer Gear LLC., with Exhibits 1 and 2, Case No. 3:20-cv-00030, Jul. 29, 2022, 123 pages.
Response Claim Construction Brief re USP '460 by Defendant Veer Gear LLC, Case No. 3:20-cv-00030, Aug. 26, 2022, 27 pages.
Response Claim Construction Brief by Counter Defendants Evenflo Company, Inc., with Exhibit H, Case No. 3:20-cv-00030, Aug. 26, 2022, 70 pages.
Transcript of Proceedings, Claim Construction Hearing., Case No. 3:20-cv-00030, Oct. 6, 2022, 87 pages.
Memorandum and Opinion, Case No. 3:20-cv-00030, Nov. 28, 2022, 19 pages.
Motion for Partial Reconsideration by Defendant, Case No. 3:20-cv-00030, Dec. 6, 2022, 6 pages.
U.S. Appl. No. 17/450,026, Non-Final Office Action mailed Dec. 22, 2022, 7 pages.
U.S. Appl. No. 17/450,026, Notice of Allowance mailed Jun. 12, 2023, 7 pages.
European Application No. EP17785117.7, Office Action, Mailed on Nov. 20, 2023, 4 pages.
European Intention to Grant Corresponding to Application No. 17785117.7, mailed Aug. 14, 2023.
European Extended Search Report Corresponding to Application No. 23203723.4, mailed Feb. 13, 2024.
European Intention to Grant Corresponding to Application No. 17785117.7, mailed Apr. 19, 2024.
European Decision to Grant Corresponding to Application No. 17785117.7, mailed Aug. 29, 2024.
Chinese Notice to Grant Corresponding to Application No. 202111038770.1, mailed Dec. 22, 2023.

\* cited by examiner

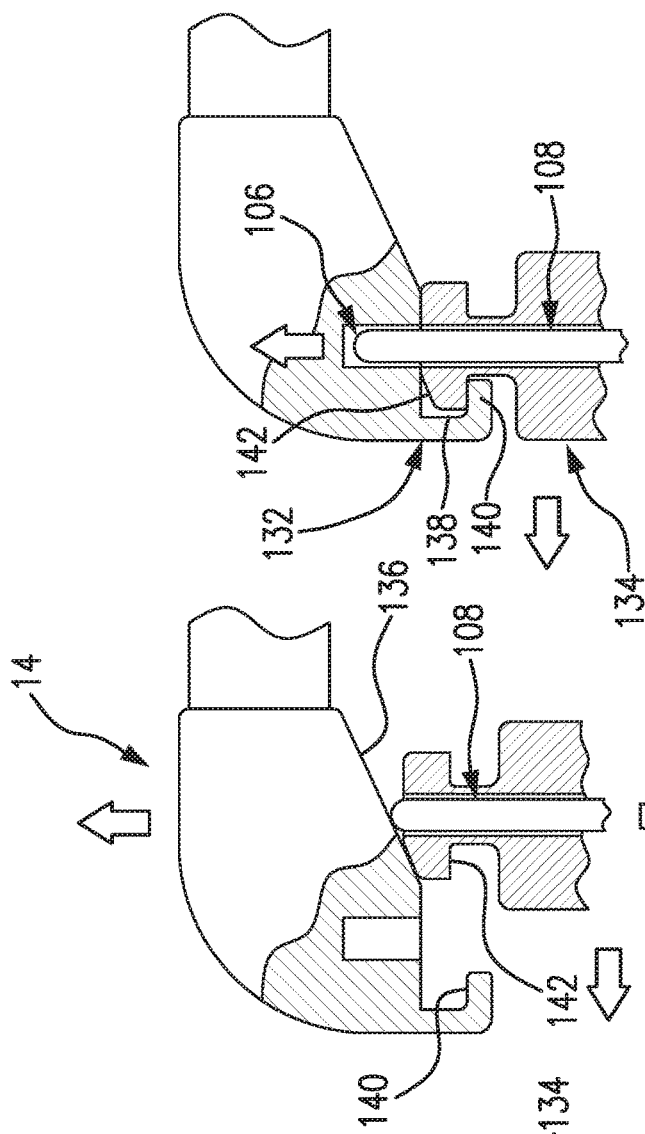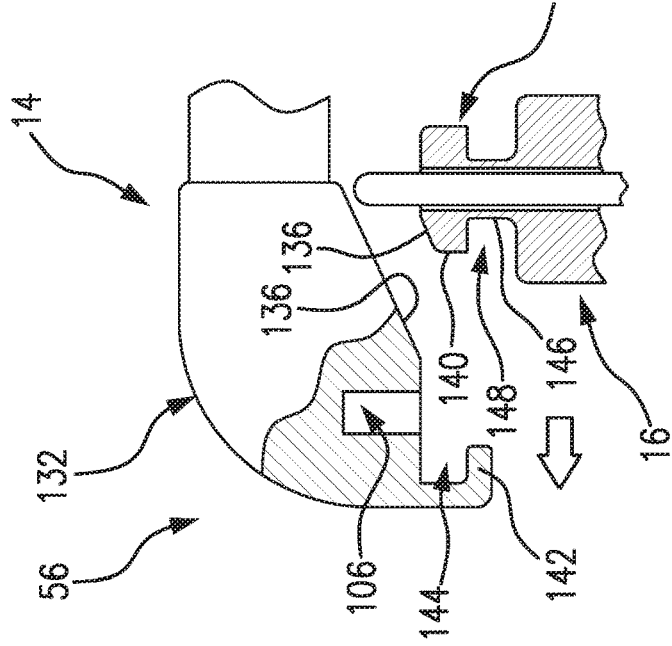

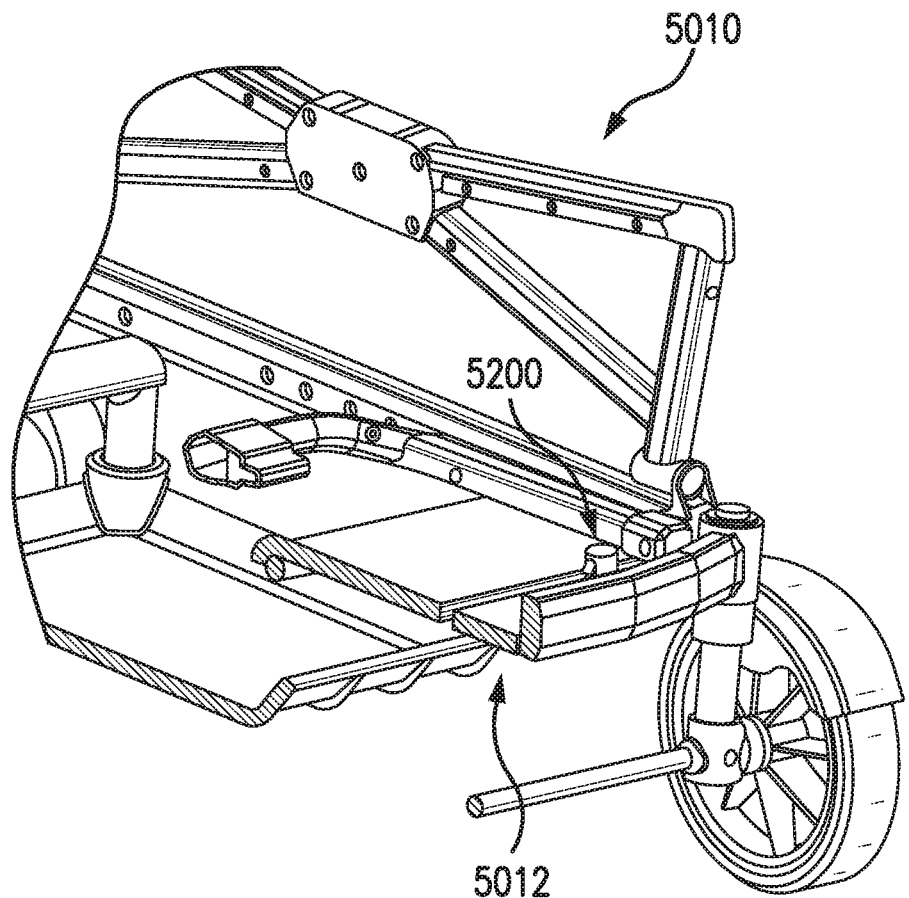
FIG. 39
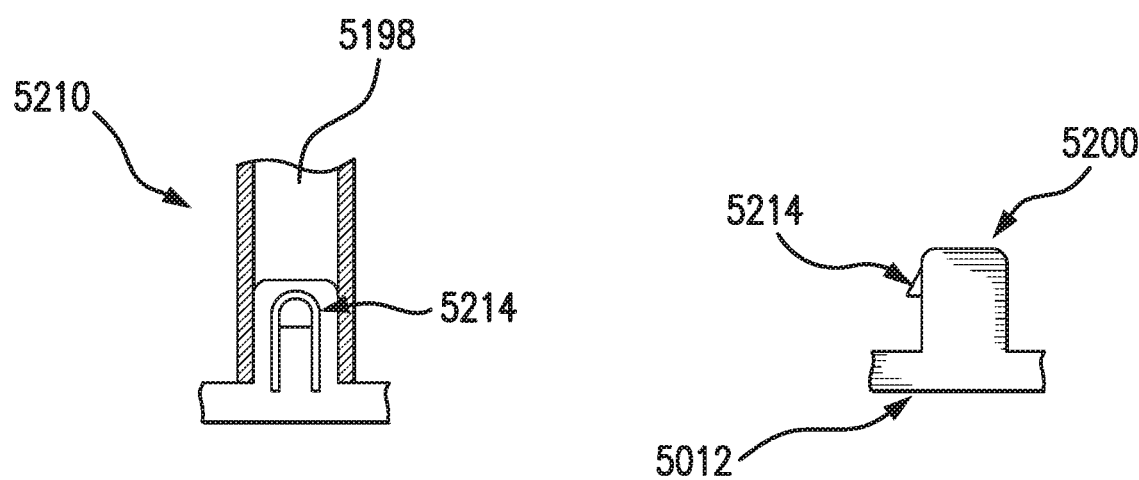
FIG. 40
FIG. 41

WAGON WITH ADAPTER FOR INSTALLING CHILD SEAT

CROSS-REFERENCE TO RELATED APPLICATION

This application is a continuation of U.S. Ser. No. 17/450,026, filed Oct. 5, 2021, which is a continuation of U.S. Non-Provisional patent Ser. No. 16/795,010, filed Feb. 19, 2020, issued as U.S. Pat. No. 11,214,291, issued Jan. 4, 2022, which is a continuation of U.S. Non-Provisional patent Ser. No. 16/132,764, filed Sep. 17, 2018, issued as U.S. Pat. No. 10,597,058, issued Mar. 24, 2020, which is a continuation of U.S. Non-Provisional patent application Ser. No. 15/284,166, filed Oct. 3, 2016, issued as U.S. Pat. No. 10,077,062, issued Sep. 18, 2018, which is a continuation-in-part of U.S. Non-Provisional patent application Ser. No. 14/750,344 filed on Jun. 25, 2015, issued as U.S. Pat. No. 9,469,324, issued Oct. 18, 2016, which claims the priority benefit of U.S. Provisional Patent Application Ser. No. 62/030,284 filed Jul. 29, 2014, which are hereby incorporated herein by reference in their entirety for all purposes.

TECHNICAL FIELD

The present invention relates generally to consumer-use wagons, and particularly to such wagons for multi-purpose use including carrying seated children and carrying other household cargo.

BACKGROUND

Conventional consumer-use wagons are commonly used for holding and carrying cargo such as children, their toys, beach items (e.g., chairs, towels, and sand buckets/shovels), and sports equipment (e.g., balls, bats, and helmets). Such wagons typically include a generally rectangular base and four generally rectangular upright walls forming an open-topped container, with a pull handle pivotally coupled to the base front, and with four wheels rotationally mounted to the base bottom. A traditional and well-known wagon of this type is the classic RADIO FLYER wagon.

While these wagons have their advantages, they also have some drawbacks. For example, for use to carry children they are generally uncomfortable for the carried children. To address this, some wagons are provided with built-in child seats. But these wagons are not as well-suited for smaller (infant or toddler) children or for other uses such as carrying beach items, sports equipment, and/or toys.

Accordingly, it can be seen that needs exist for improved features for consumer-use wagons for multi-purpose use. It is to the provision of solutions to these and other problems that the present invention is primarily directed.

SUMMARY

Generally described, the present invention relates to a wagon that includes a base and a peripheral wall arrangement that together form a container for cargo. The peripheral wall arrangement includes at least one pivot wall that pivots between an unfolded/upright use position and a folded/displaced storage position. A gang-operated latch system is typically provided for releasably securing the pivot wall to the two adjacent walls. The latch system includes a latch component on each respective adjacent wall that, when the pivot wall is folded down out of the way, are operable to releasably engage with a cooperating latch component of a child seat such as a car seat and/or a stroller seat, or of an adapter for the child seat. Such a seat adapter in turn includes latch components for releasably securing the child seat. In this way, the pivot wall can be displaced from its upright use position and in its place can be provided seating for a child.

In other embodiments, a seat adapter for mounting a child seat to a wagon includes two latch components that removably mount to two opposing walls of the wagon's peripheral wall arrangement, which can include a pivotal or fixed connecting wall interposed between the opposing walls. In some such embodiments, the seat adapter includes a cross-member extending between the latch components so that the cross-member provides structural integrity to the wagon if the connecting wall is displaced from its upright use position where it no longer functions as a structural element. And in some such embodiments, the seat adapter and the child seat can be mounted to the wagon for use with the connecting wall in its upright use position, while in other such embodiments the seat adapter and the child seat can be mounted to the wagon for use whether the connecting wall is in its upright use position or its displaced position, in either case with no mechanical interference between any part of the wagon and any part of the adapter or the child seat mounted to it.

In other aspects, the invention relates to a wagon that is adapted for use with such a seat adapter, a seat adapter that is adapted for use with such a wagon, and a child seat that is adapted for use with such a wagon and/or such a seat adapter. And in other aspects, the invention relates to a method of seating a child in a wagon, including displacing a wall of the wagon and installing in its place a child seat mounted to the wagon either directly or indirectly using a seat adapter.

The specific techniques and structures employed to improve over the drawbacks of the prior devices and accomplish the advantages described herein will become apparent from the following detailed description of example embodiments and the appended drawings and claims.

BRIEF DESCRIPTION OF THE DRAWINGS

FIG. 17 is a detail schematic diagram of the latch system of FIG. 14, showing one of the endwalls being pivoted toward one of the sidewalls.

FIG. 18 shows the latch system of FIG. 17 with the pivoting endwall engaging and resiliently deflecting the sidewall.

FIG. 19 shows the latch system of FIG. 18 with the pivoted endwall releasably locked to the deflected the sidewall.

FIG. 39 is a perspective view of a portion of a wagon according to a sixth example embodiment, shown with a portion cut away, and shown with its rear endwall folded down and with a seat adapter mounted in its place.

FIG. 40 is a detail side view, in partial cross section, of a lower portion of a latch system releasably securing the seat adapter to the wagon of FIG. 39.

FIG. 41 is an end view of a wagon portion of the latch-system lower portion of FIG. 40.

DETAILED DESCRIPTION OF EXAMPLE EMBODIMENTS

Figure 1:
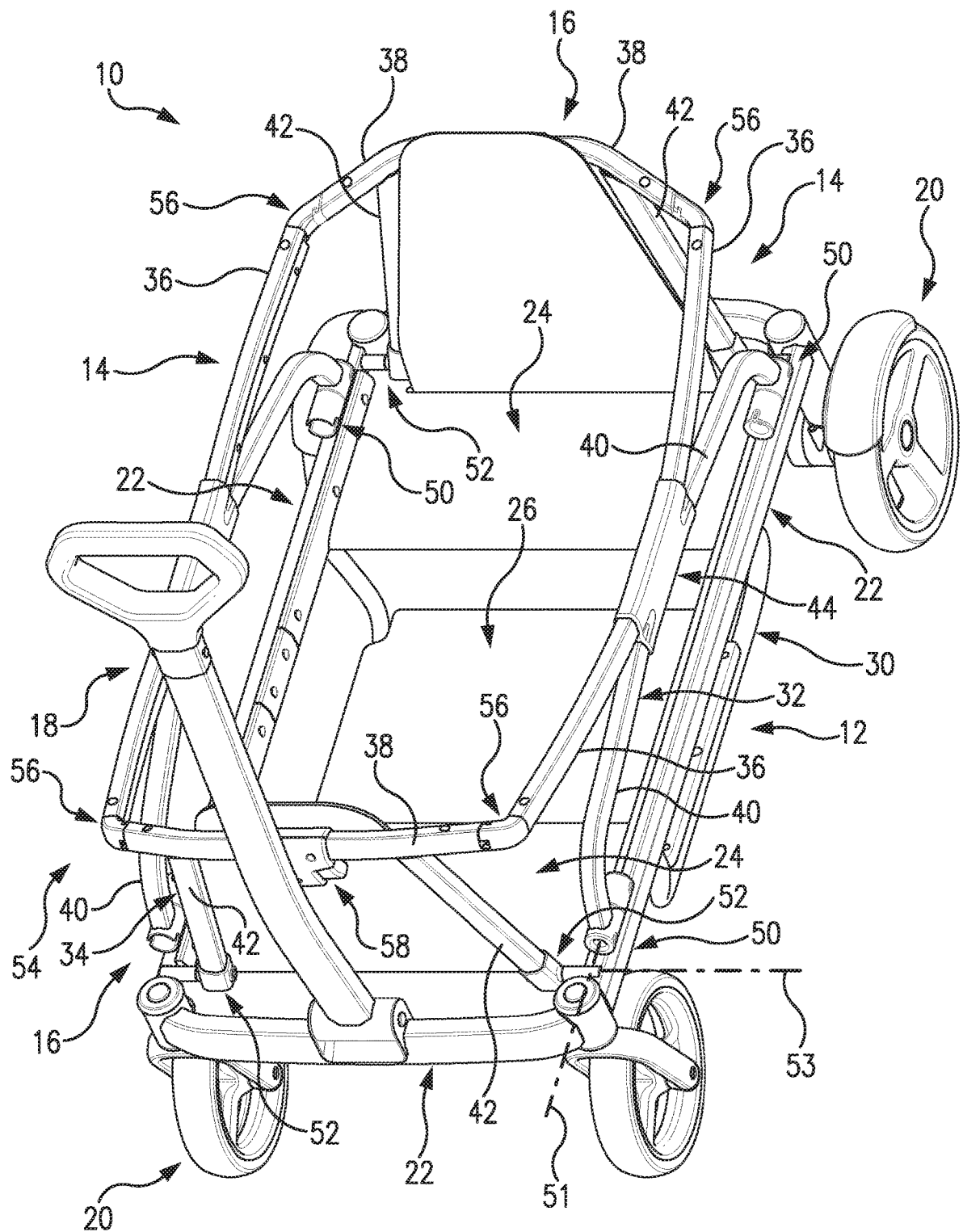
FIG. 1 is a perspective view of a wagon according to a first example embodiment of the present invention, shown with its peripheral sidewalls and endwalls as well as its pull handle in an unfolded position for use.

Generally described, the present invention relates to wagons that are at least partially collapsible by having at least one wall that is repositionable between a folded storage position and an unfolded use position. In typical commercial embodiments, the wagons are consumer-use wagons of the type commonly used for holding and carrying household cargo such as children, toys, beach items (e.g., chairs, towels, and sand buckets/shovels), sports equipment (e.g., balls, bats, and helmets), gardening/yard items (e.g., flowers, sod, trowels, and shovels), and do-it-yourself project items (e.g., for crafts, yard use, and home repairs). In other embodiments, the wagons are other types of wheeled transport containers that a caretaker of a child would consider using to carry the child.

Turning now to the drawings, FIGS. 1-21 show a consumer-use wagon 10 according to a first example embodiment of the present invention. The wagon 10 of this embodiment is detailed herein primarily to disclose an example wagon that can be adapted and used with the child-seating feature described below.

Referring particularly to FIGS. 1-4, the wagon 10 includes a base 12, two opposing upright sidewalls 14, two opposing upright endwalls 16, a pull handle 18, and wheels 20. The sidewalls 14 and the endwalls 16 extend upward (including bowed outward and not necessarily vertical) from the base 12 to cooperatively form an open-topped container for the cargo. The sidewalls 14 are typically longer than the endwalls 16 so that the resulting container is generally rectangular (in plan view). It should be noted that the sidewalls 14 and the endwalls 16 are sometimes referred to collectively herein as the peripheral walls 14/16 for convenience.

In the depicted embodiment, the base 12, the sidewalls 14, and the endwalls 16 are all generally rectangular and made of lightweight and strong plastic and metal, though in other embodiments they are provided in other shapes and/or made of composite or other materials, as is well-known in the art. The pull handle 18 is pivotally coupled to the base 12 at its front end so that it pivots between a folded storage position and an unfolded use position for pulling the wagon 10. And the wheels 20 are rotationally mounted to the base at its bottom surface, for example four wheels can be provided for supporting and rolling the wagon 10 as depicted. These aspects of the basic underlying design of the wagon 10 are conventional and well-known, so further details are not provided for brevity and clarity.

The base 12 of this embodiment includes a peripheral frame 22 that supports front and rear seat-pan panels 24, a footrest panel 26 between the seat-pans, and front and rear seatback panels 28. The seat-pans 24, the footrest 26, and the seatbacks 28 cooperatively form seats for children to sit in when riding in the wagon 10. The base frame 22 can be made of generally rectangular tubular metal (as depicted), solid rectangular bars or cylindrical rods, or other conventional structural members. The footrest 26 can be supported by and suspended from the seat-pans 24 by support members (e.g., similar structural members) 30. In other embodiments, the wagon is provided without the seats, or the seats are removable.

The depicted seatbacks 28 are pivotally mounted to the base 12, for example by conventional hinges to the seat-pans 24 as depicted, so that they pivot between a folded storage position generally flat against the seat-pans for compact storage and an unfolded use position generally upright for supporting a child's back when seated on the respective seat-pan. In some embodiments, the seatbacks 28 are also coupled to the endwalls 16 so that they pivot together, and in such embodiments the pivotal mounting to the base 12 can be eliminated. Details of the pivoting of the endwalls 16 are described below.

In the depicted embodiment, the base 12 has fixed peripheral dimensions, that is, it does not fold or otherwise collapse into a smaller footprint, that is, length and/or width (in plan views), or into a shorter height (in elevation views). In particular, the base frame 22 typically is rigid for structural strength (it has fixed dimensions of length and width as well as height) and does not include any hinges, pivots, swivels, or other joints that permit it to fold or otherwise collapse into a smaller arrangement. In other embodiments, the base frame includes such joints to permit folding into a compact arrangement for storage.

In addition, the sidewalls 14 and the endwalls 16 of the depicted embodiment each include a respective support frame 32 and 34. The sidewall frames 32 each include one or more (e.g., the depicted two) upper frame members 36 and the endwall frames 34 each include one or more (e.g., the depicted one) upper frame member 38, with these upper frame members cooperating to define a peripheral frame extending continuously about the wagon 10. And the sidewall frames 32 each include one or more (e.g., the depicted two) connecting frame members 40 and the endwall frames 34 each include one or more (e.g., the depicted two) connecting frame members 42, with these connecting frame members extending between the base frame 22 and their respective upper frame members 36 and 38. As such, the connecting frame members 40 and 42 extend generally upright, though not necessarily vertical, as can be seen by the steeply-sloped sidewall connecting frame members and the gently-sloped endwall connecting frame members of the depicted embodiment. The sidewall and endwall support frames 32 and 34 can be made of generally rectangular tubular metal (as depicted), solid rectangular bars or cylindrical rods, or other conventional structural members.

The sidewall connecting frame members 42 can be connected to the respective sidewall upper frame members 36 by a frame connector 44. In the depicted embodiment, with each sidewall frame 32 including two upper frame members 36 and two connecting frame members 42, the frame members are positioned in a generally X-shaped arrangement. And the frame connector 44 includes four connections arranged so that a front one of the sidewall upper frame members 36 is generally aligned with a rear one of the sidewall connecting frame members 42, and a rear one of the sidewall upper frame members is generally aligned with a front one of the sidewall connecting frame members.

In other embodiments, a single continuous sidewall upper frame member is provided and a single continuous sidewall connecting frame member is provided, with bends for example in their middle portions, and with the frame connector connecting the two frame members together in the same generally X-shaped and aligned arrangement. And in still other embodiments, the sidewall and/or endwall frames are provided in other forms, for example each can be provided by a single frame member that extends along and defines the wagon top and that bends downward at the corners, thereby forming an inverted and wide U. It will be understood that other configurations of sidewall and/or endwall frames (e.g., O-frames, H-frames, W-frames, M-frames, T-frames, V-frames, and the like) can be selected by persons of ordinary skill in the art to provide the functionality described herein, and such other configurations are contemplated by and within the scope of the invention.

Furthermore, the sidewalls 14 and the endwalls 16 of the depicted embodiment each include a respective cover 46 and 48 (see FIG. 13) mounted to and supported by their respective support frames 32 and 34. The covers 46 and 48 are typically not mounted to each other (or to other of the frame members) to permit them to pivot with their respective frame members, as described below. The covers 46 and 48 are typically provided by sheets of a flexible material such as woven or non-woven plastic, cotton, or a blend thereof. In other embodiments, the peripheral sidewalls and/or the endwalls include the frames but not the covers, they include rigid wall panels without structural frame members, or they are provided by other conventional peripheral structural wall elements. It will be understood that the term "wall" as used herein is intended to be broadly construed to include the depicted frames 32 and 34, as well as other similar structures, with or without covers, and not just solid one-piece panels. In addition, in some embodiments the base 12 includes footrest side covers 47 for the areas under the base frame and above the footrest (see FIG. 13).

Referring additionally to FIGS. 5-12, the wagon 10 includes features that permit the peripheral walls 14/16 to be pivotally repositioned between their unfolded use positions (FIGS. 1-4) and their folded storage positions (FIGS. 5-7 and 12). In particular, the wagon 10 includes pivotal couplings 50 and 52 that pivotally mount the peripheral sidewalls 14 and endwalls 16, respectively, to the base 12, and a gang-operated latch system 54 including latches 56 and actuators 58 for releasably locking the peripheral walls in the use position. For example, the pivotal couplings 50 and 52 can be mounted to the frame 22 of the base 12, as depicted, or to another part of the base such as the seat-pans 24. The pivotal couplings 50 and 52 and the latch system 54 can be provided by conventional components known in the art (e.g., pivot-pin couplings and snap-fit latches), or they can be provided by innovative components described below.

Figure 8:
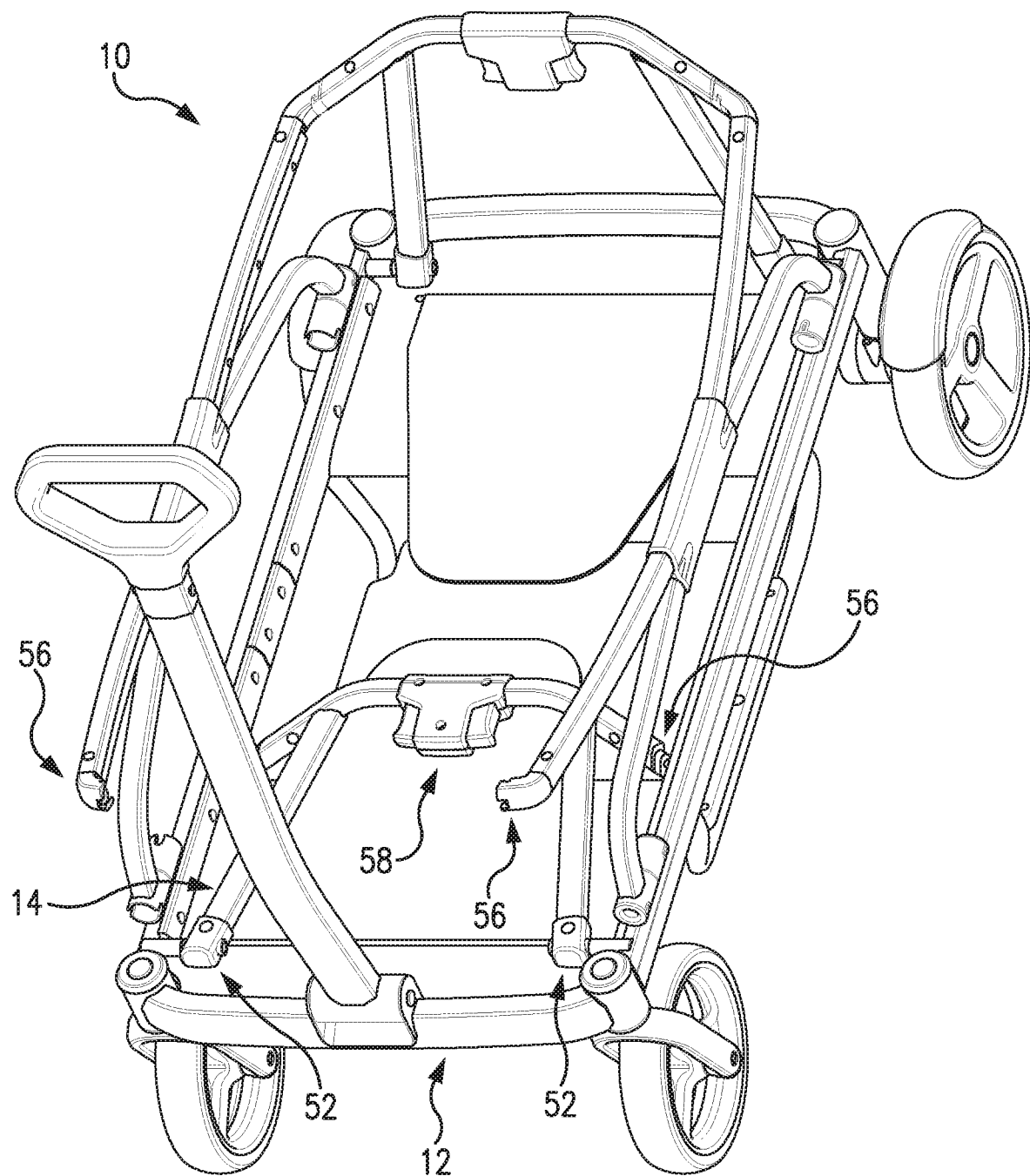
FIG. 8 shows the wagon of FIG. 1 with its front endwall folded down during a step of a collapsing method.
Figure 9:
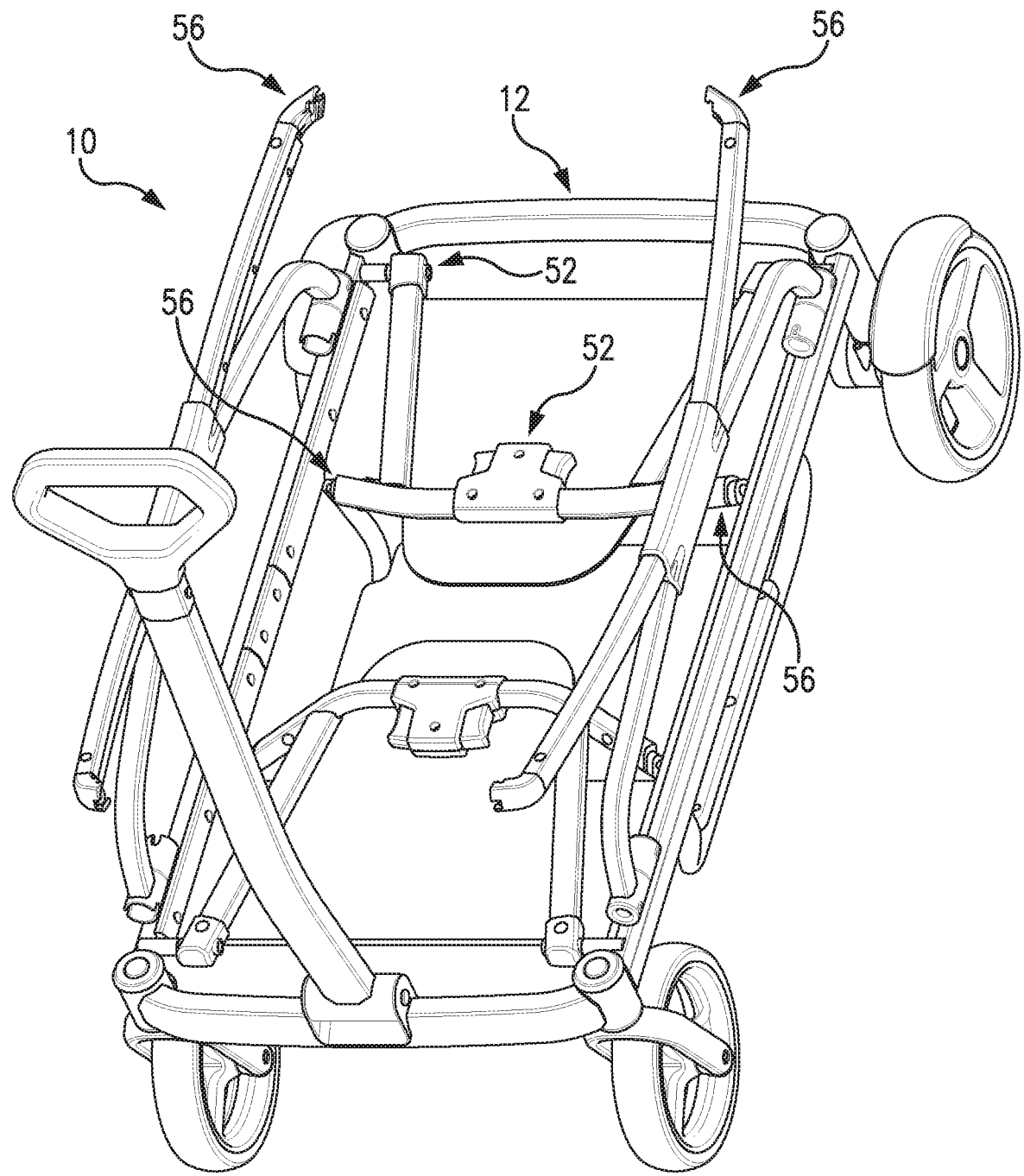
FIG. 9 shows the wagon of FIG. 8 with its rear endwall folded down during a further step of the collapsing method.

The general operation of the pivotal couplings 50 and 52 and the latch system 54 to reposition the wagon 10 between the unfolded use position and the folded storage position is shown in FIGS. 8-12. With the wagon 10 in the use position of FIG. 1, one of the latch actuators 58 (e.g., the depicted front one) is operated to actuate the respective latches 56 from their locked positions to their unlocked positions in which the respective endwall 16 is released from securement in its use position. Then that endwall 16 is pivoted, about its pivotal coupling 52, downward and inward to its storage position adjacent (against or almost against) the base 12, as shown in FIG. 8. Then the other latch actuator 58 (e.g., the depicted rear one) is operated to actuate its latches 56 from their locked positions to their unlocked positions, and that endwall 16 is then pivoted, about its pivotal coupling 52, downward and inward to its storage position adjacent the base 12, as shown in FIG. 9. Of course, both latch actuators 58 can be operated at the same time and/or both endwalls 16 can be pivoted at the same time, if desired. And of course the sequence can be performed in the opposite order, first releasing the rear endwall then the front one, if desired. In other embodiments, each latch includes a dedicated actuator or all latches are operated by a single actuator.

Figure 10:
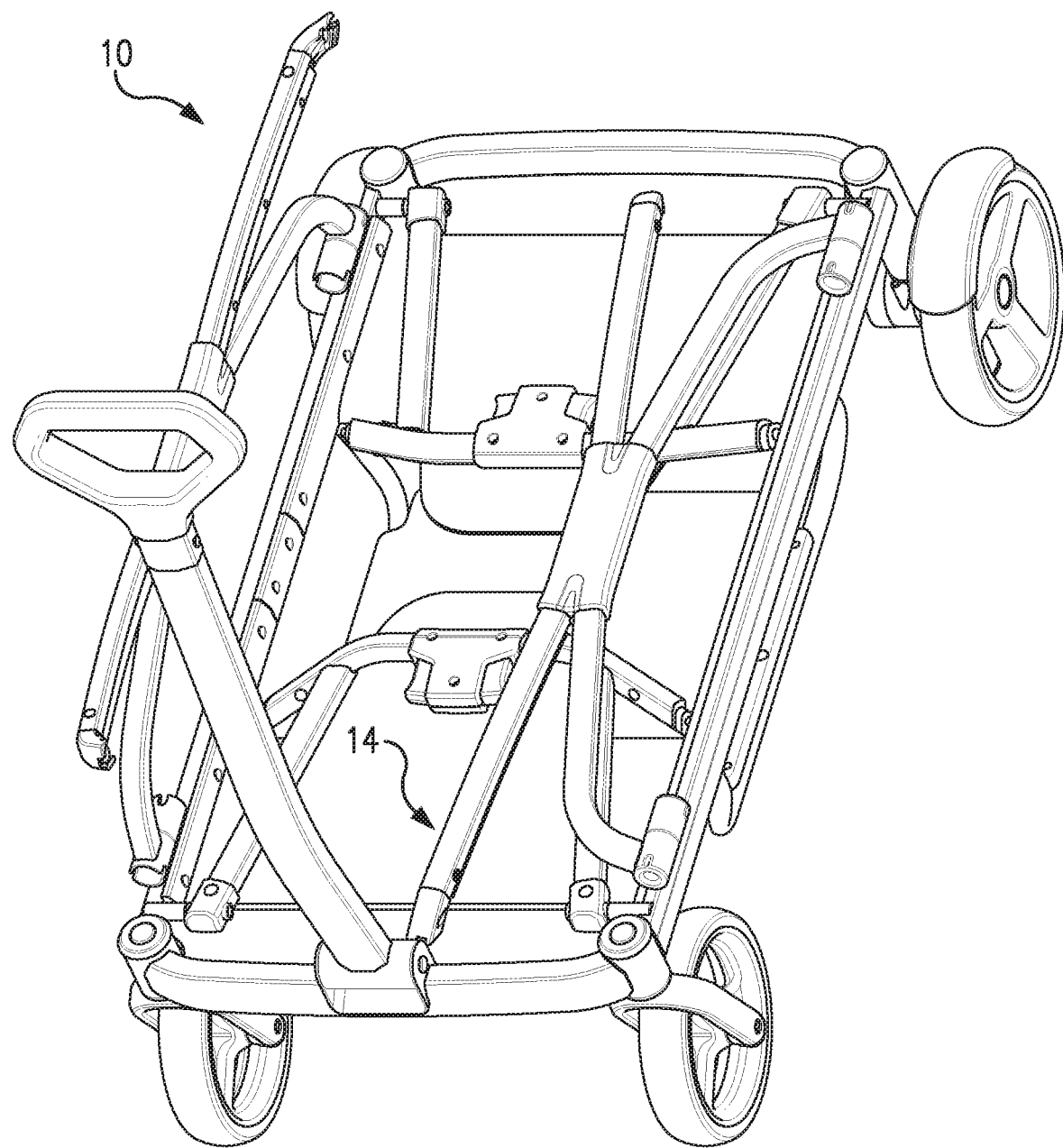
FIG. 10 shows the wagon of FIG. 9 with its right sidewall folded down during a further step of the collapsing method.
Figure 11:
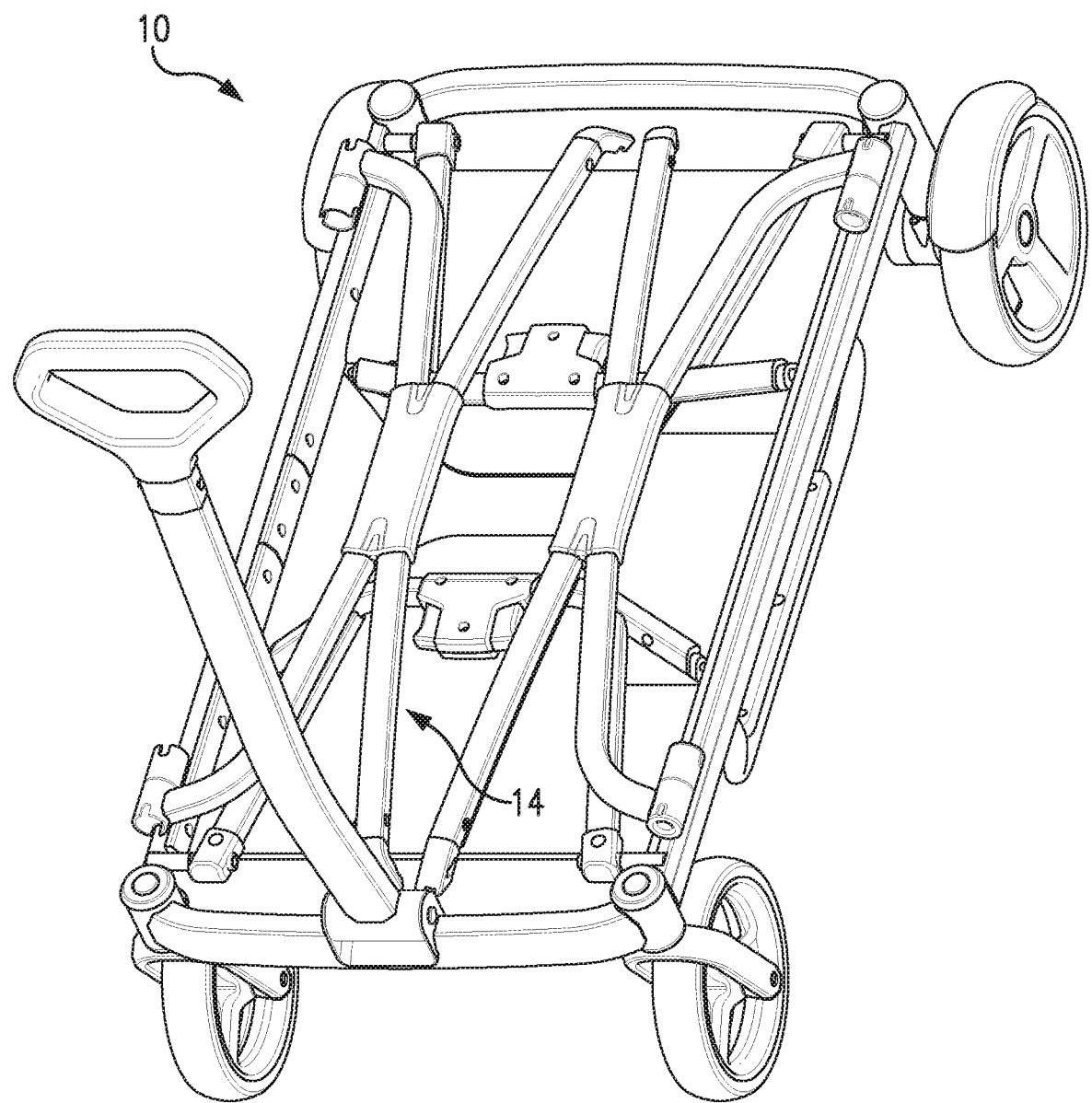
FIG. 11 shows the wagon of FIG. 10 with its left sidewall folded down during a further step of the collapsing method.

Next, one of the released sidewalls 14 is pivoted, about its pivotal coupling downward and inward to its storage position adjacent the base 12, as shown in FIG. 10. Then the other released sidewalls 14 is pivoted, about its pivotal coupling 50, downward and inward to its storage position adjacent the base 12, as shown in FIG. 11. In the depicted embodiment, the latches 56 releasably secure the sidewalls 14 and the endwalls together in the use position, so operating the latch actuators 58 releases the sidewalls to pivot and not just the endwalls. In other embodiments, the latches secure the sidewalls and the endwalls to the base, so separate actuators are operated to release the sidewalls. And in yet other embodiments, the actuators are mounted on the sidewalls instead of the endwalls, for example at the front or rear ends thereof for ease of joint operation.

Figure 12:
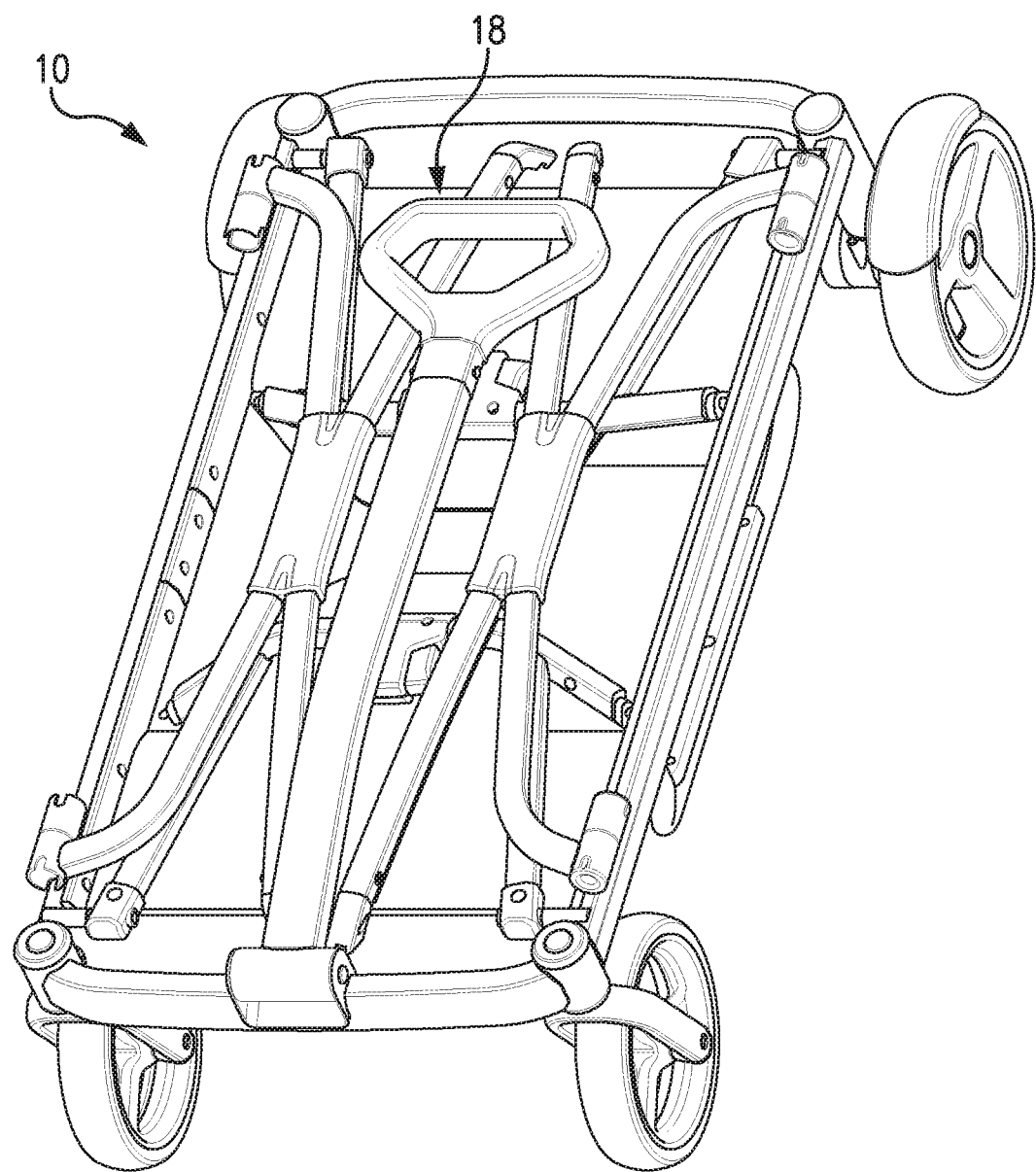
FIG. 12 shows the wagon of FIG. 10 with its pull handle folded down to complete the collapsing method.
Figure 13:
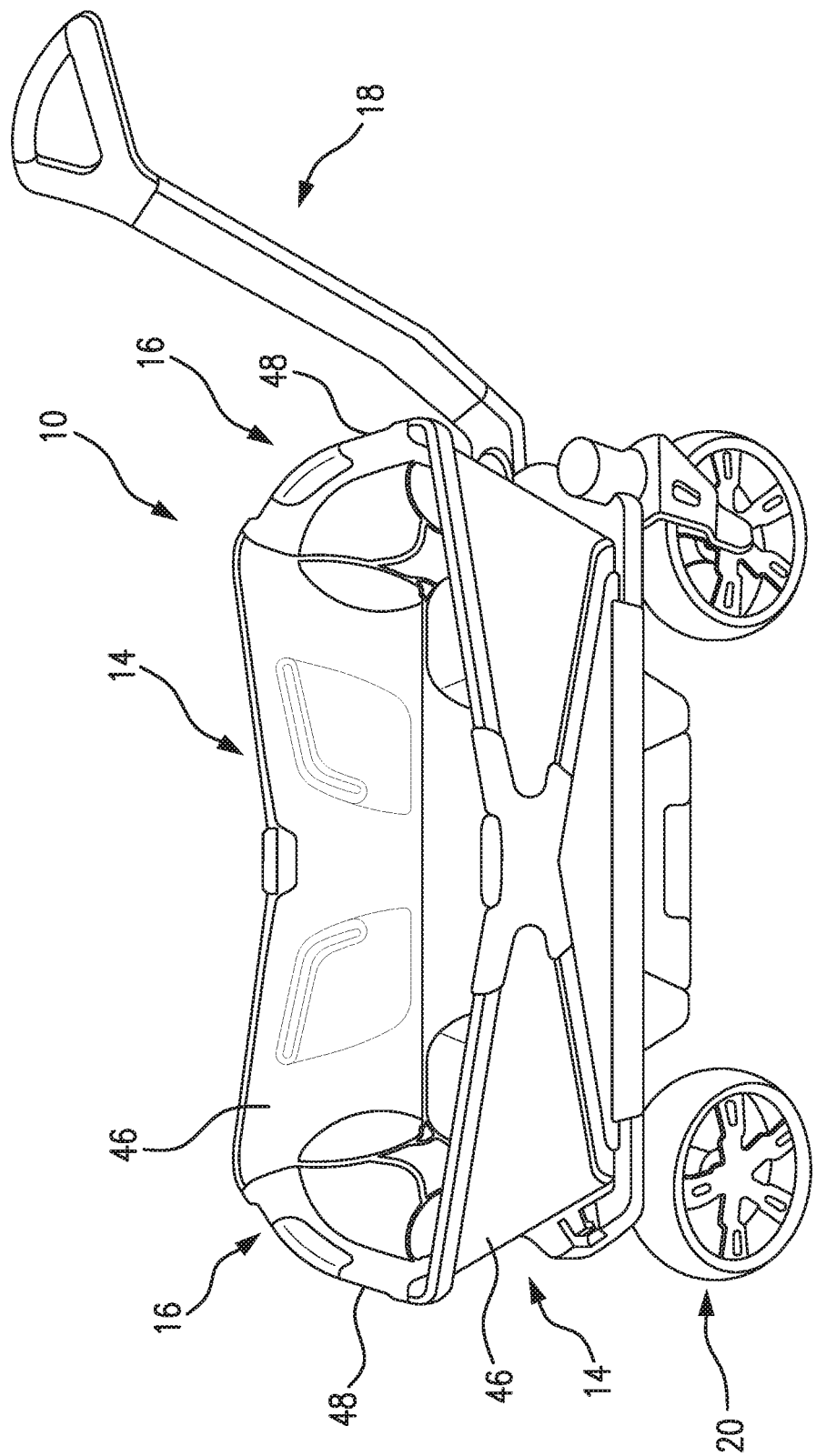
FIG. 13 is a perspective view of the wagon of FIG. 1, showing covers of its peripheral walls and including minor design variations.

Finally, the handle 18 is pivoted down to its storage position, as shown in of FIG. 12. The wagon 10 is now in a much more compact arrangement for storage and transport, with its height (excluding the handle) reduced by about half in the embodiment shown. In some embodiments, a handle-storage latch is provided to releasably secure the handle in its storage position, thereby also retaining the endwalls 16 and the sidewalls 14 (underneath the retained handled) in their storage positions. And in some embodiments, the wheels 20 and/or the footrest 26 are removable or foldable relative to the base 12 for further compactness, though details of such features are not provided herein for brevity.

Figure 2:
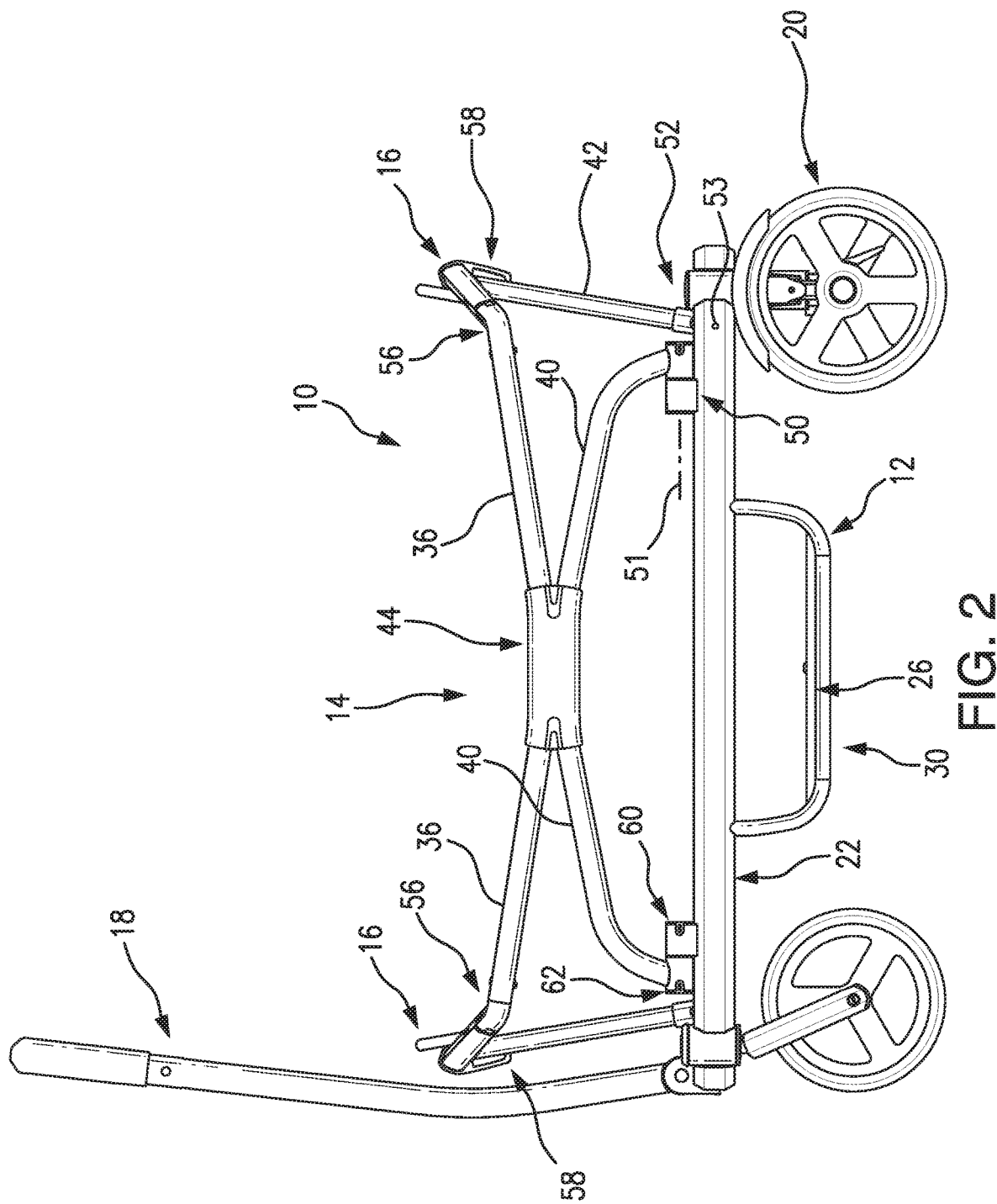
FIG. 2 is a side view of the wagon of FIG. 1.
Figure 3:
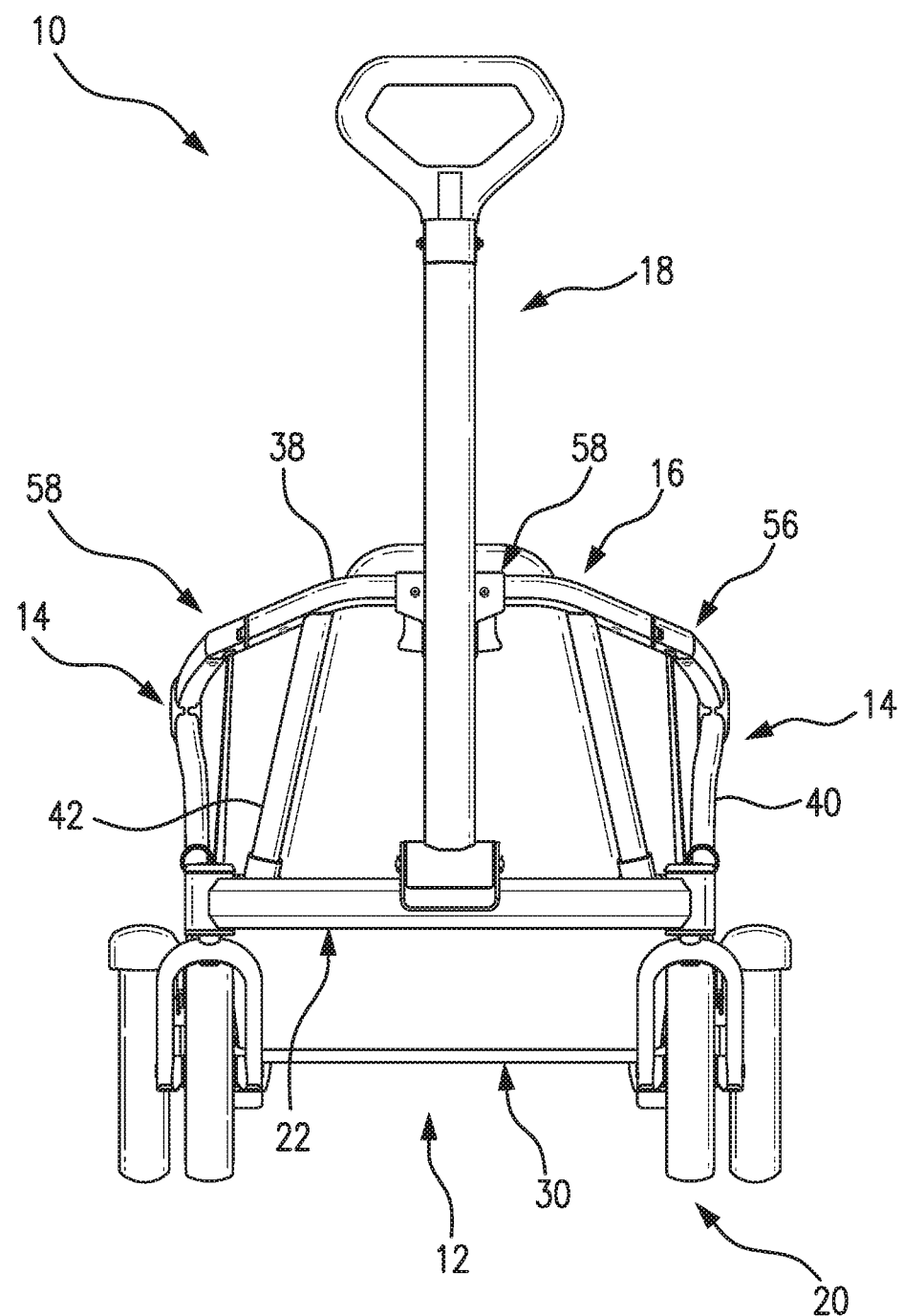
FIG. 3 is a front view of the wagon of FIG. 2.
Figure 4:
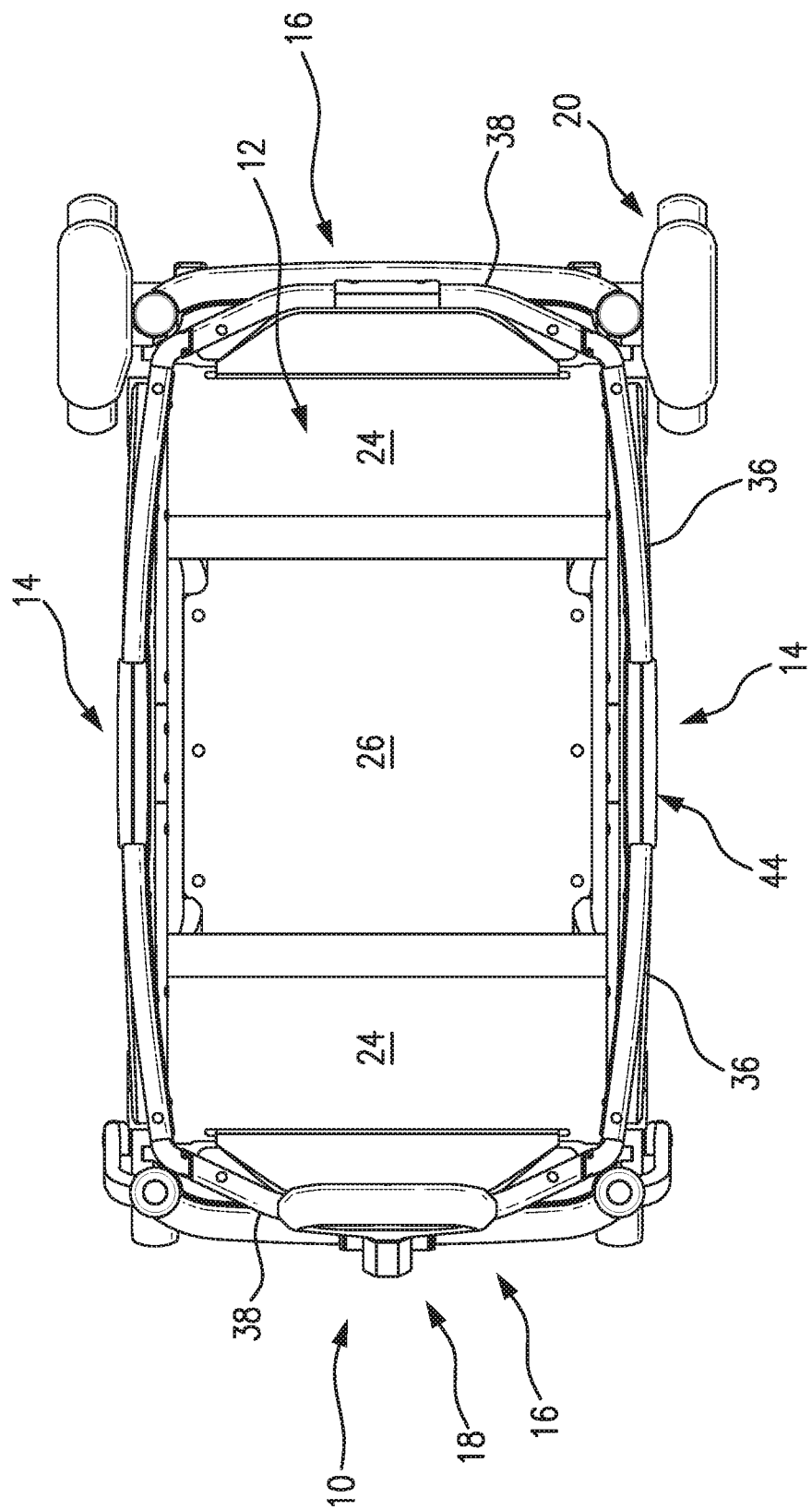
FIG. 4 is a top view of the wagon of FIG. 2.
Figure 5:
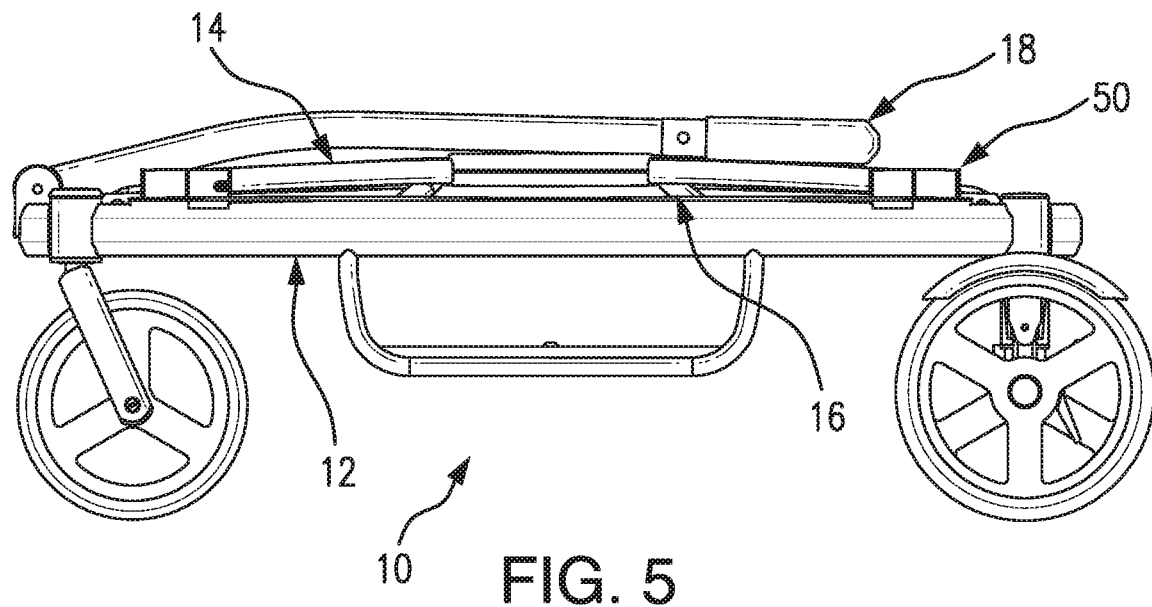
FIG. 5 shows the wagon of FIG. 2 with its peripheral sidewalls and endwalls as well as its pull handle in a folded position for storage and transport.
Figure 6:
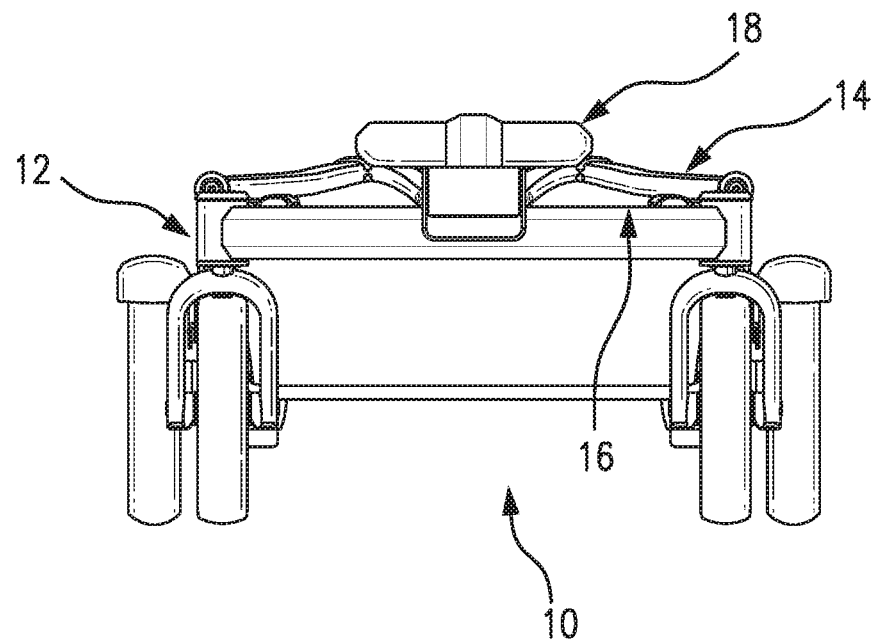
FIG. 6 is a front view of the wagon of FIG. 5.
Figure 7:
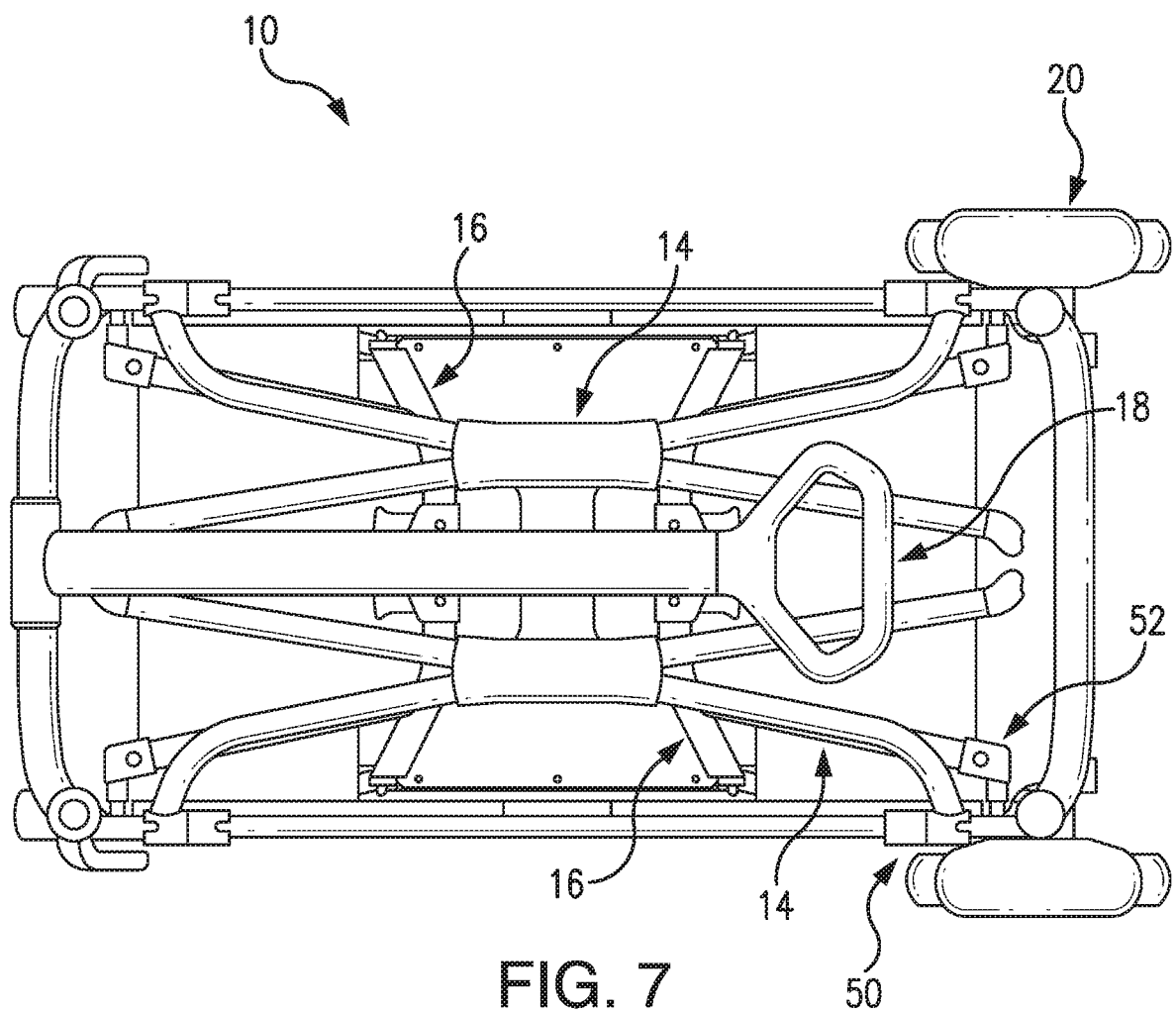
FIG. 7 is a top view of the wagon of FIG. 5.

It should be noted that in the depicted embodiment the endwall pivotal couplings 152 have pivot axes 153 positioned lower than (e.g., subjacent) pivot axes 151 of the sidewall pivotal couplings 150 (see FIGS. 1-2). This enables the endwalls 16 to be folded down generally flat and the sidewalls 14 to then be folded down on top of them and still be arranged generally flat for a compact configuration in the storage position (see FIGS. 5-6). In other embodiments, this is reversed, with the sidewall pivots lower than the endwall pivots so the endwalls can fold generally flat over the sidewalls.

The pivotal couplings 50 and 52 can be of a conventional type or a new type. For example the pivotal couplings 50 can be the "pinchless" type disclosed in U.S. patent application Ser. No. 14/444,380, filed Jul. 28, 2014, which is hereby incorporated herein by reference. Typically, two of the pivotal couplings 50 or 52 are provided for each corresponding sidewall 14 and endwall 16, though more or fewer can be used as may be desired.

The pivotal couplings 50 each include an anchor 60 and a pivot 62 that pivots relative to the anchor (see, e.g., FIG. 2). The anchor 60 is fixedly mounted to the base 12, for example it can be mounted to the base frame member 22 by a bracket, or it can be mounted by a weld, a strap, bolts, pins, or another conventional mounting or fastener. The pivot 62 is fixedly mounted to the respective sidewall 14, for example it can be mounted to the sidewall connecting frame member 40 by a weld, or it can be mounted by a strap, a bracket, bolts, pins, or another conventional mounting or fastener.

Referring additionally to FIGS. 14-21, details of the latch system 54 of the depicted embodiment will now be provided. The latch system 54 is innovative in that it provides for quickly and easily releasing the peripheral walls 14/16 for folding to the storage position and it provides for robustness and minimized loose play when the peripheral walls are secured in the use position. In some embodiments, the basic latch design is used without also including the minimized-play design. And in other embodiments, the minimized-play design is included with a different latch design.

In the depicted embodiment, the wagon 10 includes two latch systems 54, each including two latches 56 controlled by one actuator 58, and each releasably securing the ends of its respective endwall 16 to the corresponding ends of the two sidewalls 14 in the use position. The latches 56 are typically located at upper portions 104 and 106 of the sidewalls 14 and endwalls 16, respectively, for example at the upper frame members 36 and 38, to provide strength to the peripheral walls when secured together in the use position. As such, the latches 56 are generally located at the four upper corners of the wagon 10 in the unfolded use position, in which each of the endwalls 16 is adjacent to the two sidewalls 14 with the respective endwall upper portions 106 adjacent the sidewall upper portions 104. Because the latches 56 couple the sidewalls 14 to the adjacent endwalls 16, they each include two parts, one latch component on the sidewall and the other cooperating latch component on the adjacent endwall.

Figure 14:
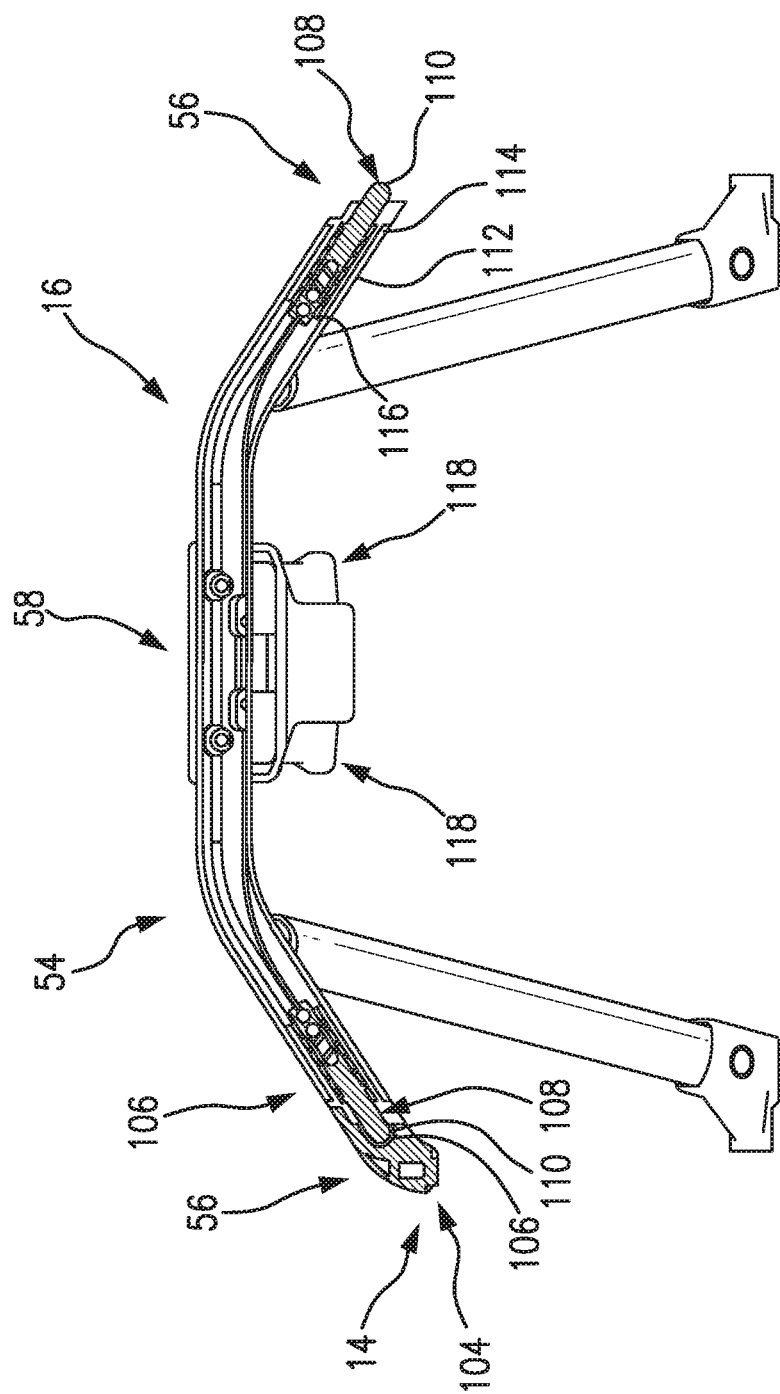
FIG. 14 is a cross-sectional view of a latch system for releasably securing the peripheral walls of the collapsible wagon of FIG. 1 in the use position, showing the latch system in a locked position.
Figure 15:
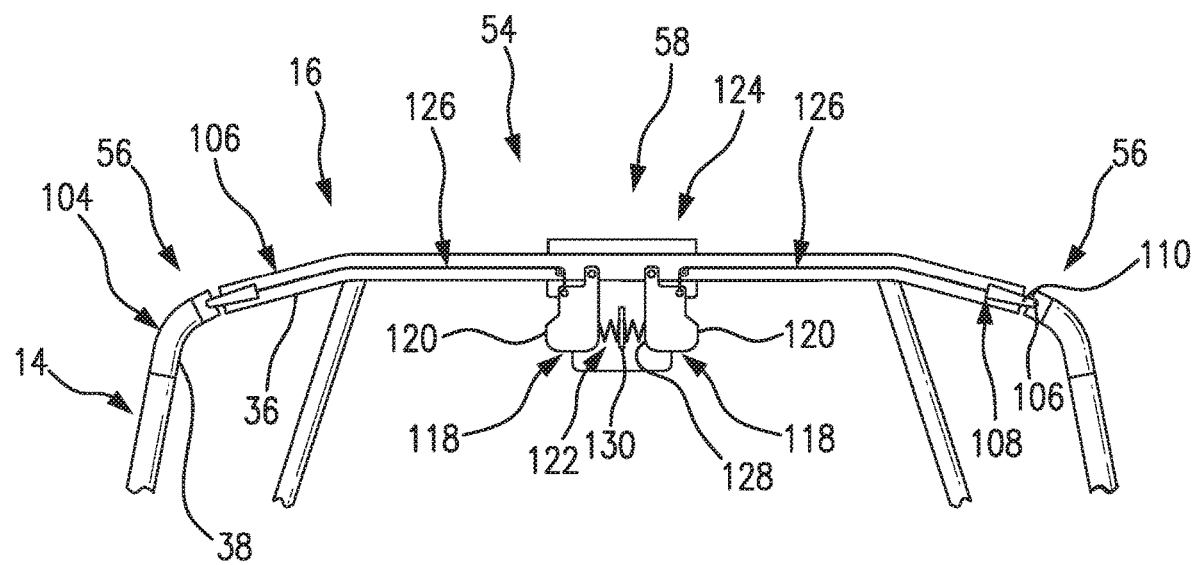
FIG. 15 is a schematic diagram of the latch system of FIG. 14, shown in the locked position securing the peripheral walls in the use position.
Figure 16:
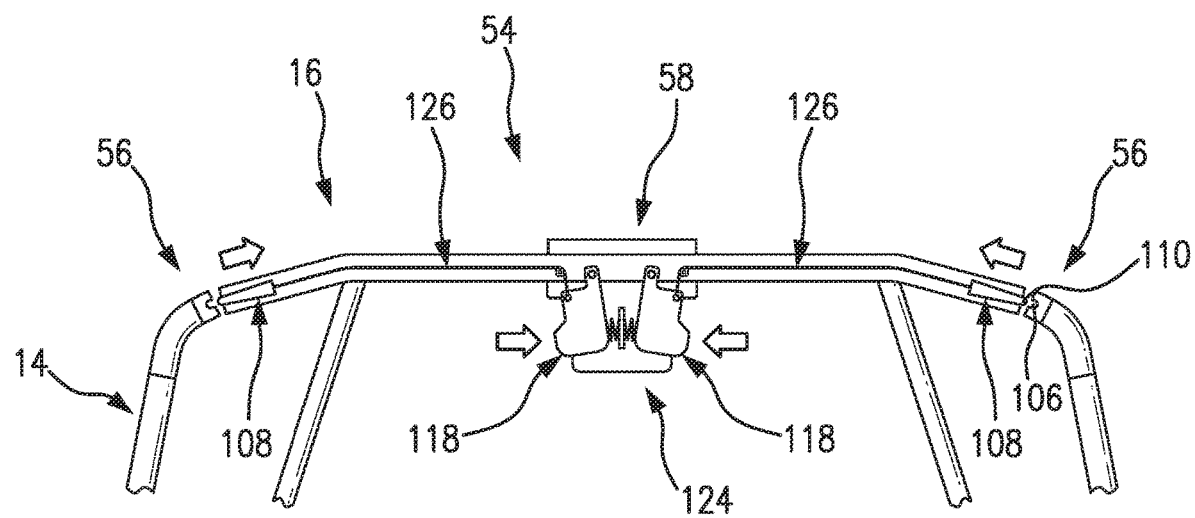
FIG. 16 shows the latch system of FIG. 14 in the unlocked position releasing the peripheral walls for pivoting to the stored position.
Figure 20:
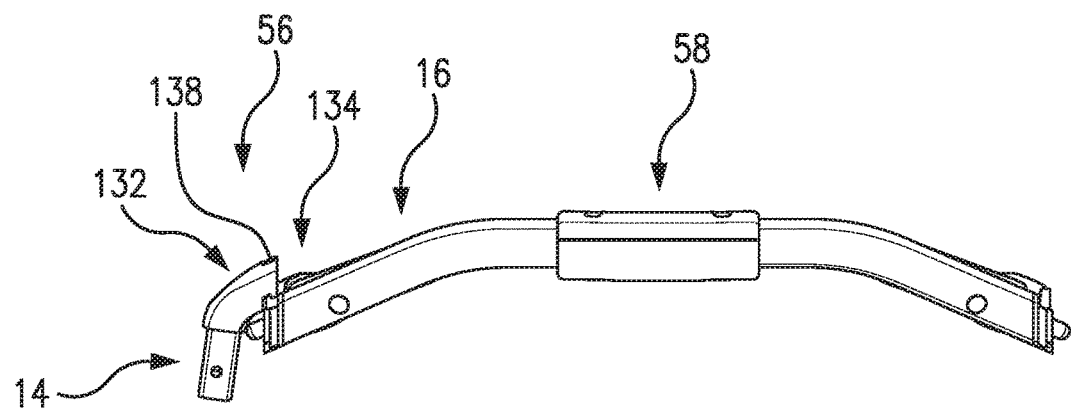
FIG. 20 is a top view of a front portion of the wagon showing the latch system and the endwall in the pivoting position of FIG. 18.
Figure 21:
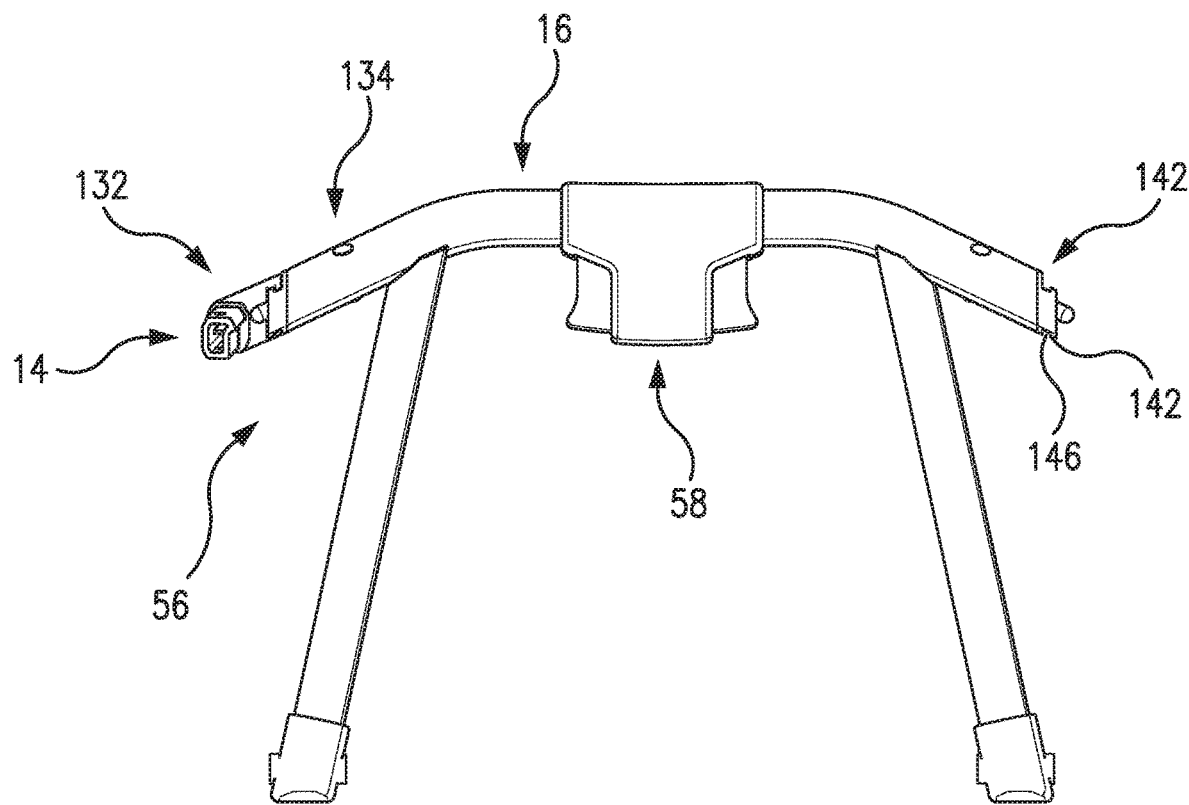
FIG. 21 is an end view of the latch system and the endwall of FIG. 20.

As shown in FIGS. 14-16, the latches 56 each include a receiver latch component 106 formed on one of the sidewalls 14 and a plunger latch component 108 movably mounted to a corresponding one of the endwalls 16. For example, the receivers 106 can be located at opposite ends of each of the endwall upper frame members 38, and the plungers 108 can be located at opposite ends of each of the sidewall upper frame members 36. The plungers 108 move between a locked position (see FIGS. 14-15) and an unlocked position (see FIG. 16). In the locked position, with the peripheral walls 14/16 in their unfolded use position, the tips 110 of the plungers 108 are extended from their endwalls 16 and received in their respective receivers 106 in a blocking-type retention fit. And in the unlocked position, the plunger tips 110 are retracted relative to their endwall 16 and thereby retracted from their respective receivers 106 to release the peripheral walls 14/16 to fold to their storage position. The endwalls 16 typically include an internal bore (e.g., when provided by tubular frame members) within which the plungers 16 are retracted to the unlocked position.

The plungers 108 are biased toward the locked position by springs 112. For example, the plunger springs 112 can each be provided by a compression coil spring retained between a bearing surface 114 of the plunger 108 and a bearing surface 116 of the endwall 16. In other embodiments, other types of spring elements can be used, such as torsion, tension, or leaf springs, or other resiliently deformable elements.

In the depicted embodiment, the plunger latch components 108 are in the form of linearly reciprocating fingers and the receiver latch components 106 are in the form of recesses that receive the tips of the fingers. In other embodiments, the plunger latch components are in the form of pivoting hooks and the receiver latch components are in the form of transverse pins about which the hooks can pivotally lock. And in still other embodiments, the two cooperating latch components are of other conventional latch designs known and understood by persons of ordinary skill in the art to provide the releasable securement functionality described herein.

The actuators 58 are operable to retract the respective plungers 108 to their unlocked positions. The actuators 58 typically include one or more (e.g., the depicted two) bodies 118 each having a contact surface 120 where the user contacts and applies a force to move the actuator body from a locked position (see FIGS. 14-15) to an unlocked position (see FIG. 16), one or more (e.g., the depicted two) springs 122 that bias the actuator bodies to the locked position, and a housing 124 for the actuator bodies. A connection 126 interconnects the actuator body 118 to the plunger 108, so that applying an operating force to the actuator body to move it from the locked position to the unlocked position causes the plunger 108 to move from its locked position to its unlocked position.

In the depicted embodiment, the actuator bodies 118 are pivotally mounted, for example to the actuator housing 124 (or to the endwall 14), so that they pivot between the locked and unlocked positions. In other embodiments, the actuator bodies slide, rotate, or otherwise move between the locked and unlocked positions. In the depicted embodiment, the connection 126 between the actuator body 118 and the plunger 108 is a cable, for example a wire, cord, string, or other flexible elongated element. In other embodiments, the connection is in the form of a rigid rod, a mechanical linkage, or a gear-set. In the depicted embodiment, pivoting the actuator body 118 from the locked to the unlocked position generates a pulling force on the connection 126. In other embodiments, moving the actuator body from the locked to the unlocked position generates a pushing, rotary, or other force on the connection. In the depicted embodiment, the actuator springs 122 are each provided by a compression coil spring retained between a bearing surface 128 of the actuator body 118 and a bearing surface 130 of the actuator housing 124. In other embodiments, other types of spring elements can be used, such as torsion, tension, or leaf springs, or other resiliently deformable elements. In the depicted embodiment, the actuator 58 includes two actuator bodies 118 and two actuator springs 122, one set for each respective one of the plungers 108. In other embodiments, the actuator includes one actuator body and one actuator spring for unlocking both plungers.

In use, as shown in FIG. 16, operating forces can be applied (as indicated by the two inner directional arrows) to the actuator bodies 118 to pivot them from their locked to their unlocked positions, which causes the plungers 108 to retract (as indicated by the two outer directional arrows) from their locked to their unlocked positions. In this way, each of the actuators 58 can be operated by one hand of a user (e.g., by wrapping a hand around the actuator housing 124, with the thumb on one actuator body and one or more of the other fingers on the other actuator body, then squeezing) to release its endwall 16 from its sidewall 14 in the use position so the walls can then be folded down to the storage position.

Referring additionally to FIGS. 17-21, details of the minimized-play feature of the latch system 54 of the depicted embodiment will now be provided. The latch end 132 of a sidewall 14 and the latch end 134 of an adjacent endwall 16 have interfering positions (in conflict because of their physical inability to occupy the same space) when the peripheral walls are in the unfolded use position. But at least one of the peripheral walls includes a ramped surface 136 along which the other peripheral wall rides immediately before it reaches the unfolded use position, and at least one of the peripheral walls resiliently displaces outward (out of its interfering position) under outward forces generated by the ramp being ridden across, thereby providing clearance for the pivoting wall to reach its use position.

In the depicted embodiment, there are cooperating ramped surfaces 136 on both the sidewall latch end 132 and the endwall latch end 134. In other embodiments, only the sidewall latch end or the endwall latch end includes a displacement ramp. In the depicted embodiment, the sidewall upper frame member 36 deflects outward, and as such has a sufficient length (between its latch end 132 and the frame connector 44) and is made of a material (e.g., with sufficient elastic deformation properties) selected to permit this resilient displacement. In other embodiments, the sidewall includes a spring-biased joint that permits this resilient displacement and a stop member to prevent over-displacement. In the depicted embodiment, the sidewall latch end 132 displaces slightly, typically less than about $\frac{1}{10}$ inch, though in other embodiments the peripheral wall displacement can be greater or lesser.

In use, FIG. 17 shows the endwall 16 pivoting up and approaching its upright use position (as indicated by the directional arrow). FIG. 18 shows the endwall 16 further pivoting (as indicated by the corresponding directional arrow) to where it comes into contact with the sidewall 14 (in its neutral interfering position), causing the cam-like ramps 136 of the two walls to ride along each other, which in turn pushes outward on and thereby causes the sidewall to displace outward (as indicated by the corresponding directional arrow) for clearance (see also FIG. 20). At the same time, the sidewall ramp 136 pushes (as indicated by the corresponding directional arrow of FIG. 18) the plunger 108 into the unlocked position for clearance. Now the sidewall latch end 132 and the endwall latch end 134 are no longer in interfering positions, and FIG. 19 shows the endwall 16 further pivoted (as indicated by the corresponding directional arrow) into its use position, with the plunger 108 resiliently returning to its locked position (as indicated by the corresponding directional arrow) (see also FIG. 21).

Because in the use position the sidewall 14 is under a slight shear stress from and deflected slightly outward by the endwall 16, it stores a charge such that its latch end 132 applies a compression force on the endwall. In this way, there is no "play" in the system, that is, the sidewall 14 and adjacent endwall 16 are connected by a fit that is pressured tight (not loose, no slack or excess space between them) so the sidewall and endwall are held tightly together and cannot wiggle relative to each other.

After use of the wagon 10, the actuator 58 can be operated to release the endwall 16, then the endwall can be folded down out of its use position. The reverse displacement process then occurs, with the sidewall 14 resiliently returning to its neutral inward interfering position.

Figure 32:
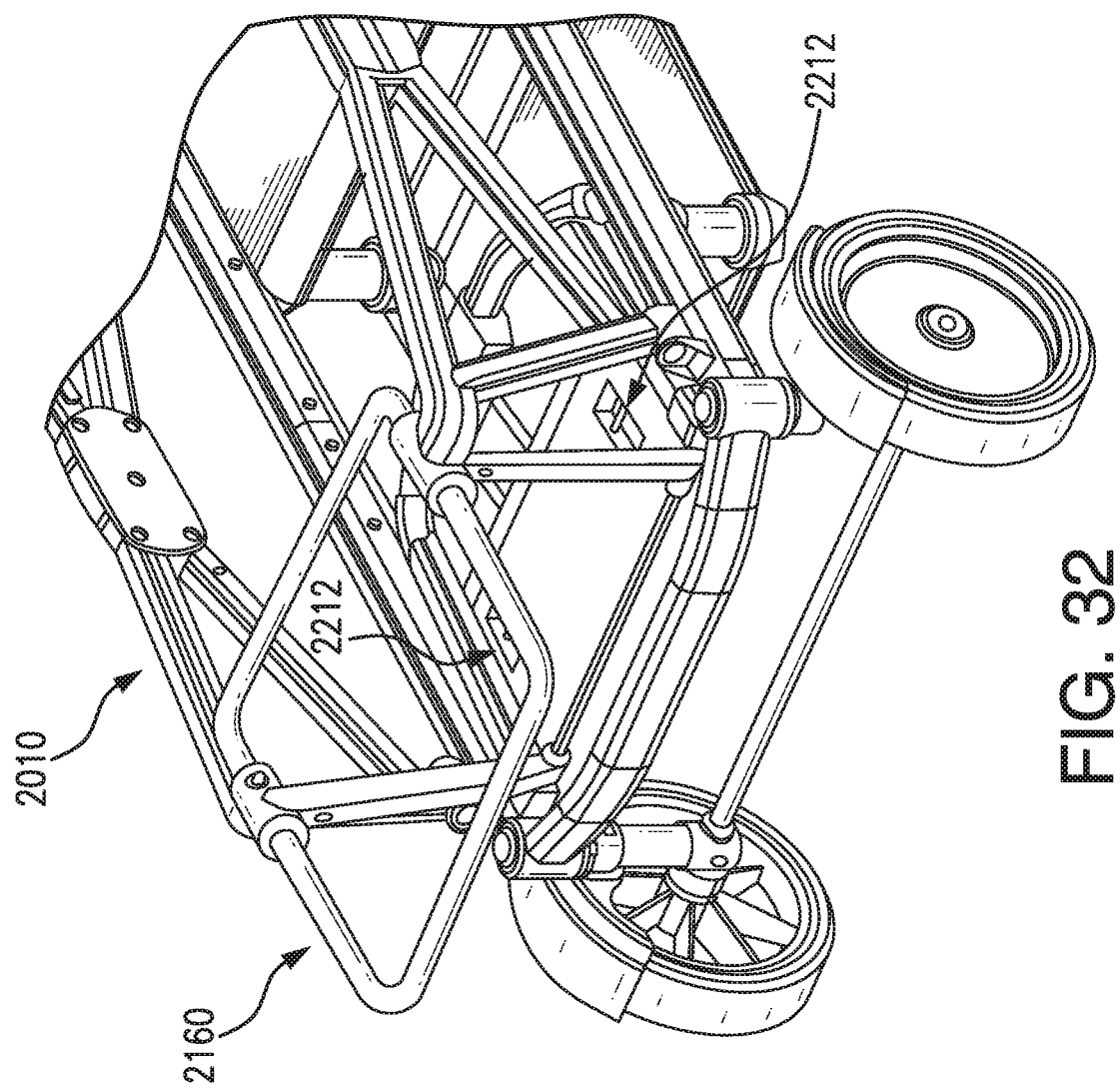
FIG. 32 is a perspective view of a portion of a wagon according to a third example embodiment, shown with its rear endwall folded down and a seat adapter mounted in its place.

In addition, the sidewall latch end 132 can include a stop member 138 that limits the adjacent endwall latch end 134 from pivoting past its use position (see FIG. 32). In the depicted embodiment, for example, the sidewall latch end 132 includes a stop member 138 in the form of a laterally extending wall against which the adjacent endwall latch end 134 abuts in its use position to limit further travel. In other embodiments, the stop member 138 can be in the form of a laterally extending pin or other protrusion.

Furthermore, the sidewall latch end 132 and the endwall latch end 134 can include lateral retainers 140 and 142, respectively. The lateral retainers 140 and 142 hold the sidewall 14 and the endwall 16 from lateral outward displacement from their use positions (the latch system 54 holds them from pivoting beyond their use positions). In the depicted embodiment, for example, the sidewall retainer 140 is in the form of at least one retainer wall extending transversely from the sidewall latch end 132 (e.g., extending transversely from the outer-positioned sidewall stop member 138), thereby defining a retainer opening 144. The sidewall retainer can additionally or alternatively include one or more retainer walls extending from the top and/or bottom of the sidewall latch end 132, as depicted. And the endwall retainer 142 is in the form of at least one retainer wall extending transversely from a neck 146 that extends longitudinally from the endwall latch end 134, thereby defining a retainer opening 148. In other embodiments, the retainers 140 and 142 are in the form of transversely extending pins or other protrusions.

With the sidewall 14 and the endwall 16 in their use positions, the endwall retainer 142 is positioned behind the sidewall retainer 140 and thus received in the sidewall retainer opening 144 (see FIG. 32). And the sidewall retainer 140 is positioned behind the endwall retainer 142 and thus received in the endwall retainer opening 148. In this way, the lateral retainers 140 and 142 hold the sidewall 14 and the endwall 16 from lateral displacement outward in their use positions, as the respective mechanical stops prevent further pivoting but not necessary deflection.

Referring now to FIGS. 22-31, there is shown a wagon 1010 with an innovative child-seating feature according to a second example embodiment of the invention. This child-seating feature can be included in a wagon 10 with four walls 14/16 that all collapse down, as depicted in FIGS. 1-22, or in a wagon with only one peripheral wall that folds downs, typically (but not necessarily) the rear endwall for stability overall and for seat clearance from the wagon handle. Similarly, this child-seating feature can be included in a wagon 10 with a gang-operated latch system 54, as depicted in FIGS. 1-22, with or without a minimized-play feature, or in a wagon with wall latches that are individually-operated (not group-operated) and/or that include another design such as rotary latches, pivot latches, twist/screw latches, slide latches, or other conventional latch systems known in the art. As such, the wagon can be for example of any of the types disclosed in U.S. patent application Ser. No. 14/444,380, filed Jul. 28, 2014, which has been incorporated herein by reference.

Before getting into details of the child-seating feature, some context will be provided to highlight some of its advantages. Children develop in three primary sequential phases: infant, toddler, and child. Conventional wagons generally serve the larger "child" phase well in that the child can climb in and out easily with little restriction, but they typically don't have restraints (e.g., belts or harnesses) of any type. Strollers generally handle the smaller "infant" and "toddler" phases well as they typically include a stroller seat (removable or non-removable) for a toddler and/or connections for interchangeably mounting an infant carrier (of a car-seat system), with such strollers with interchangeable seats known as "travel systems".

The innovative design of the wagon 1010 in preferred embodiments allows caretakers to cover all three phases of a child's growth by allowing them to mount a seat adapter 1160 to the wagon (e.g., to the base frame 1022 and/or sidewall frame 1032), into which they can mount an upright car seat 1162 or an infant carrier seat (aka a car seat). Also, the caretaker can detach and remove a stroller child seat from a stroller/travel system (not shown) and mount it to the seat adapter 1160 mounted to the wagon 1010, which serves the toddler age well (they aren't infants, but still aren't quite capable of sitting up as effectively as needed in a traditional wagon). Thus, the seat adapter 1160 enables interchangeable use of the infant carrier seat, the upright child seat, and the stroller seat with the wagon 1010. And of course the wagon 1010 (e.g., with built-in seats) can be used as normal for carrying a child older/larger than an infant or toddler. In some embodiments, the wagon can be reconfigured for mounting only one of these types of child seats, not multiple of them interchangeably. (Note that as used elsewhere herein, the term "child" is intended to be broadly construed to include infants and toddlers.)

In addition, the wagon 1010 and the seat adapter 1160 are designed so that the entire seat-pan 1161 (and typically the center of gravity) of the child seat (upright car seat, infant-carrier seat, or stroller seat) is positioned below the top of the two adjacent peripheral walls 1014/1016. As depicted, the bottom surface of the child seat 1162 is positioned atop (suspended just above, or supported/resting on) the base 1012 of the wagon 1010, with the top surface of the seat-pan 1161 positioned well below the tops of the sidewall upper frame members 1036 of the two adjacent peripheral sidewalls 1014. This lowers the center of gravity (relative to positioning the child seat on top of the peripheral walls) and thereby improves the stability and safety of the child-seat mounting. And with the car seat 1162 securely mounted to the seat adapter 1160, it is much more stable than if it were simply placed into the wagon 1010 resting on the base 1012

Figure 22:
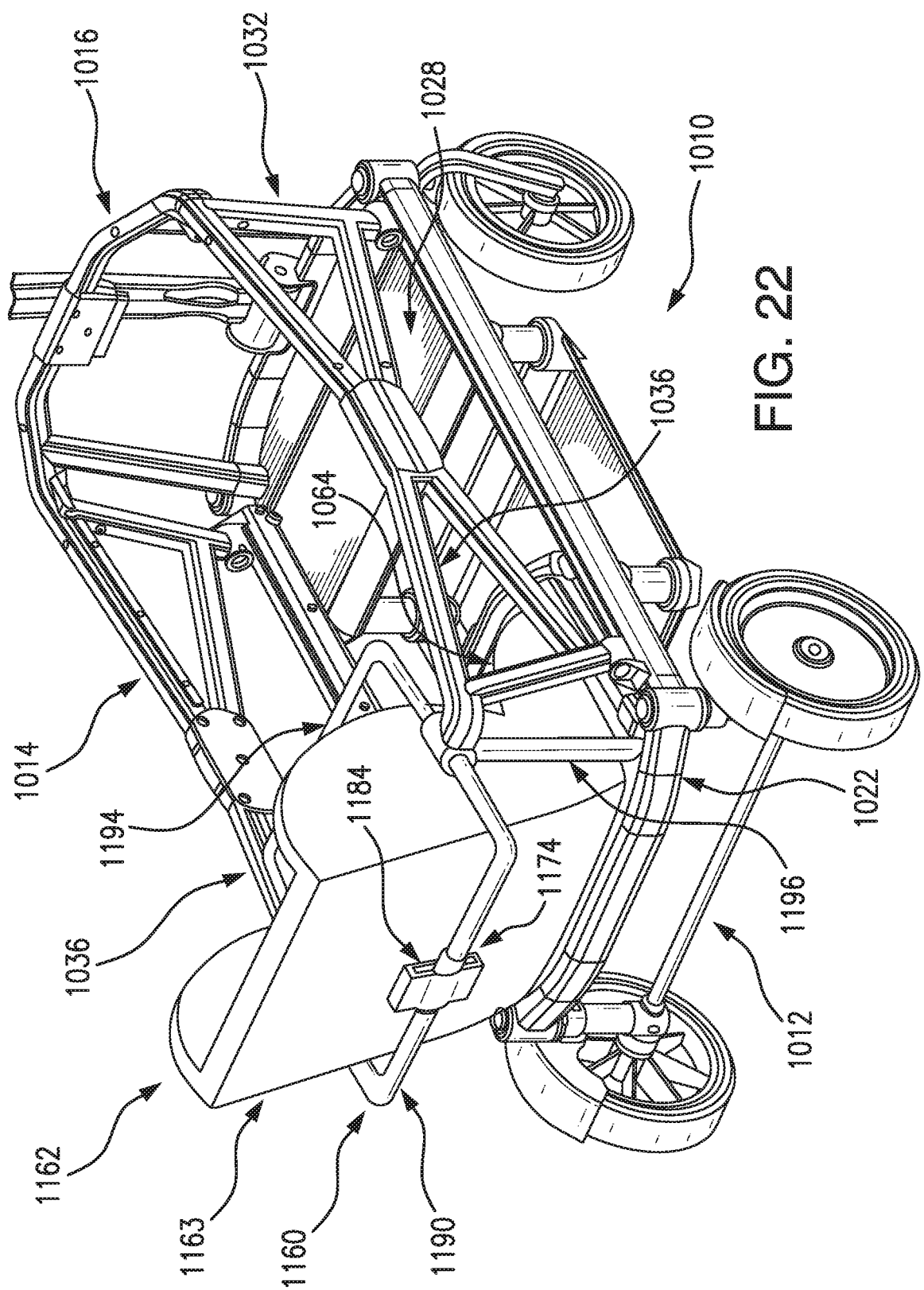
FIG. 22 is a perspective view of a wagon according to a second example embodiment, shown with its rear endwall folded down and with a seat adapter and an upright car seat mounted in its place.
Figure 23:
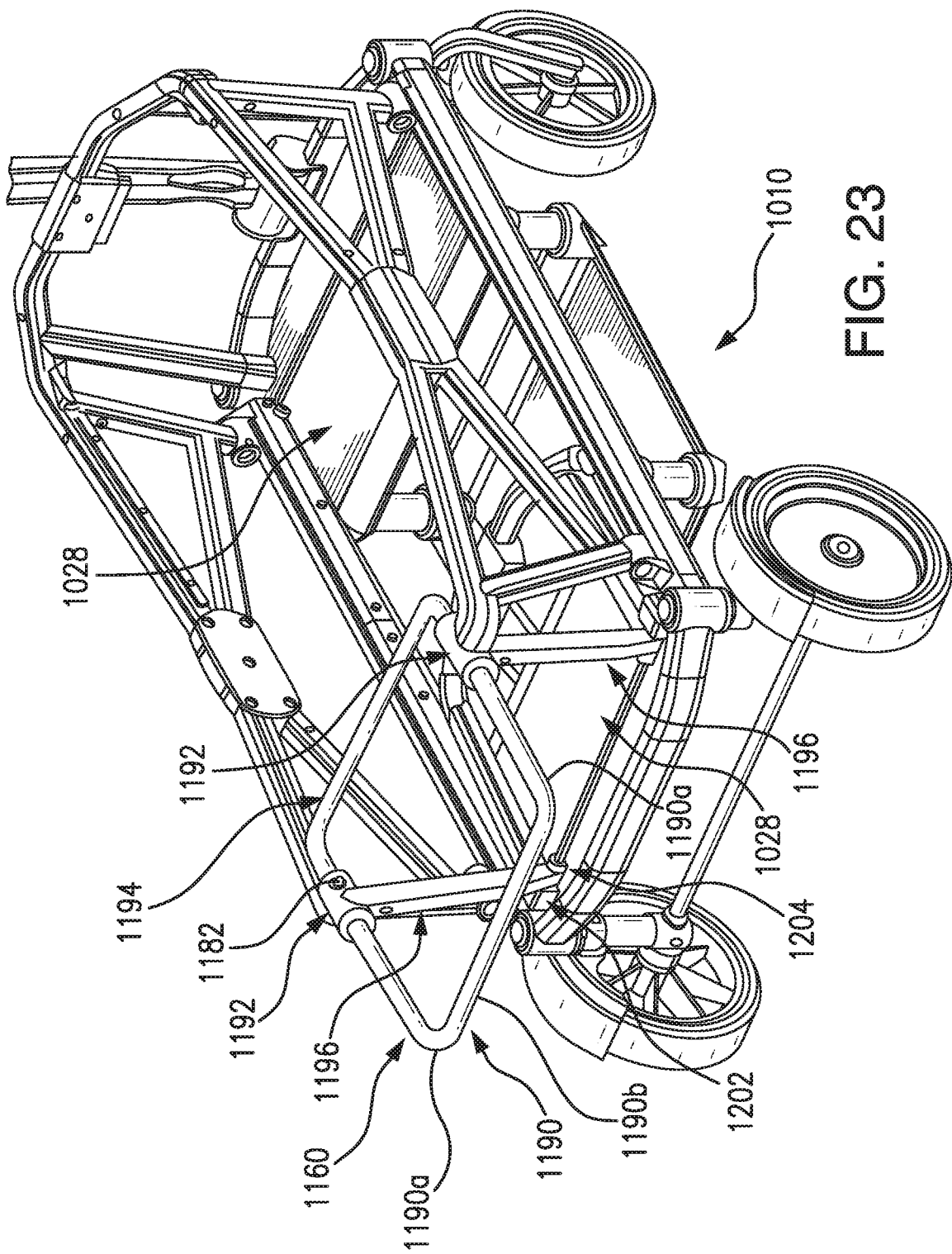
FIG. 23 shows the wagon and seat adapter of FIG. 22, with the seat removed to reveal details of the wagon and seat adapter, and without the latch actuator for simplicity.
Figure 25:
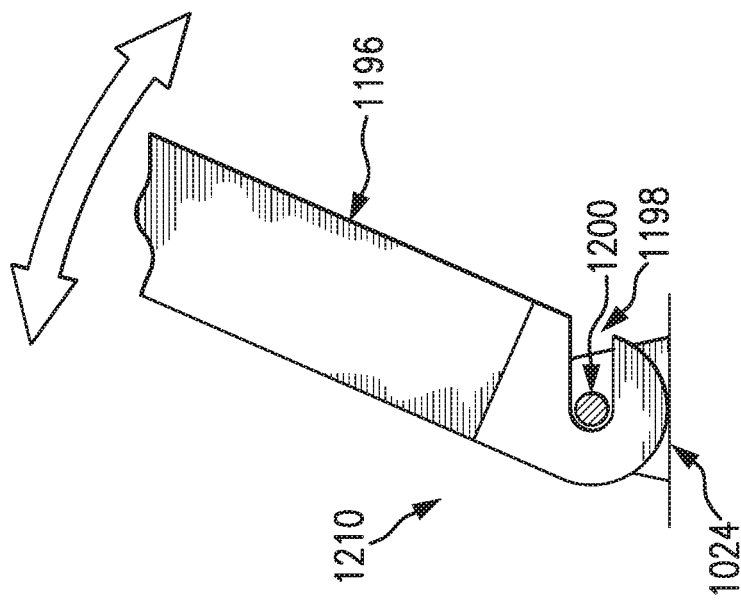
FIG. 25 is a cross-sectional view of the latch-system lower portion taken at line 24-24 of FIG. 24.
Figure 24:
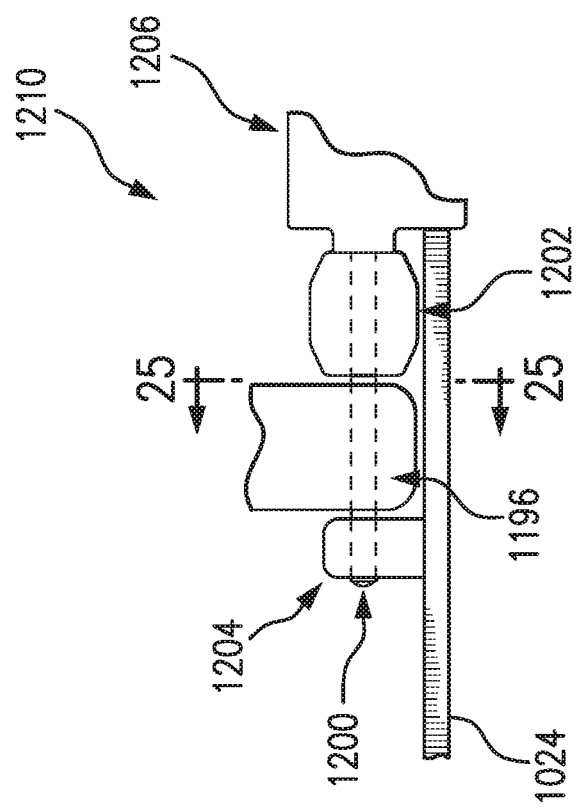
FIG. 24 is a rear end view of a lower portion of a latch system releasably securing the seat adapter to the wagon of FIG. 23.
Figure 26:
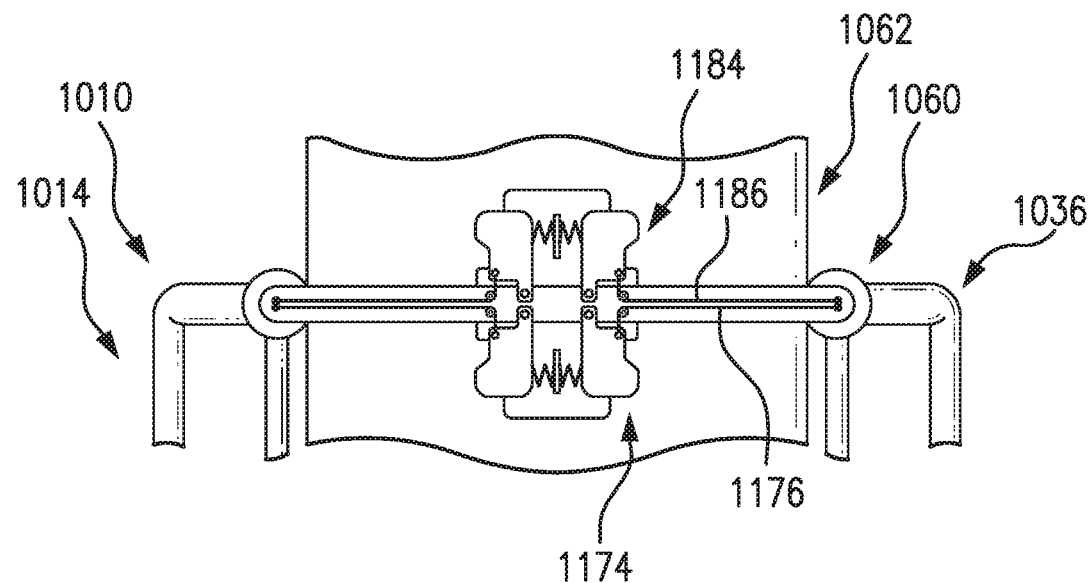
FIG. 26 is a rear-view schematic diagram of an upper portion of the latch system releasably securing the seat adapter to the wagon and the seat of FIG. 22.
Figure 27:
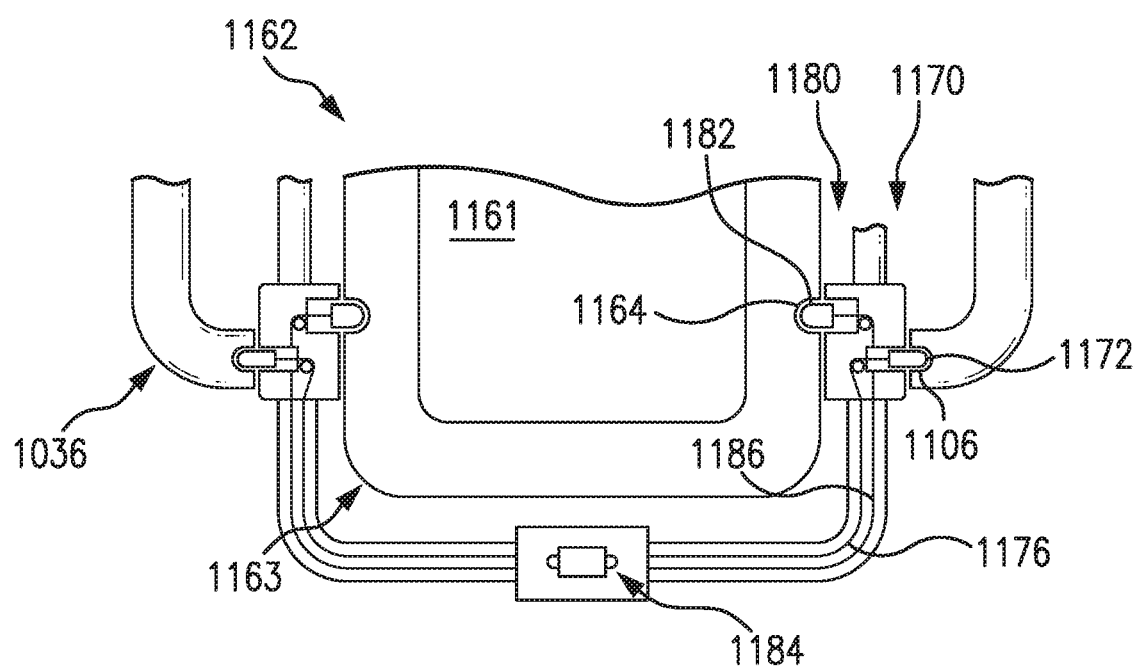
FIG. 27 is a top-view schematic diagram of the latch-system upper portion of FIG. 26.
Figure 28:
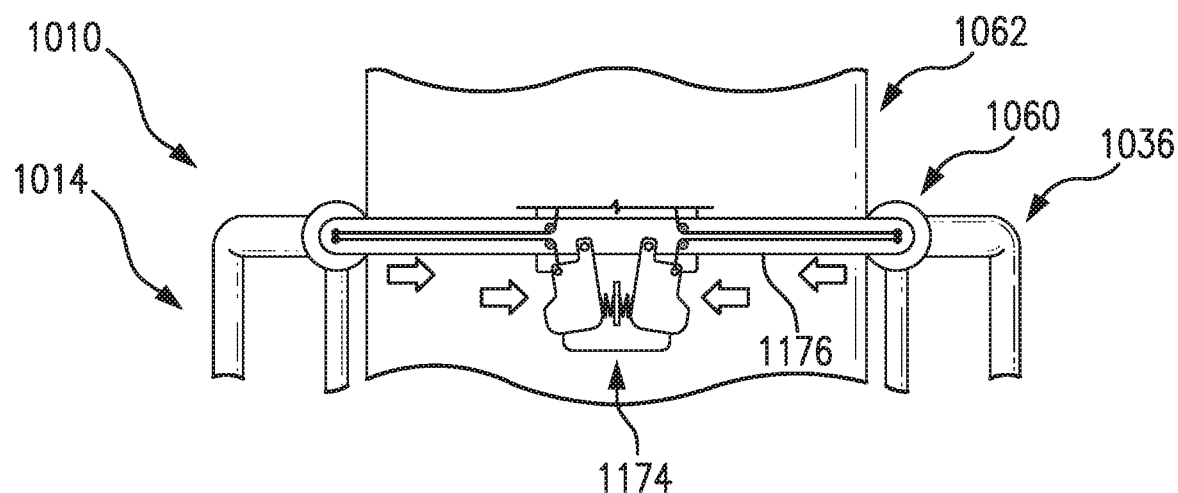
FIG. 28 shows the latch-system upper portion of FIG. 26, with the latch system operated to release the seat adapter from the wagon.
Figure 29:
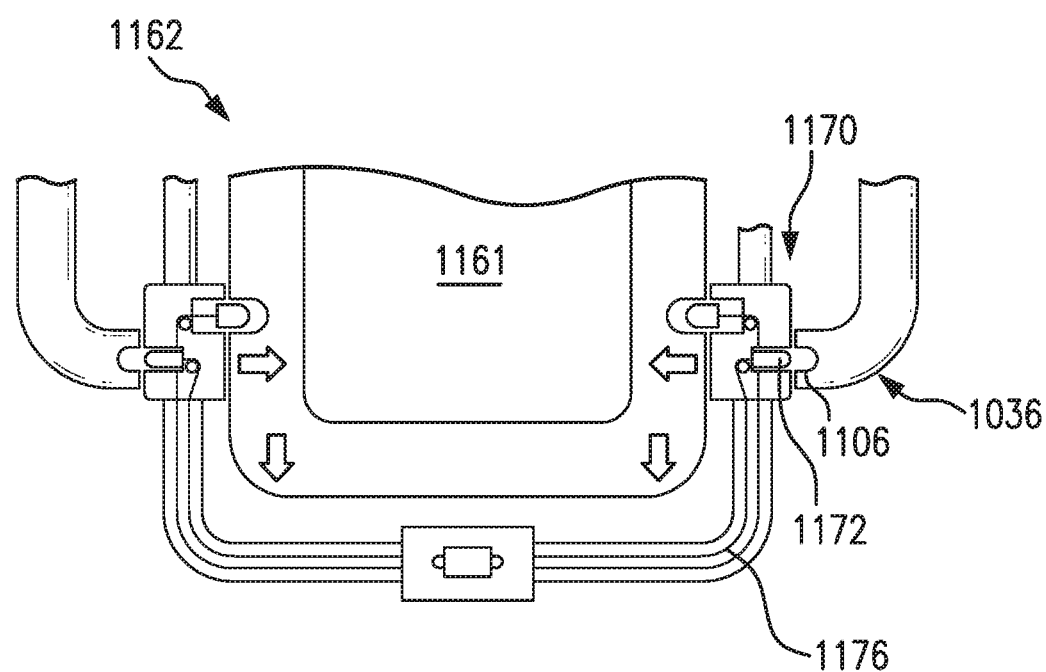
FIG. 29 shows the latch-system upper portion of FIG. 27, with the latch system operated to release the seat adapter from the wagon.
Figure 30:
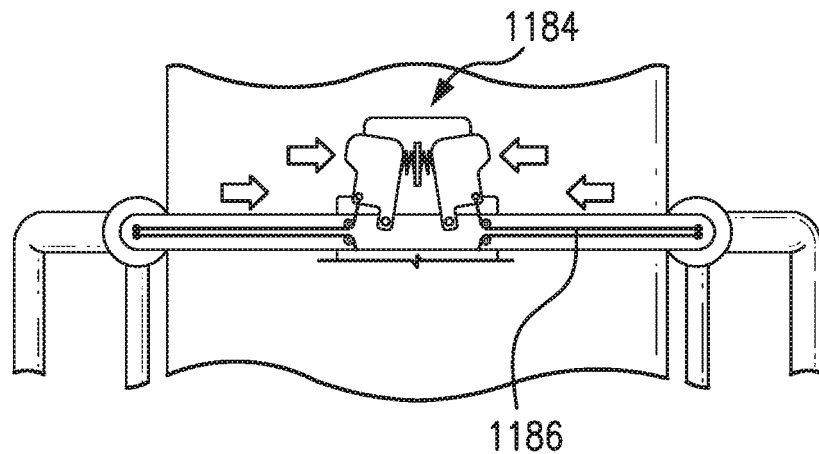
FIG. 30 shows the latch-system upper portion of FIG. 26, with the latch system operated to release the seat from the seat adapter.
Figure 31:
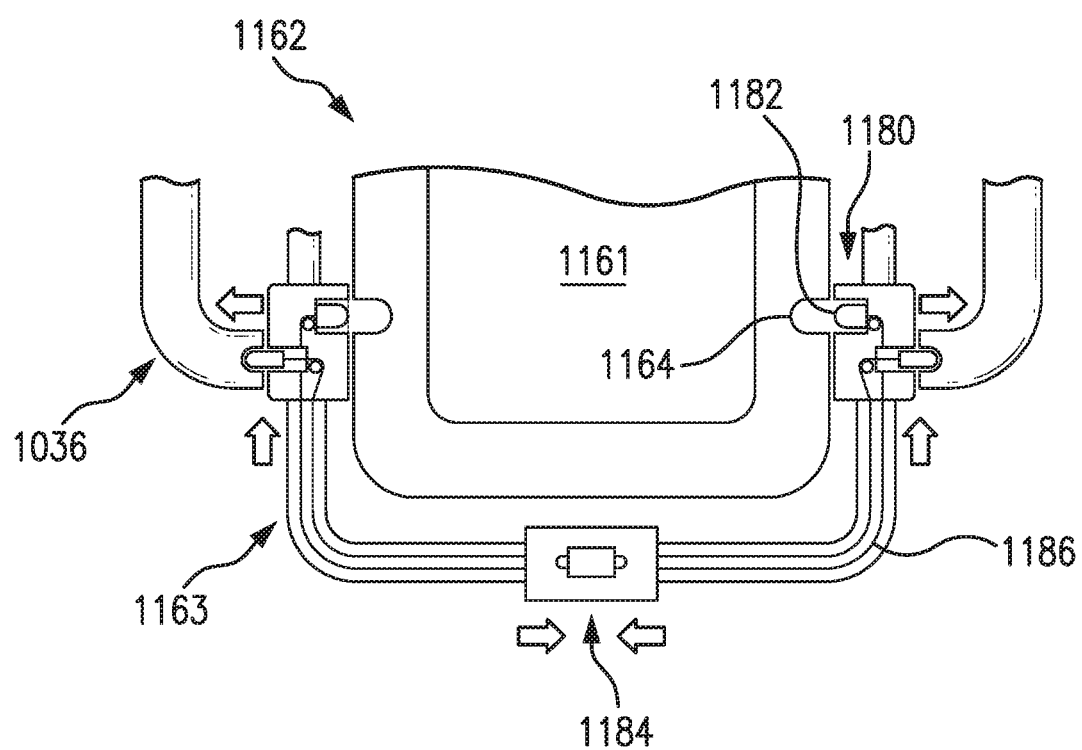
FIG. 31 shows the latch-system upper portion of FIG. 27, with the latch system operated to release the seat from the seat adapter.

(e.g., resting on the rear surface of the corresponding built-in seatback 1028 that is folded down to generally horizontal in the storage position, as depicted in FIGS. 22-23). It should be noted that in some alternative embodiments of the invention the seat adapter positions and mounts the child seat above the peripheral walls of the wagon, as may be desired.

Furthermore, the wagon 1010 and the seat adapter 1160 are preferably designed so that the child seat 1162 is mounted securely in place at least partially over the base 1012 of the wagon and at least partially extending beyond the wagon base (e.g., at its front or rear). That is, a portion of the child seat 1162 extends laterally beyond the footprint of the wagon base 1012 and peripheral walls 1014/1016 (i.e., beyond the outer boundaries of the container defined by the base and peripheral walls) in an outboard configuration. As depicted in FIG. 22, for example, the upright seatback 1163 of the child seat 1162 extends rearward off the wagon base 1012 (although the seatback is inclined upward, it's also inclined rearward). This is accomplished in part by displacing (e.g., folding down or removing, collapsing (accordion-like, rolling, etc.), or otherwise displacing) one of the peripheral walls (e.g., the depicted rear endwall 1016) and in the vacated space placing the child seat 1162. In this way, the child seat 1162 is securely mounted in place but in such a way as to minimize/reduce the space it occupies inside the wagon 1010, thereby permitting more cargo to be carried by the wagon. This also permits the opposite (e.g., front) built-in seat of so-equipped wagons 1010 to be used (e.g., for a larger child) at the same time as the car seat 1162 (if the car seat were merely resting atop the built-in rear seat-pan within the base/wall boundary of a conventionally-sized wagon, the built-in front seat would be generally blocked from use). It should be noted that in some alternative embodiments of the invention the seat adapter positions and mounts the child seat entirely within the base/wall boundary of the wagon, for example still using the wall-to-wall latches that the displaced wall was attached to, as may be desired.

Moreover, the wagon 1010 and the seat adapter 1160 are preferably designed so that with the designated wall (e.g., the depicted rear endwall 1016) displaced (e.g., folded down, or removed, collapsed, or otherwise displaced for so-equipped wagons) from its upright use position and the seat adapter in its vacated place, the seat adapter mounts to the two existing wall-to-wall latch components of the two adjacent walls (e.g., the depicted sidewalls 1014). This maintains the structural integrity of the wagon 1010 so that the strength and stability of the wagon are not compromised when the seat adapter 1160 and child seat 1162 are being used. This also minimizes the additional number of latching elements needed, and by engaging the existing latch components prevents them from rattling during use of the wagon. It should be noted that in some alternative embodiments of the invention, at least one of the seat-adapter latch components is a "dummy" latch with no latching capability but that simply abuts the respective sidewall latch component to provide the structural integrity. Similarly, in other alternative embodiments, at least one of the child-seat latch components is a "dummy" latch with no latching capability but that simply abuts the respective sidewall latch component to provide the structural integrity.

Turning now to the details, FIGS. 22-31 show the wagon 1010 and the seat adapter 1160 in use with the child seat 1162. The wagon 1010 of this embodiment is substantially the same as the wagon 10 of the previous embodiment, with some minor modifications, and with the child-seating feature added. It should be noted that the depicted wagon 1010 is representative and disclosed for illustrating the child-seating feature. In fact, the innovative child-seating feature can be implemented in wagons of other types and designs than that disclosed. So the scope of the child-seating feature is not limited to any particular style of wagon, other than the basic base-and-wall structural arrangement with at least one of the walls displaceable as defined in the claims.

The depicted child seat 1162 is an upright seat that attaches to a support base (not shown) of a car-seat system for carrying a child safely and securely in a motor vehicle. The support base mounts onto the rear seat of the vehicle car and can be left there indefinitely, and the car seat 1162 removably mounts onto the support base in the vehicle. So the car seat 1162 can be removed from the support base, and thus from the vehicle, and used in a portable fashion as an infant carrier. And when desired, the car seat 1162 can be mounted to the seat adapter 1160, which is mounted to the wagon 1010, for carrying the child in the wagon.

The seat adapter 1160 includes elements of at least one latch system 1170 for connecting it to the wagon 1010 and at least one latch system 1180 for connecting it to the child seat 1162. The adapter-to-wagon latch system 1170 includes at least one latching component 1172 that moves between locked and unlocked positions and an actuator 1174 for manipulating the latch component between the locked and unlocked positions. In the depicted embodiment, there are two latching components 1172 each in the form of a plunger that engages and disengages (extends into and retracts from) a respective one of the receiver latching components 1106 of the two adjacent sidewalls 1014. The actuator 1174 is operable to gang-operate both latch components 1172 from their locked positions to their unlocked positions, for example against the force of a spring that biases the latch components toward their locked positions, and for example by way of a connector 1176 extending between the actuator and the latch components and routed through or along a connecting member 1190 extending between the two adjacent walls 1014, to which the actuator 1174 is mounted, and relative to which the latching components 1172 extend and retract.

As such, the adapter/wagon latch system 1170 of the depicted embodiment is of the same basic design, construction, and operation as the wall-to-wall latch system 54 of the previous embodiment. Details of the components and operation of the adapter/wagon latch system 1170, in this implementation, are shown in FIGS. 26-29. So for the sake of brevity, further details are not repeated. The adapter/wagon latch system 1170 disclosed is representative for illustration purposes only, and persons of ordinary skill in the art will appreciate that many other latch systems, having other designs, construction, and operation, can be readily substituted into the seat adapter 1160 and wagon 1010. Such alternative latch systems can include, for example, conventional pivotal, rotary, hooking, multi-prong, and other latches. Other example latch systems that can be used include those disclosed by U.S. Patent Application Publications Nos. US2011/0170948, US2012/0056452, and US2012/0261961, which are hereby incorporated herein by reference.

A nice feature of the adapter/wagon latch system 1170 of the depicted embodiment is that the seat adapter 1160 connects to the wagon 1010 using the existing receiver latching components 1106 of the existing the wall latch system 54. In this way, additional components are not needed to provide the functionality described herein. And because the position and design of the existing receiver latching components 1106 of the existing the wall latch system 54 provide for structural strength of the wagon peripheral walls 1014/1016 when latched together, mounting the seat adapter 1160 to them and between the two adjacent walls maintains the structural integrity of the wagon 1010 when the wall is displaced and the seat adapter is installed in its place.

The adapter-to-seat latch system 1180 of the seat adapter 1160 includes at least one latching component 1182 that moves between locked and unlocked positions and an actuator 1184 for manipulating the latch component between the locked and unlocked positions. In the depicted embodiment, there are two latching components 1182 each in the form of a plunger that engages and disengages (extends into and retracts) from a respective one of two receiver latching components 1164 on the seat back 1163 (e.g., on the two outwardly facing sides of the shell of the seatback) of the child seat 1162. The actuator 1184 is operable to gang-operate both latch components 1182 from their locked positions to their unlocked positions, for example against the force of a spring that biases the latch components toward their locked positions, and for example by way of a connector 1186 extending between the actuator and the latch components and routed through or along the connecting member 1190 extending between the two adjacent walls 1014, to which the actuator 1184 is mounted, and relative to which the latching components 1182 extend and retract.

As such, the adapter/seat latch system 1180 of the depicted embodiment is of the same basic design, construction, and operation as the wall latch system 54 of the previous embodiment. Details of the components and operation of the adapter/seat latch system 1180 (including the cooperating latch components 1164 of the child seat 1162), in this implementation, are shown in FIGS. 26-27 and 30-31. So for the sake of brevity, further details are not repeated. The adapter/seat latch system 1180 disclosed is representative for illustration purposes only, and persons of ordinary skill in the art will appreciate that many other latch systems (including the cooperating latch components of the child seat), having other designs, construction, and operation, can be readily substituted into the seat adapter 1160 and wagon 1010. Such alternative latch systems can include, for example, conventional pivotal, rotary, hooking, multi-prong, and other latches. Other example latch systems that can be used include those disclosed by U.S. Patent Application Publications Nos. US2011/0170948, US2012/0056452, and US2012/0261961, which are incorporated herein by reference.

The adapter/seat latch system 1180 of the seat adapter 1160 can be configured to secure the child seat 1162 to the seat adapter 1160 by engaging existing (for engaging the car-seat support base) or specially-added latch components 1164 of the child seat. In embodiments with specially-added child-seat latch components 1164, in particular, the child seat 1162 can be provided together with the seat adapter 1160 and/or the wagon 1010 as a system.

The connecting member 1190 extends between the two adjacent walls 1014, can have the actuators 1174 and 1184 mounted to it, and has the latching components 1172 and 1182 extend from and retract into it at hubs 1192 of the connecting member. The connecting member 1190 can be in the form of a frame member (e.g., a rod, as depicted), a panel, a cage or latticework, or another structure that provides structural strength when connected between the two adjacent walls 1014 of the wagon 1010.

In addition, the connecting member 1190 typically includes two extension segments 1190*a* that extend longitudinally outward (e.g., rearward) to beyond the peripheral walls 1014/1016 and base 1012 of the wagon 1010, and an outer (e.g., rear) retaining cross segment 1190*b* extending transversely between the extension segments. The retaining cross segment 1190*b* is thus positioned outwardly beyond (e.g., behind) the footprint/boundary of the wagon 1010 and outwardly beyond (e.g., behind) the child seat 1162, thus providing an outer safety mechanical stop against which the child-seat seatback 1163 prevented from sliding past to retain the child seat on the wagon, while enabling the child seat to extend beyond the wall-and-base boundary of the wagon to minimize the space within the wagon that the child seat occupies. This arrangement also positions the actuators 1174 and 1184 behind the child seat 1162 when it is installed facing forward and where the displaced rear endwall 1016 was, so the child cannot reach the actuators and unlock either corresponding latch system 1170 or 1180.

As an additional safety element, the seat adapter 1160 can include an inner (e.g., front) transverse bumper 1194 in a position inward (e.g., forward) of the outer connecting member 1190 to cooperatively frame the child seat 1162 thereby assisting in retaining it on the wagon 1010. In the depicted embodiment, for example, the bumper 1194 is in the form of a rod that extends between the hubs 1192 and is configured so that it's positioned inward (e.g., in front) of the child seat 1162 when the child seat is mounted in place for use, spaced-apart from and cooperating with the connecting member 1190 to form a closed loop. In this way, the bumper 1194 helps retain the child in the child seat 1162 and also provides added structural strength to the seat adapter 1160 and wagon 1010. In other embodiments, the bumper extends from only one side (it does not extend all the way across the wagon between the walls), it's pivotal for ease of getting the child into and out of the installed child seat 1162, it's padded for comfort and safety, it includes a tray for holding children's items, and/or it has another form such as a bar, plate, or other conventional bumper or retaining member.

And as a further safety element, the seat adapter 1160 can include two upright supports 1196 extending downward from the connecting member 1190, for example at the laterally-spaced hubs 1192, for mounting to the base 1012 of the wagon 1010 for increased structural strength. The upright supports 1196 can be in the form of legs (e.g., the depicted bars), walls, frameworks, or other conventional structural elements selected to support the weight of the seat adapter 1160, the child seat 1162, and a child. The upright supports 1196 each include an upper portion that is conventionally attached to or integrally formed with the respective hub 1192.

The upright supports 1196 can be removably mounted to the wagon base 1012 by conventional connections. In the depicted embodiment, for example, the connections 1210 are provided by the two pivot pins 1200 for the pivotally folding seatback 1028 each being extended laterally longer than what is needed for only the respective pivot-pin housing 1202 of the seatback (i.e., relative to the previous embodiment), with one of the pivot mounts 1204 and 1206 for each pivot pin positioned wider to expose the added pivot-pin length for use. And the upright supports 1196 each include a slot 1198 formed in a lower portion that receives the respective pivot pin 1200. In this way, to install the seat adapter 1160 for use, the slots 1198 of the upright supports 1196 are slid onto the pivot pins 1200, then the top of the seat adapter is pivoted forward about the pivot pins until the latch components 1172 of the seat adapter engage the latch components 1106 of the sidewalls 1014. In other embodiments, the upright supports 1196 are removably mounted to the wagon base 1012 by other conventional connections such as those disclosed herein as other embodiments.

In addition, the connection slot 1198 is preferably oriented so that it's not aligned along an arc defined by a fixation point of the adapter/wagon latch system 1170. In this way, with the seat adapter 1160 latched to the wagon 1010 by the adapter/wagon latch system 1170, even if the adapter/wagon latch system does not strictly prohibit pivotal movement, the slot 1198 cannot travel off of the pivot pin 1200. So this connection 1210 passively locks the upright support 1196 to the wagon 1010, that is, it does not have an active latching component that moves between locked and unlocked positions, but instead prevents disconnection by being held in place by the adapter/wagon latch system 1170 being in its locked position (and providing for active locking of the seat adapter to the wagon. With this design, only one set of attachments—the adapter/wagon latch system 1170— needs to be operated to remove the seat adapter 1160 from the wagon 1010, while still providing two sets of attachments for added stability and safety.

In other embodiments, instead of two pivot pins, one on each side of the wagon base, a single longer pivot pin extends across the wagon long enough for mounting both upright supports. And in other embodiments, the pin-and-slot arrangement is reversed (vice versa), with the upright support including the pin and the wagon (typically, the base) including the slot.

In still other embodiments, the seat adapter includes different latches (not the wall-to-wall latches) for removably mounting the seat adapter to the peripheral wall, which is left unfolded, to mount the child seat within the wagon (within the boundary of the base-and-wall-defined container). In such embodiments, the adapter/wagon seat-adapter latches can be provided by hooks, straps, clamps, or other conventional connectors, the seat adapter need not include any upright supports, and the seat adapter still includes the adapter/seat latches for removably mounting the child seat to it. In other embodiments, the seat adapter connection/latching points can be at the corners, or in the center, of an end or side of the wagon, whether the base, the peripheral wall(s), or both. In addition, the seat adapter can also be used (as is, or with conventional modifications) for holding storage bags, canopies, and other items in the wagon for general-purpose use.

Figures 33, 34:
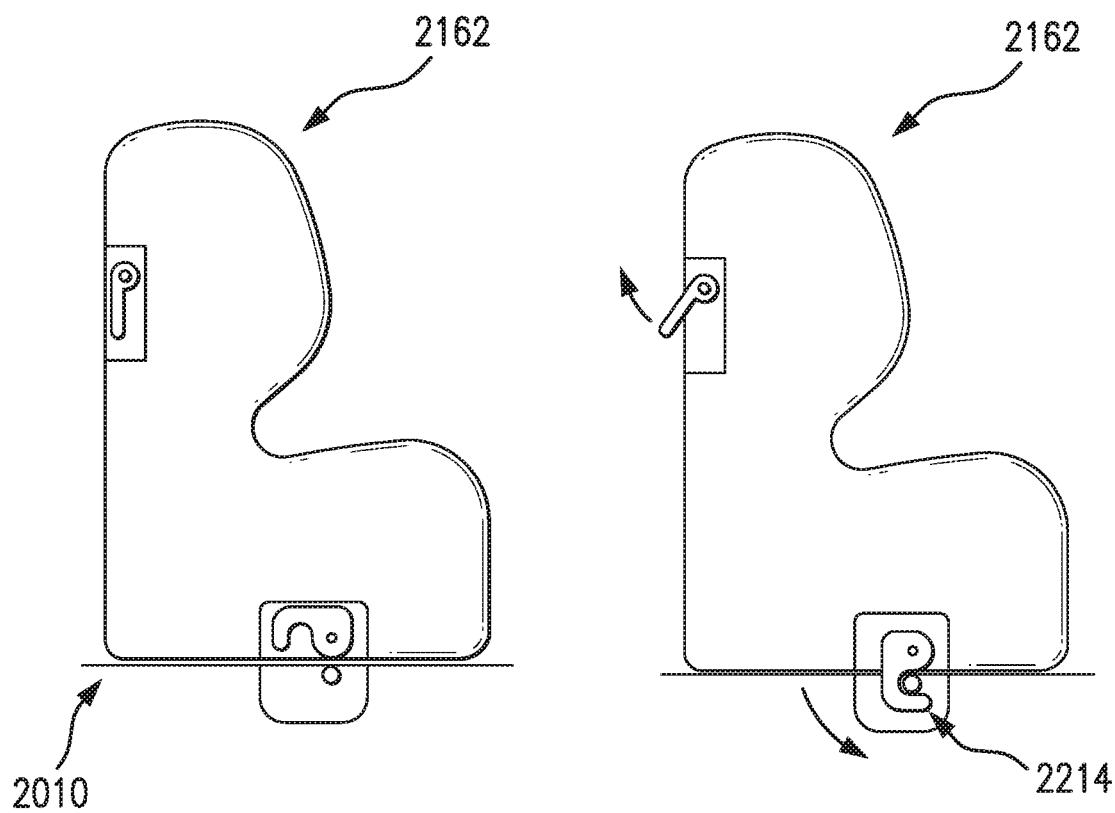
FIG. 33 is a side-view schematic diagram of a lower portion of a latch system releasably securing the seat to the wagon of FIG. 32, shown in an unlocked position.
FIG. 34 shows the latch-system lower portion of FIG. 33 in a locked position.

FIGS. 32-34 show a wagon 2010 and a seat adapter 2160 according to a third example embodiment in use with a child seat 2162. The wagon 2010, seat adapter 2160, and child seat 2162 of this embodiment are substantially the same as those of the previous embodiment, with some exceptions primarily those noted. In particular, in this embodiment, the seat adapter 2160 does not include an adapter/seat latch system for mounting the child seat 2162 to it. Instead of mounting to the seat adapter 2160, the child seat 2162 mounts to the wagon 2010. For example, the wagon can include latch components 2212 (e.g., the depicted recessed pins in the rear surface of the folded-down rear-seat backrest) that are selectively engaged by existing or specially-added latch components 2214 (e.g., the depicted pivot hooks) of the child seat 2162. The depicted latches are representative for illustration purposes only, and other conventional latch systems known in the art can be readily incorporated into the wagon (and the child seat).

In some embodiments, the wagon is provided with multiple sets of latch components for latching to multiple different styles and brands of child seats. In some embodiments, the wagon (e.g., the base) includes an actuator operably connected to the latch components to move them from a locked position to an unlocked position relative to the latch components of the child seat. And in some embodiments, the wagon is provided without any latch components for locking the child seat to it, so the child seat simply rests on the wagon base (e.g., atop the folded down endwall and seatback) and is retained there by being framed between the connecting member and the bumper. Of course, in some embodiments without the child seat being latched to the wagon or a set adapter, a strap or other retaining element can also be included to help secure the child seat on the wagon.

Figure 35:
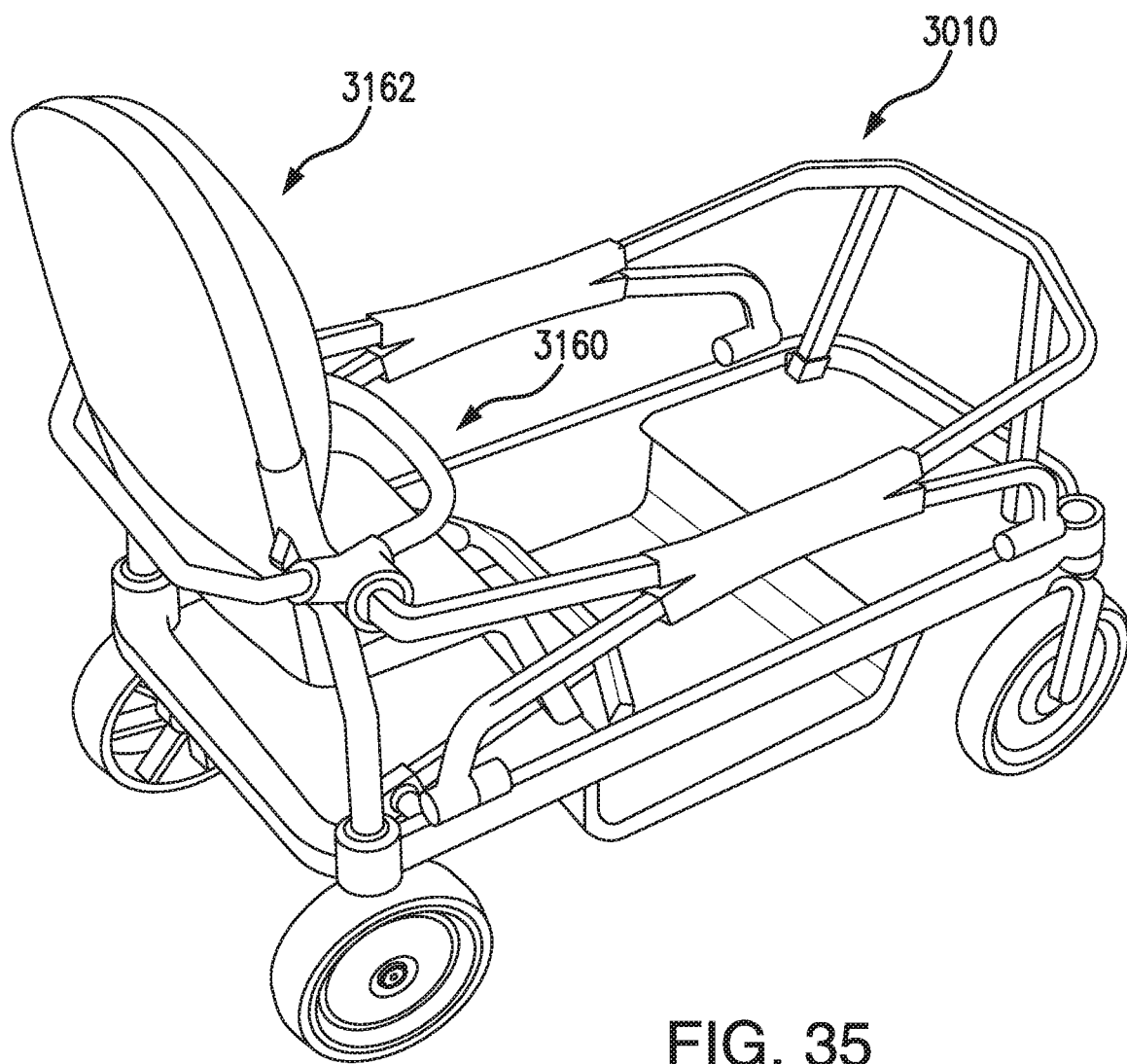
FIG. 35 is a perspective view of a wagon according to a fourth example embodiment, shown with its rear endwall folded down and with a seat adapter and a stroller seat mounted in its place.

FIG. 35 shows a wagon 3010 and a seat adapter 3160 according to a fourth example embodiment in use with a child seat 3162. The wagon 3010, seat adapter 3160, and child seat 3162 of this embodiment are substantially the same as those of the previous embodiment, with some exceptions primarily those noted. In particular, in this embodiment, the child seat 3162 is of a different style but still used with the seat adapter 3160 to provide the functionality described herein.

Figure 36:
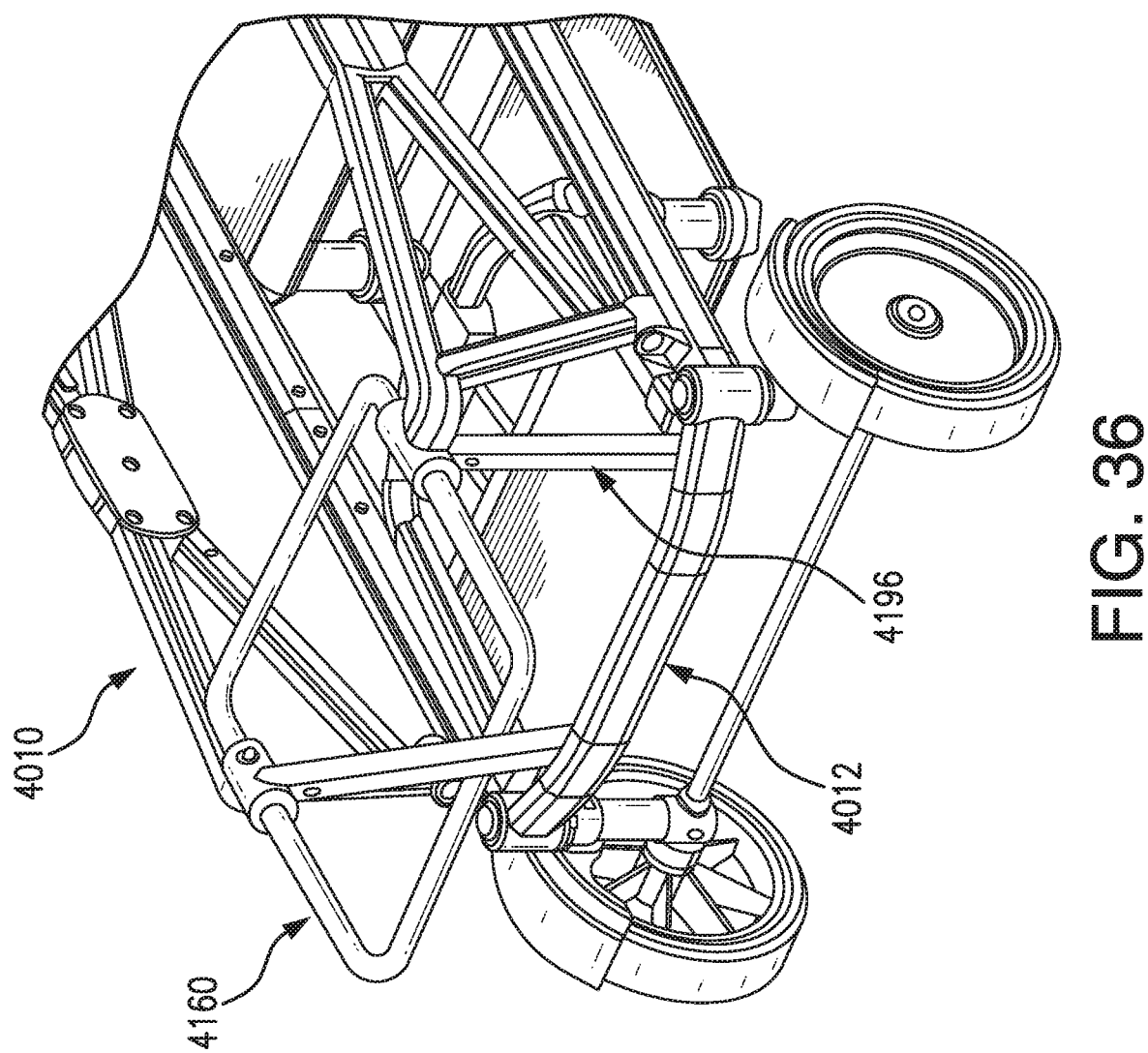
FIG. 36 is a perspective view of a portion of a wagon according to a fifth example embodiment, shown with its rear endwall folded down and with a seat adapter mounted in its place.
Figure 37:
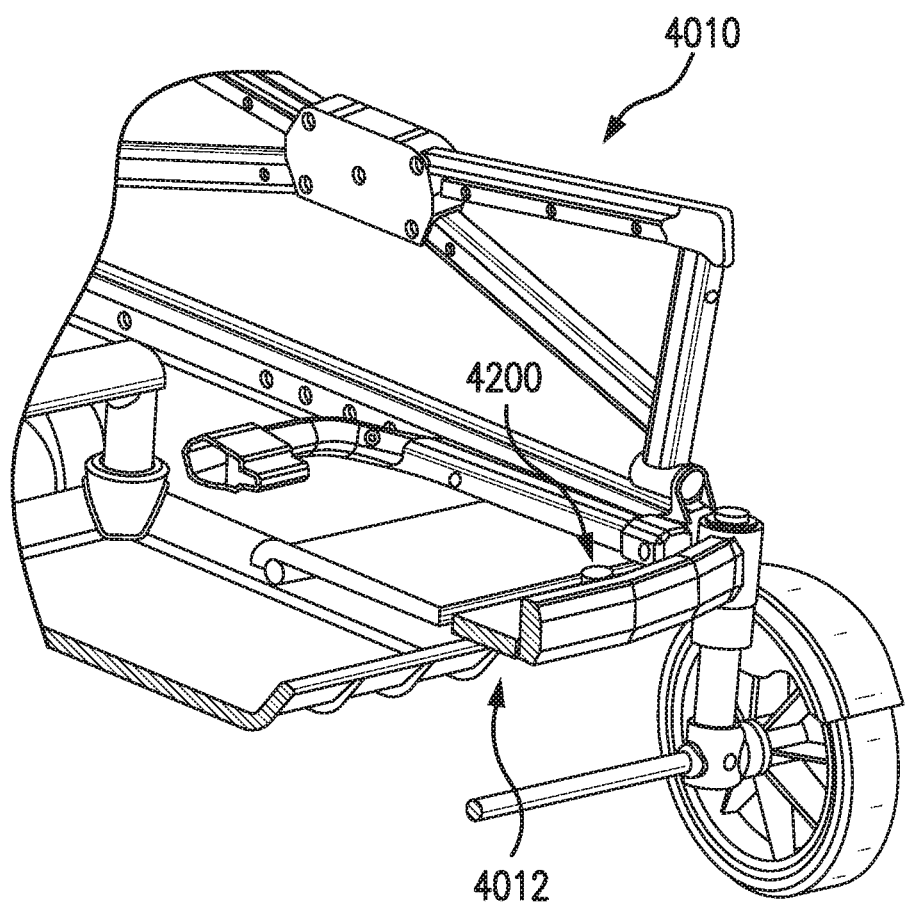
FIG. 37 is a perspective view of the wagon of FIG. 36, shown with a portion cut away, and showing a lower portion of a latch system for releasably securing the seat adapter to the wagon.
Figure 38:
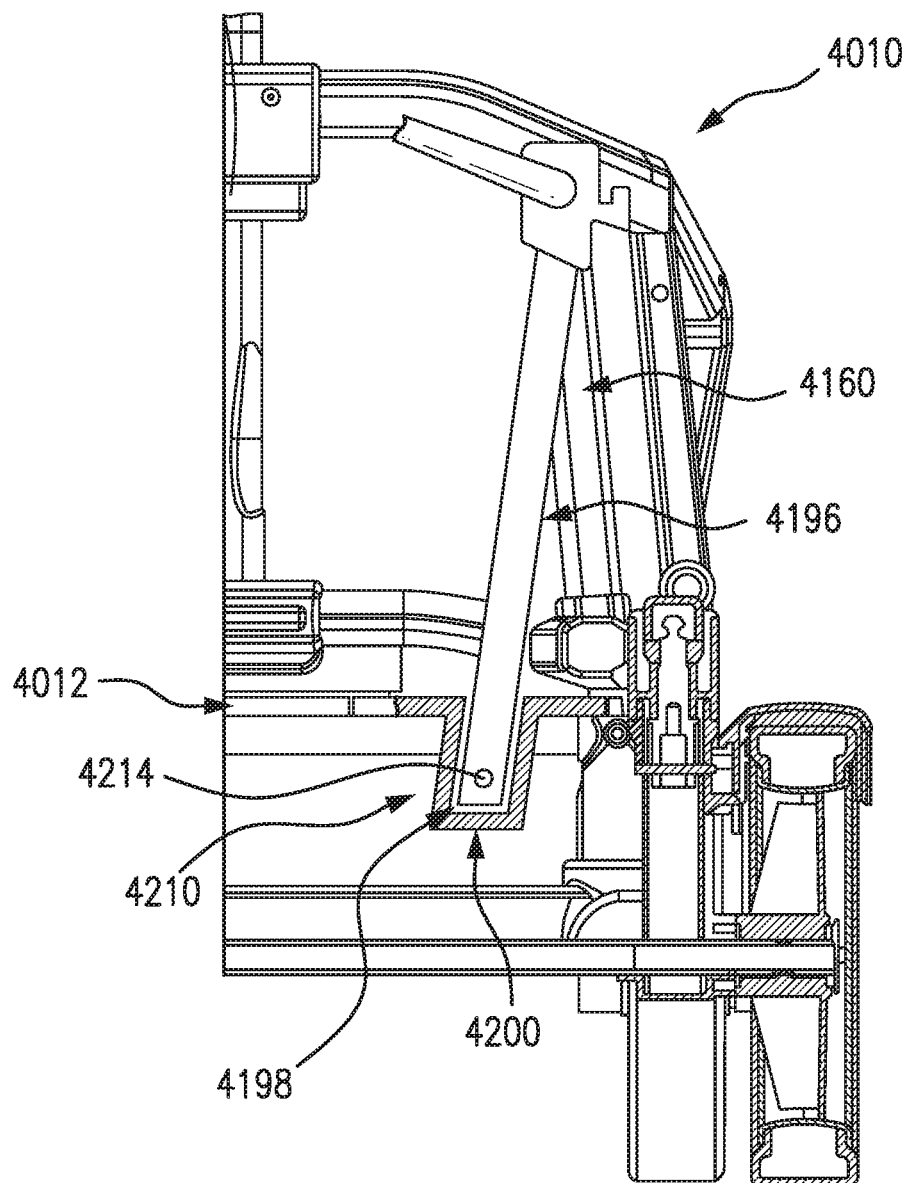
FIG. 38 is a rear end view of the wagon of FIG. 37, in partial cross section to better show the latch-system lower portion.

FIGS. 36-38 show a wagon 4010 and a seat adapter 4160 according to a fifth example embodiment for use with a child seat (not shown). The wagon 4010, seat adapter 4160, and child seat of this embodiment are substantially the same as those of the previous embodiment, with some exceptions primarily those noted. In this embodiment, the lower connections 4210 between the seat-adapter upright supports 4196 and the wagon 4010 are of a different design. In particular, the connections 4210 each include a female element (e.g., the depicted socket) 4200 in the wagon 4010 (typically in the base 4012) that receives a male element (e.g., the depicted extension portion below the base) 4198 of the upright support 4196. The female element 4200 can be positioned in a base floorboard, a base frame member, the rear surface of the folded-down rear-seat seatback of the base, the top surface of the rear-seat seat-pan of the base, a frame member of the folded-down rear sidewall, or elsewhere on the wagon 4010. The male and female elements 4198 and 4200 can include a retaining mechanism 4214 such as a detent or a VALCO button that helps hold it in place but that does not require an additional action to separate them when removing the seat adapter 4160.

FIGS. 39-41 show a wagon 5010 and a seat adapter 5160 according to a sixth example embodiment for use with a child seat (not shown). The wagon 5010, seat adapter 5160, and child seat of this embodiment are substantially the same as those of the previous embodiment, with some exceptions primarily those noted. In this embodiment, the lower connections 5210 between the seat-adapter upright supports 5196 and the wagon 5010 are essentially reversed (vice versa) from those of the fifth embodiment. In particular, the connections 5210 each include a male element (e.g., the depicted post) 5200 on the wagon 5010 (typically extending upward from the base 5012) that is received by a male element (e.g., the depicted bore of the lower portion) 5198 of the upright support 5196. The male element 5200 can be positioned on a base floorboard, a base frame member, the rear surface of the folded-down rear-seat seatback of the base, the top surface of the rear-seat seat-pan of the base, a frame member of the folded-down rear sidewall, or elsewhere on the wagon 5010. The female and male elements 5198 and 5200 can include a retaining mechanism 5214 such as a detent or a snap-finger that helps hold it in place but that does not require an additional action to separate them when removing the seat adapter 5160.

Figure 42:
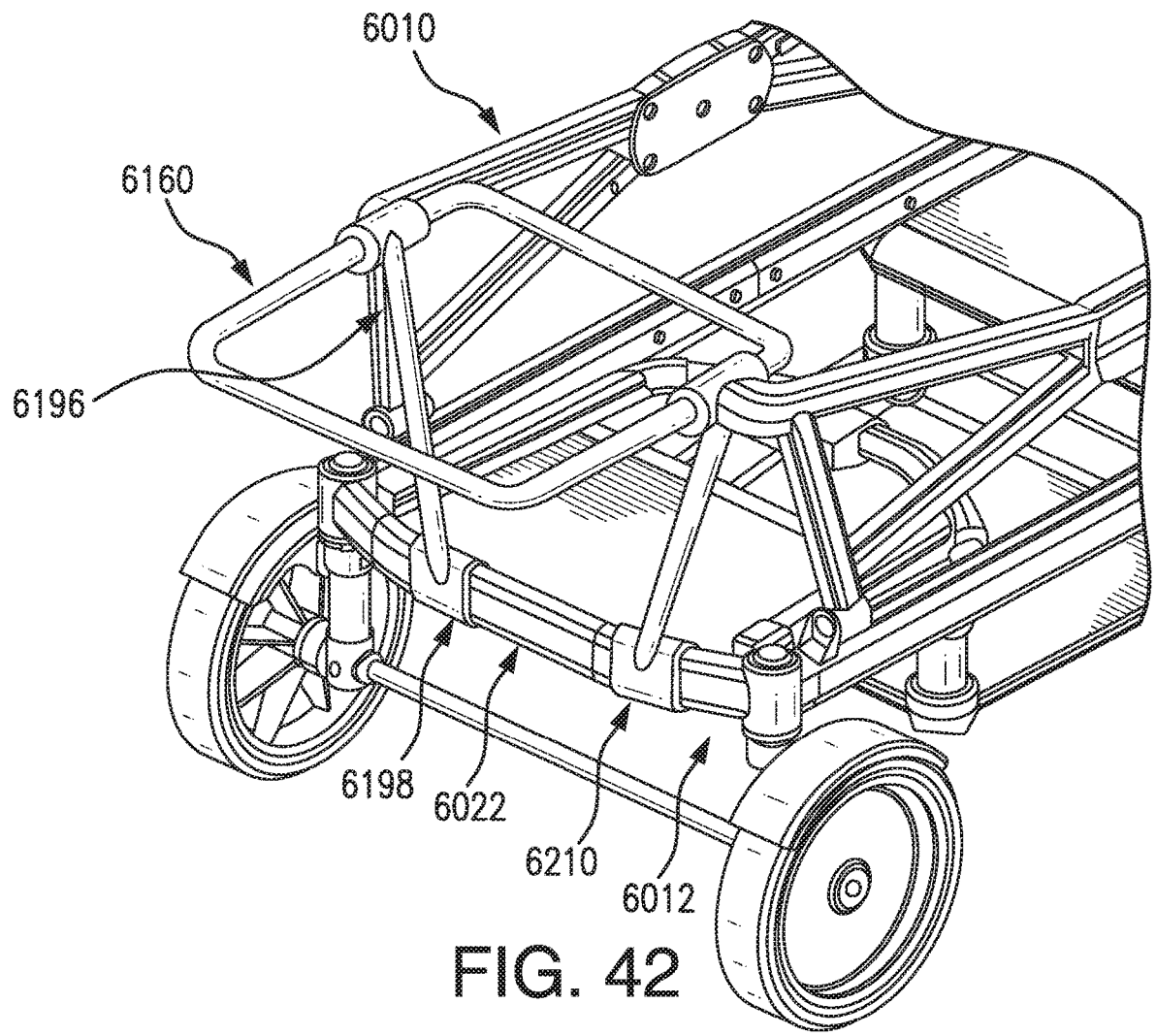
FIG. 42 is a perspective view of a portion of a wagon according to a seventh example embodiment, shown with its rear endwall folded down and with a seat adapter mounted in its place.
Figure 43:
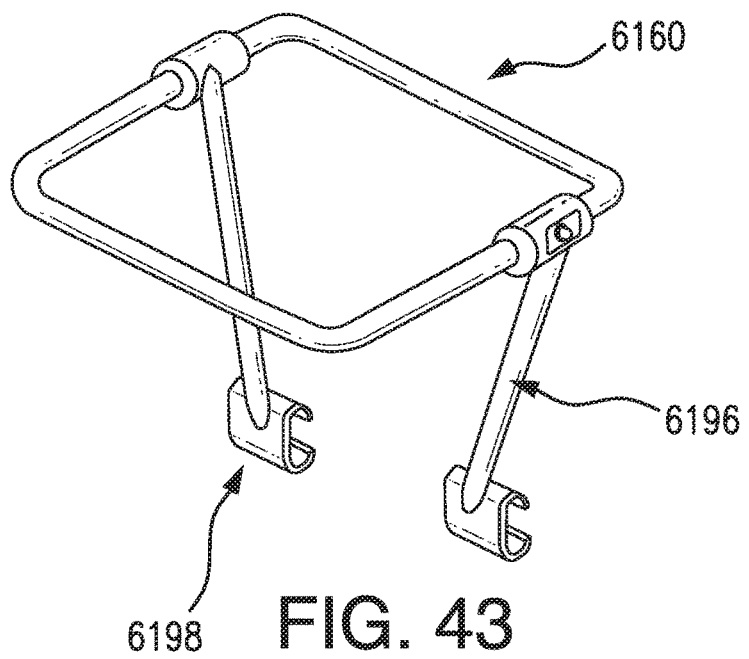
FIG. 43 is a perspective of the seat adapter of FIG. 42.

FIGS. 42-43 show a wagon 6010 and a seat adapter 6160 according to a seventh example embodiment in use with a child seat (not shown). The wagon 6010, seat adapter 6160, and child seat of this embodiment are substantially the same as those of the previous embodiment, with some exceptions primarily those noted. In particular, in this embodiment, the lower connections 6210 between the seat-adapter upright supports 6196 and the wagon 6010 are of a different design. In particular, the connections 6210 each include a clamp element (e.g., the depicted C-shaped snap-on clip) 6198 of the upright support 6196 that snap-clips onto a base frame 6022 of the wagon 6010. The clamp elements 6198 can include a retaining mechanism such as a set screw or clasp to help hold it on the wagon 6010.

Figure 44:
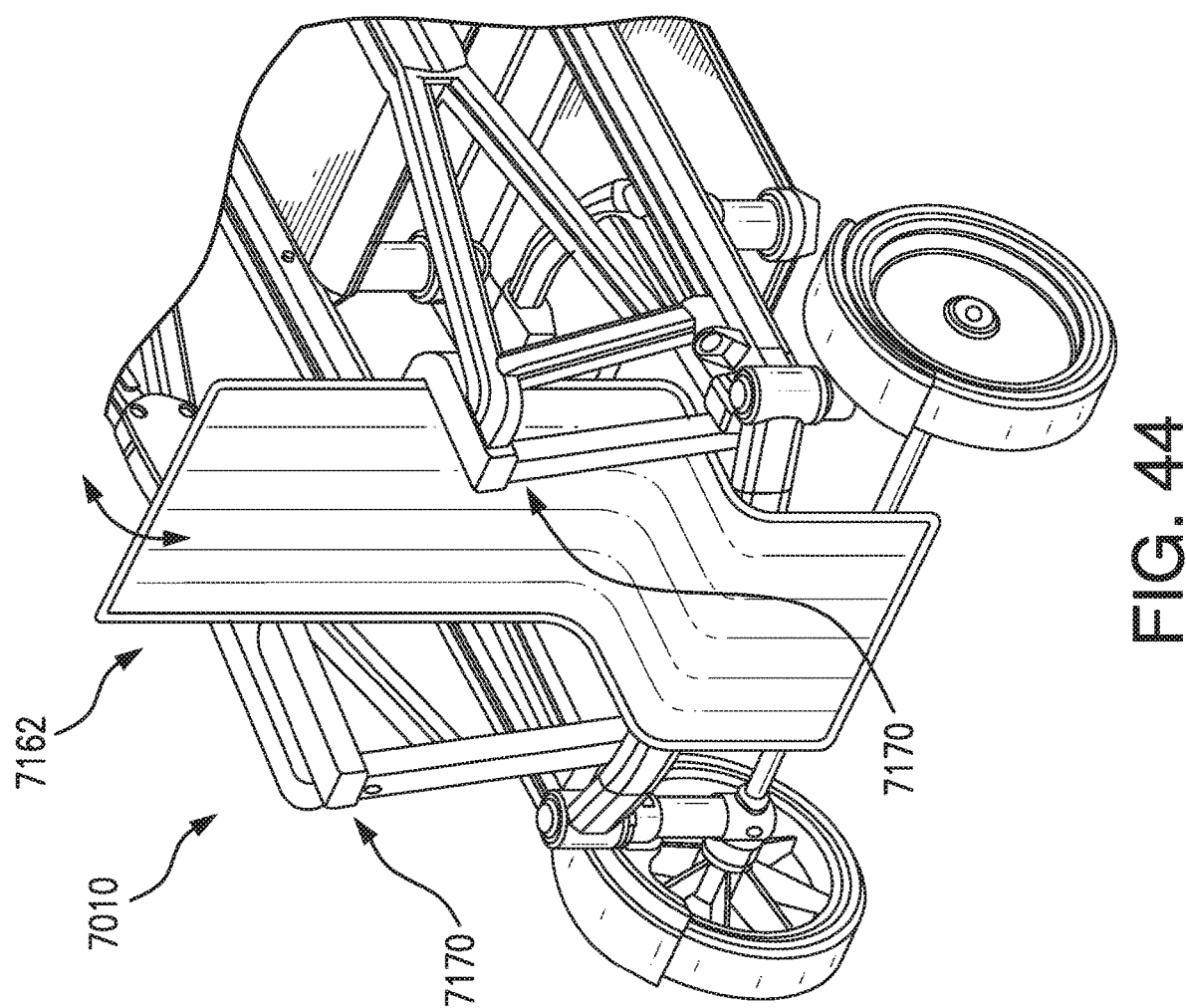
FIG. 44 is a perspective view of a portion of a wagon according to an eighth example embodiment, shown with its rear endwall folded down and with a stroller seat mounted in its place directly to the wagon without an interposed seat adapter.

FIG. 44 shows a wagon 7010 according to an eighth example embodiment in use with a child seat 7162, without a seat adapter. The wagon 7010 and child seat 7162 of this embodiment are substantially the same as those of the previous embodiment, with some exceptions primarily those noted. In particular, in this embodiment, the child seat 7162 is a stroller seat that mounts directly to the wagon 7010, without the need for a seat adapter. The child seat 7162 mounts directly to the wagon 7010, instead of indirectly to the wagon via a seat adapter, so the child seat functions as the structural element in place of the displaced endwall to maintain the structural integrity of the wagon 7010 (instead of a seat adapter doing so, as described above). Thus, the child seat 7162 and the wagon 7010 include at least one latch system for mutual attachment. For example, the child seat 7162 and the wagon 7010 can include an upper seat-to-wagon latch system 7170 (for attachment of the child seat to the adjacent walls of the wagon) having cooperating latch components of the same or a similar type as the adapter-to-wagon latch system 1170 of the embodiment of FIGS. 22-31. Additionally (or alternatively), the child seat 7162 and the wagon 7010 can include a lower seat-to-wagon latch system (for attachment of the child seat to the base of the wagon) having cooperating latch components of the same or a similar type as the seat-to-wagon latch system of the embodiment of FIGS. 32-34 or as the adapter-to-wagon connections of FIGS. 24-25 and 36-43. It will be understood by persons of ordinary skill in the art that other latch systems and positions thereof can be implemented to provide the functionality described herein. The stroller seat 7162 can be mounted in place facing outward (e.g., rearward) as depicted, which can enable positioning the seat as low as possible for stability (with the leg-rest extending below the wagon base), or in other embodiments it can be mounted facing inward (e.g., forward).

In some embodiments (such as those without the lower latch system, or with it but when it's not engaged), the child seat 7162 can pivot about a pivot point defined by the upper latch system 7120 to provide a recline feature (as indicated by the angular directional arrow). And in some such embodiments, there can additionally be provided stops and/or fixed-position elements for securing the child seat in multiple positions (e.g., upright and reclined).

Figure 45:
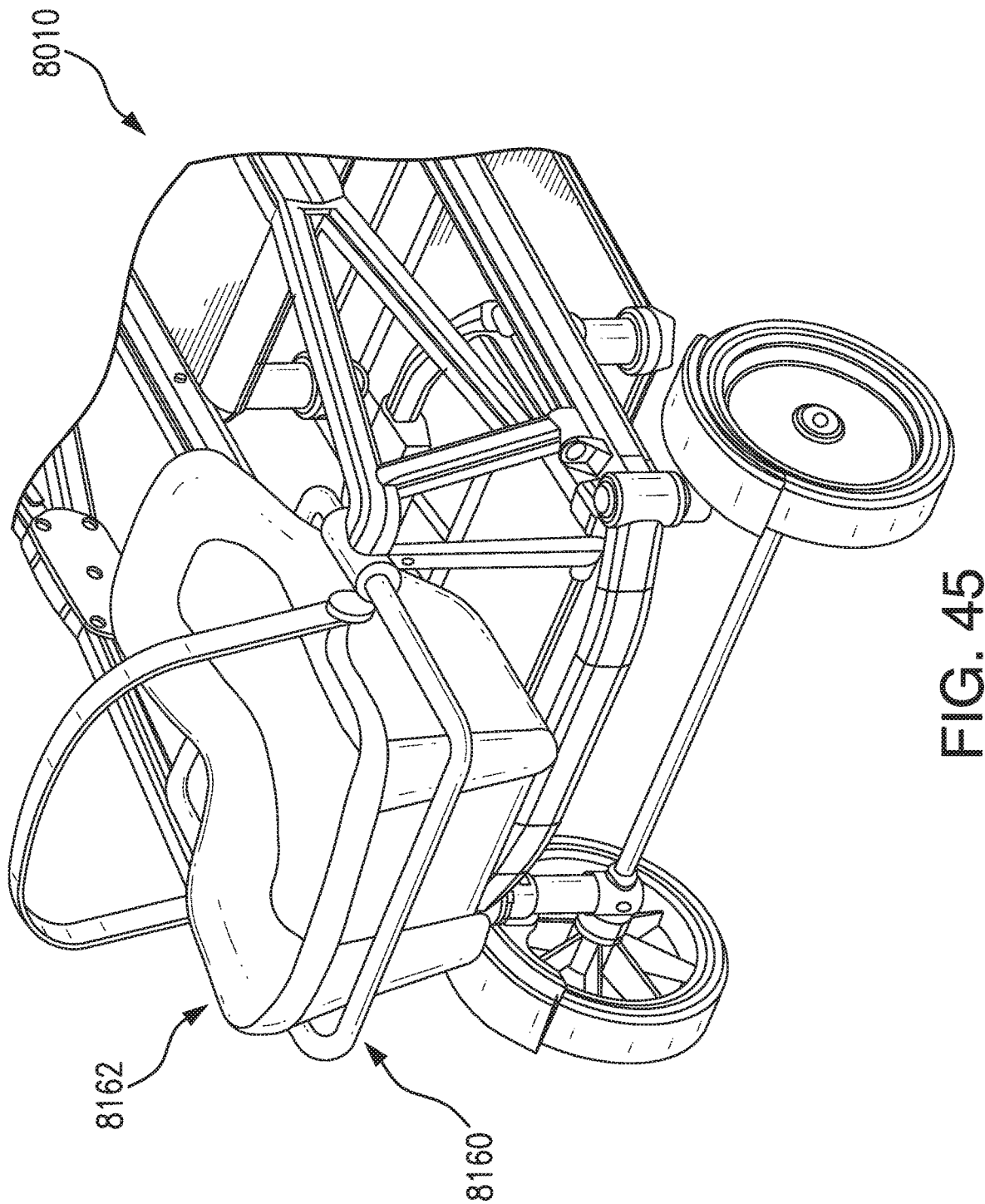
FIG. 45 is a perspective view of a portion of a wagon according to a ninth example embodiment, shown with its rear endwall folded down and with a seat adapter and an infant carrier seat mounted in its place.

FIG. 45 shows a wagon 8010 and a seat adapter 8160 according to a ninth example embodiment in use with a child seat 8162. The wagon 8010, seat adapter 8160, and child seat 8162 of this embodiment are substantially the same as those of the previous embodiments, with some exceptions primarily those noted. In particular, in this embodiment, the child seat 8162 is an infant carrier seat that attaches to a support base (not shown) of a car-seat system for carrying a child safely and securely in a motor vehicle. The child seat 8162 rests upon the seat adapter 8160, with peripheral seat portions supported by outer and inner spaced transverse members (e.g., the outer connecting member and the inner bumper forming a closed loop), and with the central seat portions extending downward through the space formed between the outer and inner members. Instead of a latch system holding the child seat 8162 in place, it can be snapped, strapped, tied, or otherwise secured by conventional fasteners to the seat adapter 8160 and/or the wagon 8010.

Figure 46:
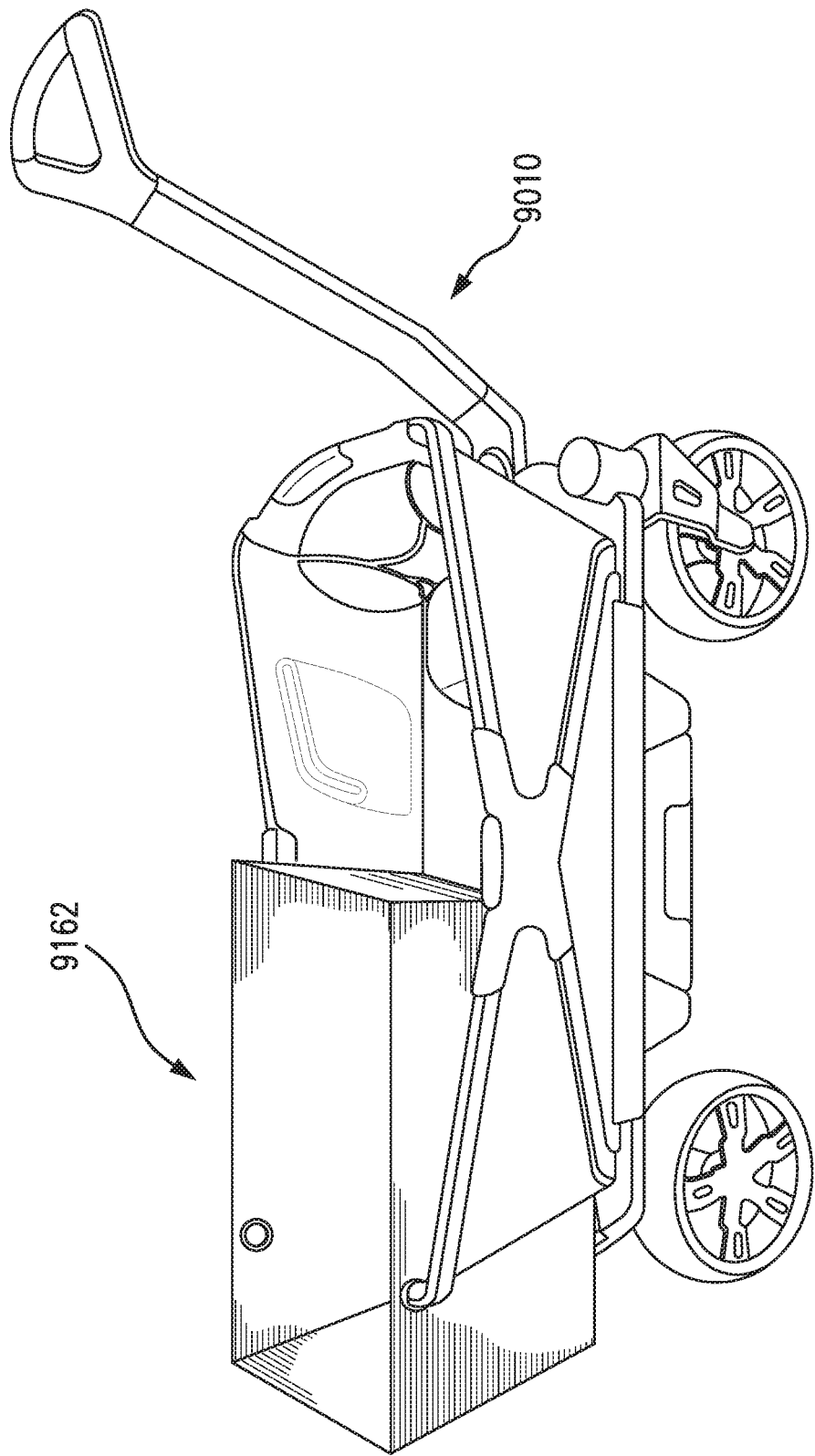
FIG. 46 is a perspective view of a portion of a wagon according to a tenth example embodiment, shown with its rear endwall folded down and with a storage container mounted in its place.
Figure 47:
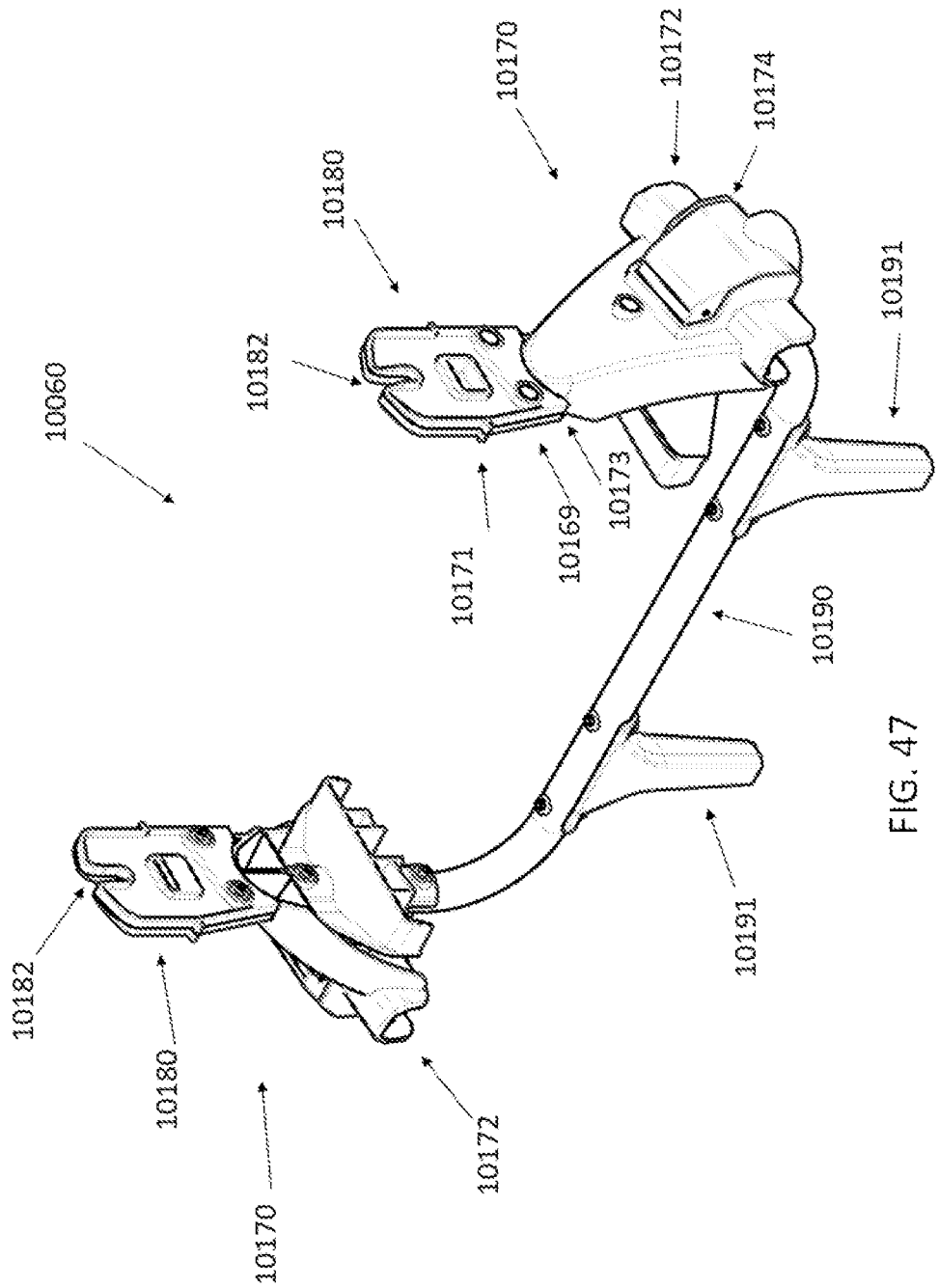
FIG. 47 is a perspective view of a seat adapter, according to an eleventh example embodiment, for mounting a child seat to a wagon.
Figure 48:
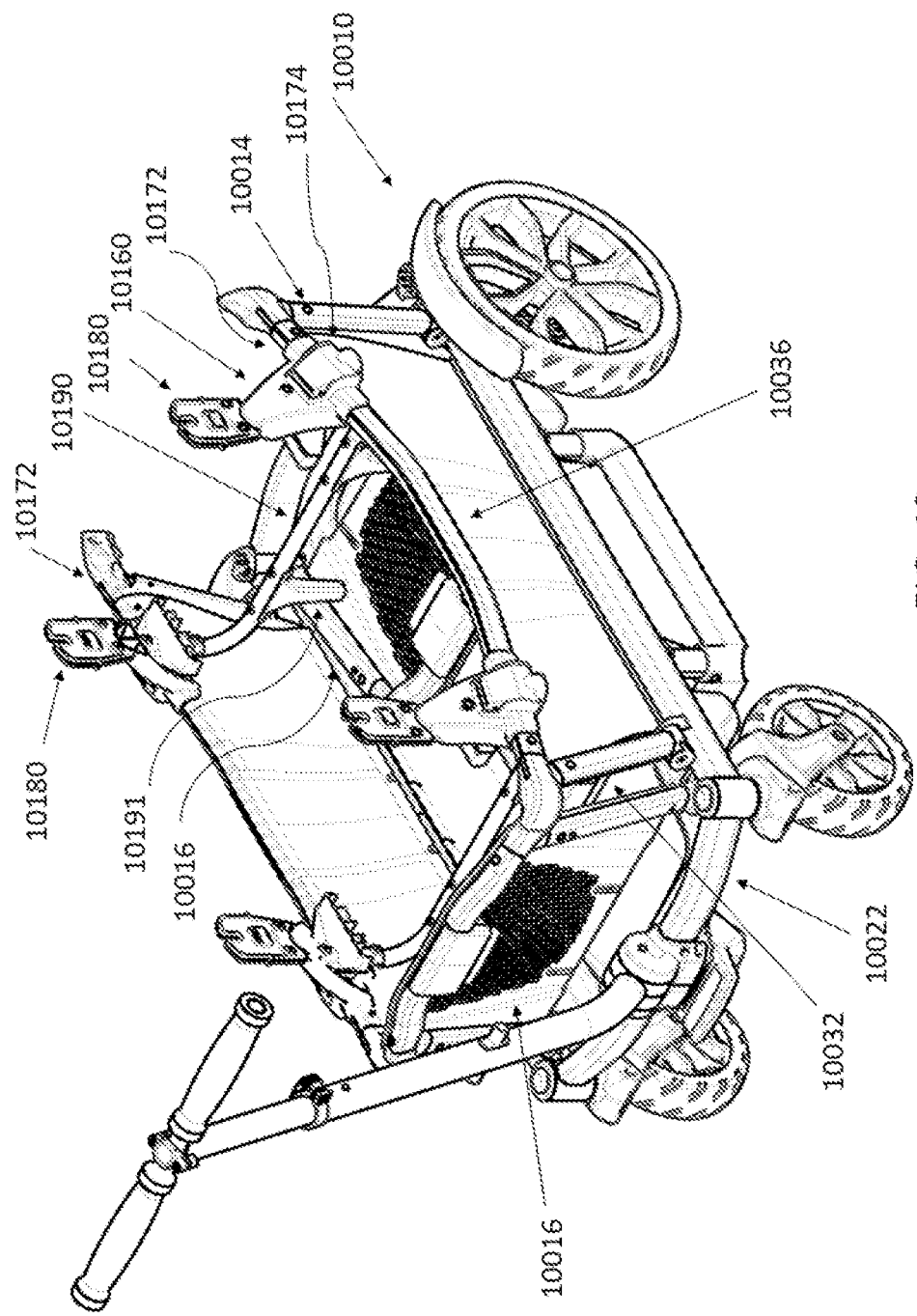
FIG. 48 is a perspective view of the seat adapter of FIG. 47, shown mounted to a wagon whose rear wall is displaced from its upright use position.
Figure 49:
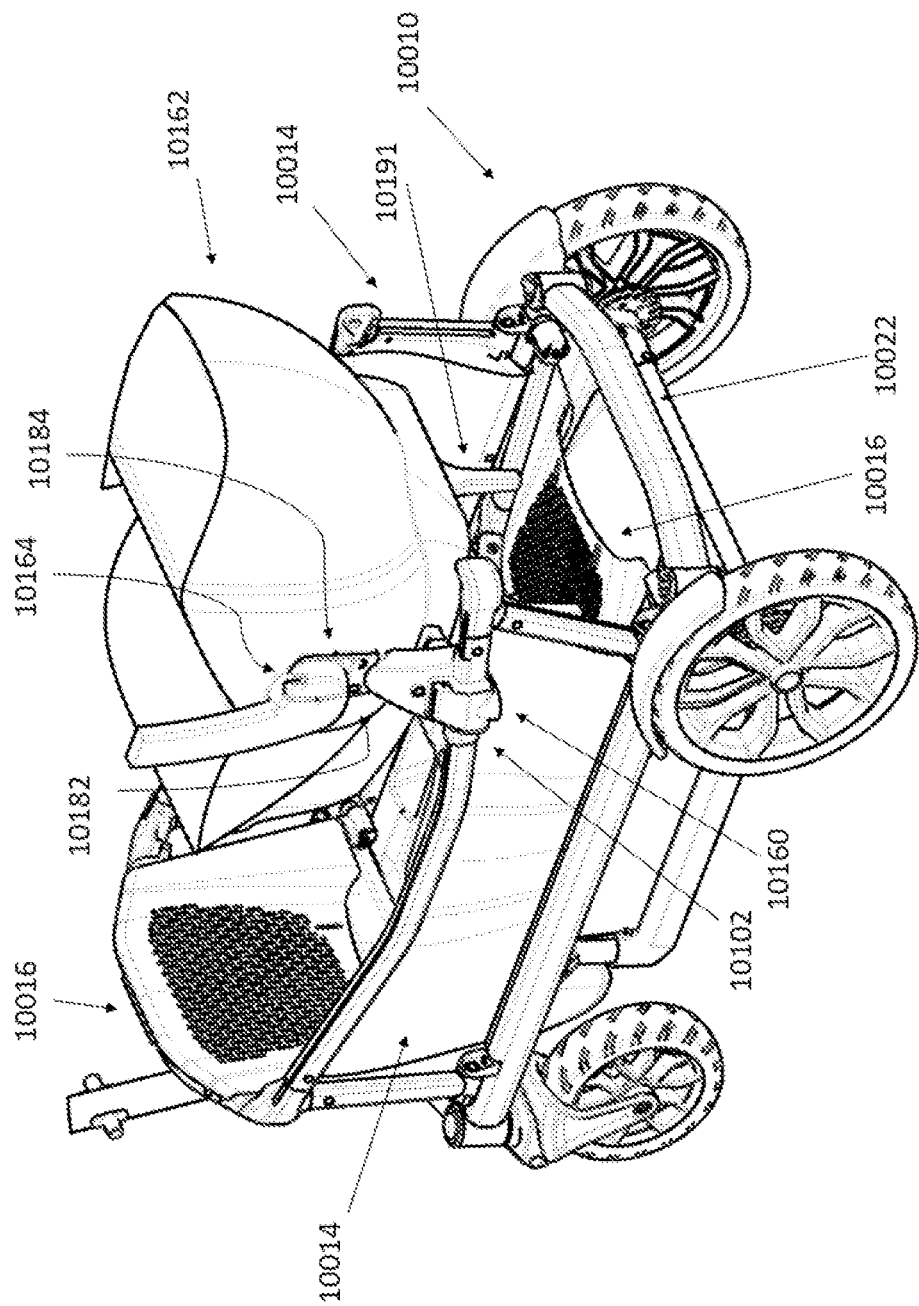
FIG. 49 is another perspective view of the seat adapter and wagon of FIG. 48, showing a child seat mounted to the wagon by the seat adapter.
Figure 50:
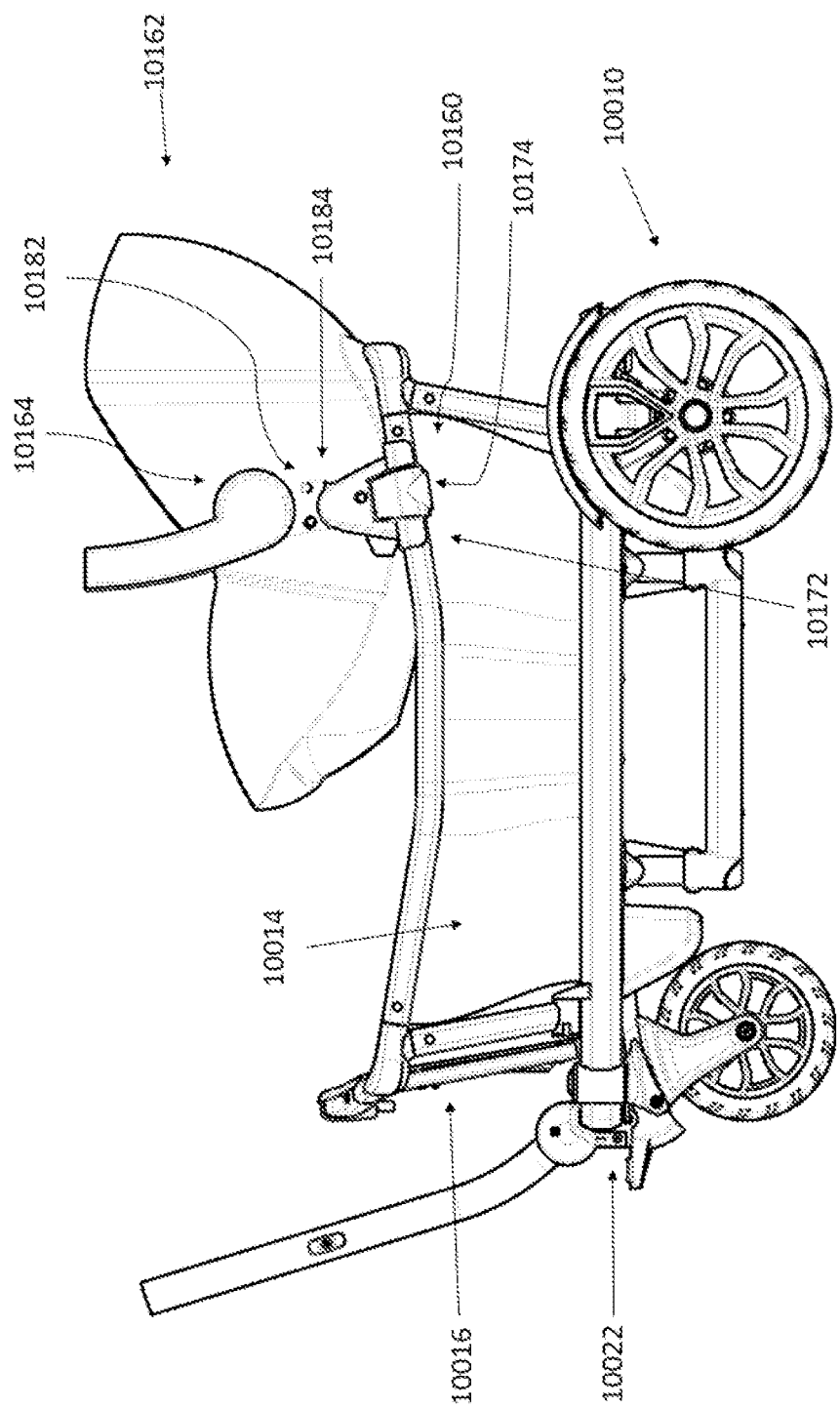
FIG. 50 is a side view of the seat adapter, wagon, and child seat of FIG. 49.

FIG. 46 shows a wagon 9010 according to a tenth example embodiment in use with a portable carrier 9162. The wagon 9010 and portable carrier 9162 of this embodiment are substantially the same as the wagon and child seat of the previous embodiments, with some exceptions primarily those noted. In particular, in this embodiment, the portable carrier is mounted to the wagon where the displaced wall was for increasing the effective storage capacity of the wagon (by providing storage space beyond where the disclosed wall was). So the portable carrier includes latch components that engage the wall latch components of the adjacent walls. And the portable carrier functions as the structural element in place of the displaced endwall to maintain the structural integrity of the wagon 9010 (instead of an adapter doing so, as described above). The portable carrier can be a basket, bin, box, or other container for holding cargo, and in some embodiments can even be used to carry a child. As used herein, the term "portable carrier" is intended to be broadly construed to include child seats such as those described herein.

FIGS. 47-50 show a seat adapter 10160, according to an eleventh example embodiment, for mounting a child seat 10162 to a wagon 10010. The seat adapter 10160, wagon 10010, and child seat 10162 of this embodiment are substantially the same as those of some of the previous embodiments, for example the second example embodiment, with some exceptions primarily those noted. As such, the wagon 10010 has a base 10022 and an upstanding wall arrangement, for example including two opposing upright walls (e.g., sidewalls 10014) and a displaceable (e.g., pivotal) upright wall (e.g., rear wall 10016) positioned between and connecting the opposing walls. And the child seat 10162 can be an infant carrier seat (ISC), a car seat, a stroller seat, a combination thereof, or another type seat for a child.

In particular, in this embodiment, the seat adapter 10160 includes an adapter/wagon latch system 10170 for mounting the seat adapter to the wagon 10010 at other than the displaceable wall 10016, for example to opposing walls of the wagon. As depicted, the adapter/wagon latch system 10170 includes two latch components 10172 that removably mount the seat adapter 10160 to the wagon's two opposing sidewalls 10014 in their upright/use position. In other embodiments, the seat adapter is designed to mount to opposing end walls (e.g., front and rear), with the interconnecting displaceable wall being a left or right sidewall.

The adapter/wagon latch components 10172 are manipulable (at least one part moves relative to another part) between locked and unlocked positions, with the latches secured to the wagon 10010 in the locked position (depicted) and released for detachment from the wagon in the unlocked position. One or more actuators 10174 are operable to manipulate the latch components 10172 between the locked and unlocked positions. In the depicted embodiment, the latch components 10172 are clamps of a conventional design that releasably engage the frame members 10032 (e.g., the upper frame members 10036) of the wagon sidewalls 10014. In other embodiments, the latch components are of another type such as linearly moving plungers, pivotal hooks, straps, or other conventional connectors, that mount to the depicted wall elements/portions or to other portions or types of wagon walls such as below the wall tops (e.g., on their inside or outside surfaces), solid/frameless plastic or metal walls, or otherwise. And in the depicted embodiment, the actuators 10174 include spring-biased cam-shaped clamp arms, with two actuators provided (one for each respective latch component 10172). In other embodiments, the actuators are of another type such as rotary, sliding, pushbutton, pull/trigger, or other conventional actuators that operate to manipulate the latch components 10172, with one gang-operated actuator or with respective actuators provided for the two latch components. In addition, the adapter of some embodiments includes two latch components that mount to the two opposing wagon walls and a cross-member extending between the adapter latch components that provides structural integrity to the wagon, such as when the rear wall is displaced from its upright use position.

In addition, the depicted seat adapter 10160 includes an adapter/seat latch system 10180 having two latch components 10182 that removably attach the seat adapter 10160 to the corresponding latch components 10164 of the child seat 10162 and that extend from or are attached to the two adapter/wagon latch components 10172. The adapter/seat latch components 10182 are manipulable between locked and unlocked positions, with the latches secured to the child seat 10162 in the locked position (depicted) and released for detachment from the child seat in the unlocked position. One or more actuators 10184 are operable to manipulate the latch components 10182 between the locked and unlocked positions. In the depicted embodiment, the child-seat latch components 10164 are of a conventional design determined by the child seat manufacturer, and the seat-adapter latch components 1182 are of a conventional design selected for mating with the child-seat latch components (and thus typically conform to the design of the mating latch of the product the child seat is designed to be mounted to and used with). In other embodiments, the latch components are reversed with the actuator on the child seat and the adapter/seat latch component being passive. Details of such child seat latch components (e.g., catch-pins) 10164, and designs of mating latch components (e.g., pivotal hooks) 10182 and their actuators (e.g., spring-biased pushbuttons) 10184, are well-known in the art and thus not repeated for brevity's sake.

Furthermore, the seat adapters 10160 can include features that provide for use with multiple different designs (e.g., type, manufacturer, or model) of child seats 10162. For example, the seat adapters 10160 can include latch interfaces (e.g., sets of two) 10171 that removably mount between the adapter/wagon latch components 10172 and the seat latch components 10164. Such latch interfaces 10171 each include (e.g., on one end) the adapter/seat latch component 10182, each having a different design selected for removably attaching to a different design of the seat latch component 10164 of the particular child seat 10162 to be used. And such latch interfaces 10171 each include (e.g., on the other end) a common coupling part 10169 that removably mounts to a cooperating coupling part 10173 of the adapter/wagon latch component 10172, such that the latch interfaces are universal in their ability to be interchangeably mounted to the seat adapter 10160. In this way, the seat adapter 10160 can be packaged and sold with a plurality of different latch interfaces 10171, each having a same/standard design of the coupling part 10169 and a different design of the adapter/seat latch component 10182 to enable use of the seat adapter with a number of different designs of child seats 10162.

Furthermore, the seat adapter 10160 includes a connecting or cross-member 10190 extending between the adapter/wagon latch components 10172. The cross-member 10190 extends transversely all the way across the wagon 10010 and is made of a structural load-bearing material (e.g., steel tube) and configured to function as a structural element. In this way, if the connecting wall 10016 is displaced from its upright use position, and thus no longer able to function as a structural member braced between the two adjacent upright walls 10014, the cross-member 10190 of the seat adapter 10160 substitutes for the displaced wall to provide structural integrity to the wagon 10010 (i.e., to maintain the structural shape and strength of the wagon) for safety during use.

In typical embodiments such as that depicted, the cross-member 10190 extends from a lower side of the adapter/wagon latch components 10172 downward into and across the wagon 10010 to provide clearance for the child seat 10162 to be mounted above it. In addition, the cross-member 10190 can have obstruction elements 10191 extending from it, for example the two depicted downward-extending arms, to sufficiently block off the area bounded by the cross-member, the wagon base 10022, and the wagon sidewalls 10014 in order to meet safety requirements. In particular, the depicted obstruction elements 10191 are configured for compliance with ASTM F833-15 (Standard Consumer Safety Performance Specification for Carriages and Strollers), Section 6.10, which essentially requires that the torso probe (3 inches×5.5 inches) shall not pass through an opening, and if it does, then an 8-inch ball shall also pass through the opening (intended to prevent children from sliding only part-way out and strangulating themselves). A sheet of material (e.g., fabric or plastic) can be mounted to or extend from the obstruction elements 10191, if desired. In some embodiments, this blocking functionality is provided at least in part by the cross-member having a larger vertical dimension (being taller/thicker), extending downward more into the wagon 10010 (closer to the base 10022), and/or having a non-linear shape (e.g., zigzagged), by another number or shaped of the obstruction elements 10191 being provided, or by a combination thereof.

As in previous embodiments, the seat adapter 10160 can be mounted to the wagon 10010 with a wall segment (e.g., 10016) displaced (e.g., folded down) from its upright use position, thereby enabling the child seat 10162 to be mounted (via the adapter) to the wagon in a low-profile and stable arrangement (with the child-seat bottom below the wagon sidewalls' tops) and/or with the child seat in an outboard arrangement (occupying at least some of the space vacated by the displaced wall and thus extending laterally at least partially out of the wagon, including the slightly outboard position depicted for this particular child seat) to minimize occupied space in the wagon. Thus, there is no mechanical interference between any part of the wagon 10010 (including the displaced wall 10016) and any part of the seat adapter 10160 or the child seat 10162 mounted to it. When using the seat adapter 10160 for some smaller child seats 10162 (e.g., for an infant instead of a toddler), however, the adapter can be mounted to the wagon 10010 and used with the child seat without displacing a wall (see FIG. 48). In such scenarios, two seat adapters 10160 can be mounted to the same wagon 10010 for carrying two child seats 10162.

Figure 51:
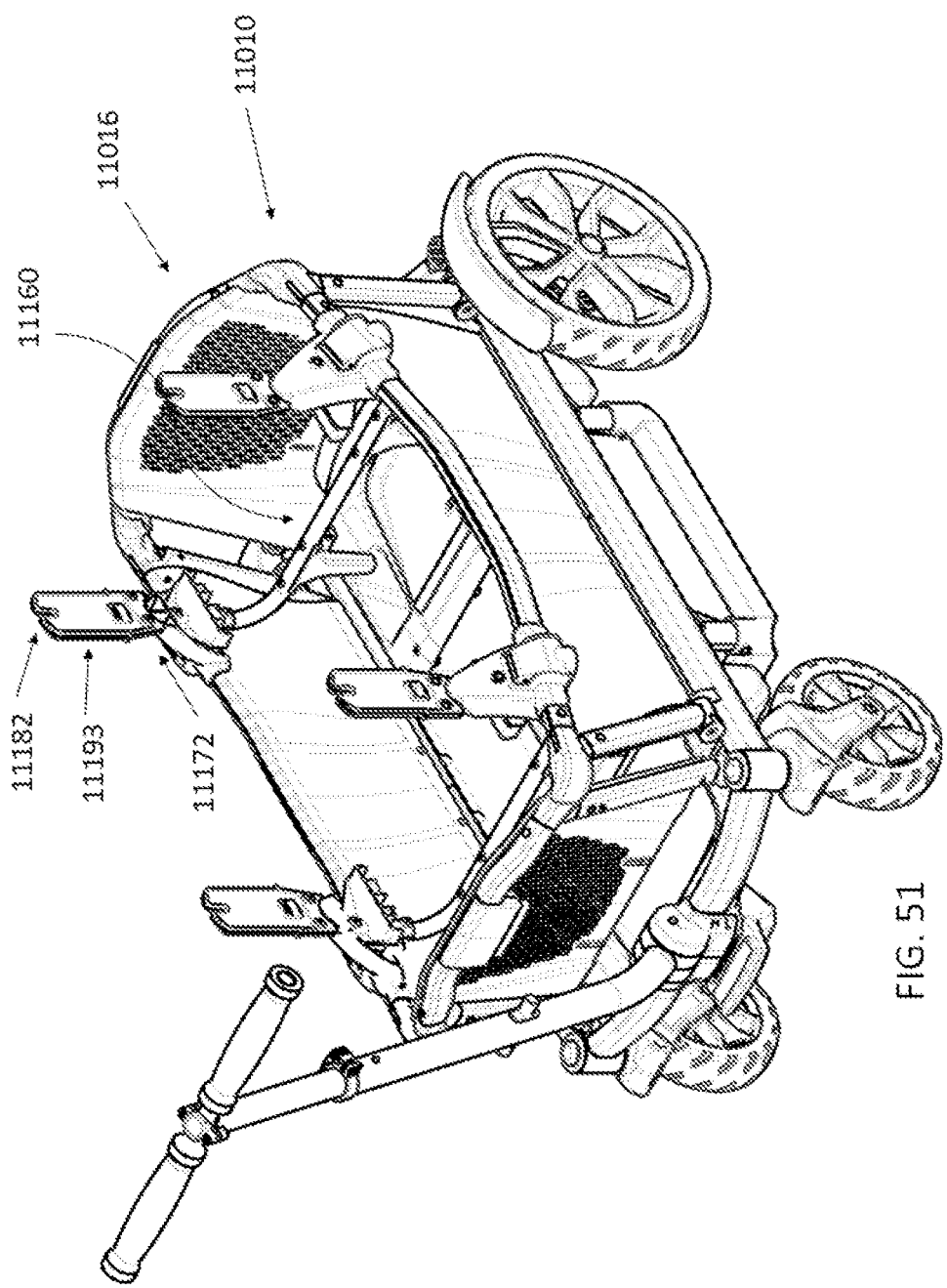
FIG. 51 is a perspective view of a seat adapter, according to a twelfth example embodiment, shown mounted to a wagon whose rear wall is in its upright use position.
Figure 52:
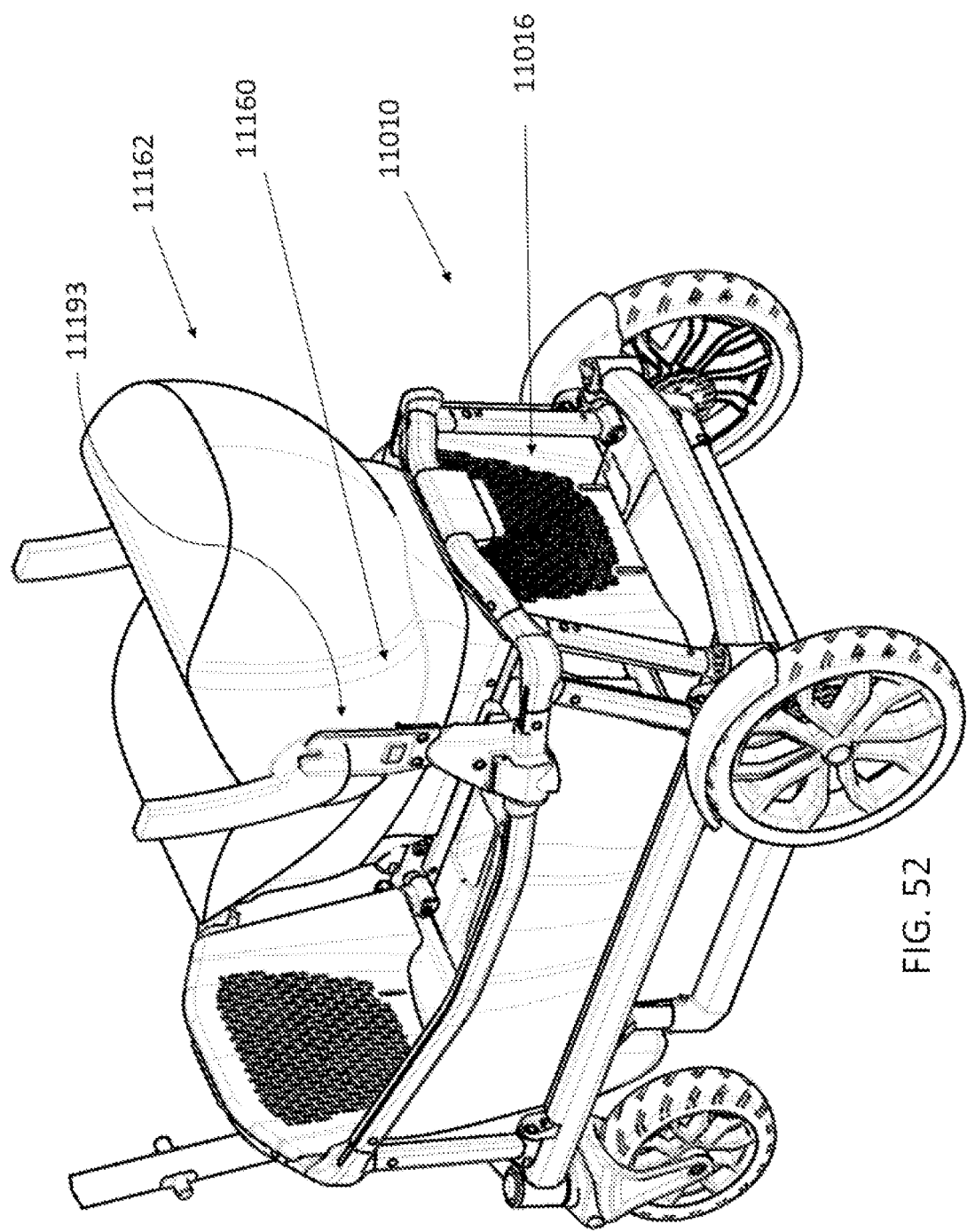
FIG. 52 is another perspective view of the seat adapter and wagon of FIG. 51, showing a child seat mounted to the wagon by the adapter.
Figure 53:
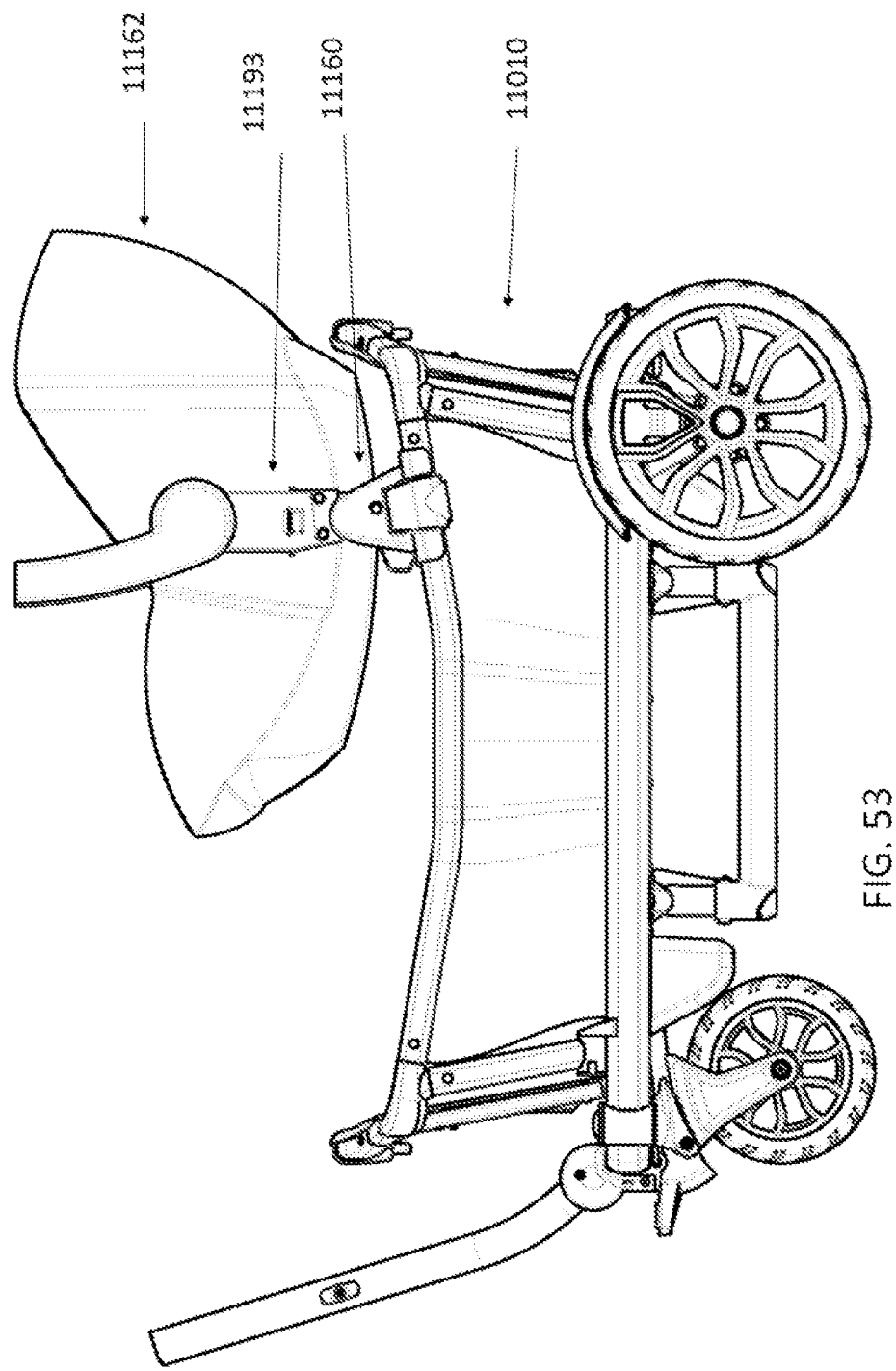
FIG. 53 is a side view of the seat adapter, wagon, and child seat of FIG. 52.

FIGS. 51-53 show a seat adapter 11160, according to a twelfth example embodiment, for mounting a child seat 11162 to a wagon 11010. The seat adapter 11160, wagon 11010, and child seat 11162 of this embodiment are substantially the same as in the eleventh embodiment, with some exceptions primarily those noted. In particular, in this embodiment, the seat adapter 11160 includes vertical extension members 11193 positioned and extending between each of the adapter/wagon latch components 11172 and the adapter/seat latch components 11182. The vertical extension members 11193 are configured with a length (i.e., vertical dimension between the latch components 11172 and 11182) selected to position the adapter/seat latch components, and thus the child seat 11162, in an elevated position. In particular, the length of the vertical extension members 11193 positions the child seat 11162 higher than the displaceable connecting wall 11016, such that this wall does not need to be displaced from its upright use position in order to mount the child seat 11162 to the wagon 11010, as depicted. Thus, there is no mechanical interference between any part of the wagon 11010 (including the upright wall 10016) and any part of the seat adapter 11160 or the child seat 11162 mounted to it. And the seat adapter 11160 can be mounted to the wagon 11010 in a relatively rearward position for mounting the child seat in an outboard position (including the slightly outboard position depicted for this particular child seat) or in a relatively forward position for mounting the child seat in an inboard position (completely forward of the rear wall). Of course, in such embodiments the seat adapter 11160 can be mounted to the wagon 11010 with the connecting wall 11016 upright or displaced, including use with wagons having all fixed walls (i.e., without a displaceable wall).

For any of the embodiments of the invention, with either direct or indirect (including a seat adapter) seat mounting, the wagon can have a base and a folding endwall, with the endwall doubling as the backrest of a built-in seat. In other embodiments, the wagon has no sidewall, only the folding endwall(s), and the child seat or seat adapter mounts only to the wagon base, without latching to any sidewall latches. And in yet other embodiments, the wagon sidewalls are fixed and only the endwalls fold down.

In other aspects, the invention relates to a wagon that is adapted for use with a seat adapter, a seat adapter that is adapted for use with a wagon, and a child seat that is adapted for use with a wagon and/or a seat adapter. The wagon, seat adapter, and child seat can be of the type of any of the embodiments disclosed herein.

And in other aspects, the invention relates to a method of seating a child in a wagon. The method includes the steps of displacing a wall of the wagon and then installing in its place a child seat mounted to the wagon either directly or indirectly using a seat adapter. The step of displacing the wall can include pivotally folding the wall down to a storage position against a base of the wagon in a generally horizontal orientation, detaching and removing the wall from the base, or otherwise moving the wall from its use position (where it helps form the wagon container) and out of the way vacating that space so that the child seat can be positioned in its place. The step of installing the child seat in place of the displaced wall can include mounting the seat adapter to the wagon, for example using the same wall latches that the displaced wall was latched to, and mounting the child seat to the seat adapter (or to the wagon, or to both the seat adapter and the wagon). And the step of installing the child seat in place of the displaced wall can include mounting the child seat directly to the wagon, without using any seat adapter. The wagon, seat adapter, and child seat used in the method can be of the type of any of the embodiments disclosed herein, variations thereof including conventional modifications known to persons of ordinary skill in the art, or other designs have equivalent structures for enabling the functionality disclosed herein.

It is to be understood that the various features described herein can be combined in various ways to form various embodiments not specifically detailed herein but still contemplated by the inventors. As such, this invention expressly includes each individual feature disclosed herein as well as every combination of those features.

Furthermore, it is to be understood that this invention is not limited to the specific devices, methods, conditions, and/or parameters of the example embodiments described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the claimed invention has been shown and described in example forms, it will be apparent to those skilled in the art that many modifications, additions, and deletions can be made therein without departing from the spirit and scope of the invention as defined by the following claims.

What is claimed is:

1. A seat adapter for mounting a child seat to a wagon, the seat adapter comprising:
    a first adapter-to-wagon component configured to removably couple to the wagon;
    a second adapter-to-wagon component configured to removably couple to the wagon;
    a cross-member extending between the first adapter-to-wagon component and the second adapter-to-wagon component;
    a first adapter-to-seat component configured to removably couple to the child seat for securing the child seat to the wagon; and
    a second adapter-to-seat component configured to removably couple to the child seat for securing the child seat to the wagon;
    wherein the first adapter-to-seat component is configured to removably couple to the first adaptor-to-wagon component such that the first adapter-to-seat component extends from the first adapter-to-wagon component.

2. The seat adapter of claim 1, wherein the first adapter-to-wagon component is configured to removably couple to a first sidewall of the wagon, and wherein the second adaptor-to-wagon component is configured to removably couple to a second sidewall of the wagon.

3. The seat adapter of claim 1, wherein the first adapter-to-wagon component includes a mating feature that releasably couples to a corresponding mating feature on the wagon.

4. The seat adapter of claim 1, wherein the first adapter-to-wagon component is a latch component configured to removably couple to a wall of the wagon.

5. The seat adapter of claim 1, wherein the first adapter-to-seat component extends above the wagon.

6. The seat adapter of claim 1, wherein the second adapter-to-seat component is configured to removably couple to the second adapter-to-wagon component such that the second adapter-to-seat component extends from the second adapter-to-wagon component and extends above the wagon.

7. The seat adapter of claim 1, wherein the first adapter-to-wagon component is configured to removably couple to an alternative first adapter-to-seat component to removably couple to a different child seat.

8. The seat adapter of claim 7, wherein the second adapter-to-wagon component is configured to removably couple to an alternative second adapter-to-seat component to removably couple to the different child seat.

9. The seat adapter of claim 1, further comprising:
a first actuator for actuating the first adapter-to-wagon component between a locked and an unlocked position relative to the wagon; and
a second actuator for actuating the second adapter-to-wagon component between a locked and an unlocked position relative to the wagon.

10. The seat adapter of claim 1, wherein the first adapter-to-wagon component is configured to repeatedly removably couple and decouple from the first adapter-to-seat component, wherein the second adapter-to-wagon component is configured to repeatedly removably couple and decouple from the second adapter-to-seat component.

11. The seat adapter of claim 1, further comprising:
a first rod member for supporting the child seat on the seat adapter; and a second rod member for supporting the child seat on the seat adapter.

12. The seat adapter of claim 1, wherein the first adapter-to-seat component is elevated above the first adapter-to-wagon component and the second adapter-to-seat component is elevated above the second adapter-to-wagon component.

13. The seat adapter of claim 12, further comprising:
a first vertical extension member coupled to the first adapter-to-seat component to elevate the first adapter-to-seat component above the first adapter-to-wagon component; and
a second vertical extension member coupled to the second adapter-to-seat component to elevate the second adapter-to-seat component above the second adapter-to-wagon component.

14. The seat adapter of claim 1, wherein the first adapter-to-seat component extends from the wagon.

15. A system comprising:
a wagon and a seat adapter for coupling a child seat to the wagon, the wagon further comprising:
a handle;
a frame; and
a pair of opposing side walls; and
a pair of opposing end walls;
the seat adapter further comprising:
a first adapter-to-wagon component configured to removably couple to a first wall of the opposing side walls, the first adaptor-to-wagon component having a first portion and a second portion, such that the first portion is displaceable relative to the second portion to facilitate the removeable coupling of the first adaptor-to-wagon component to the first wall, wherein the first portion and the second portion are each configured to engage with the first wall;
a second adapter-to-wagon component configured to removably couple to a second wall of the opposing side walls;
a first adapter-to-seat component configured to removably couple to the child seat for securing the child seat to the wagon; and
a second adapter-to-seat component configured to removably couple to the child seat for securing the child seat to the wagon.

16. The system of claim 15, wherein the seat adapter further comprises a strap for securing the child seat to the seat adapter.

17. The system of claim 16, wherein the strap further comprises a fastening feature.

18. The system of claim 17, wherein the fastening feature further comprises a snap mating feature.

19. The system of claim 15, wherein the seat adapter further comprises:
a first rod member; and
a second rod member, wherein the first rod member and second rod member are fixedly positioned relative to one another.

20. The system of claim 15, wherein the first adapter-to-seat component is elevated above the first adapter-to-wagon component and the second adapter-to-seat component is elevated above the second adapter-to-wagon component.

21. The system of claim 20, wherein the seat adapter further comprises a first vertical extension member for positioning the first adapter-to-seat component above the first adaptor-to-wagon component, wherein the seat adapter further comprises a second vertical extension member for positioning the second adapter-to-seat component above the second adaptor-to-wagon component.

22. A seat adapter for mounting a child seat to a wagon, the seat adapter comprising:
a first adapter-to-wagon component configured to removably couple to the wagon;
a second adapter-to-wagon component configured to removably couple to the wagon;
a cross-member extending between the first adapter-to-wagon component and the second adapter-to-wagon component;
a first adapter-to-seat component configured to removably couple to the child seat for securing the child seat to the wagon; and
a second adapter-to-seat component configured to removably couple to the child seat for securing the child seat to the wagon;
wherein the first adapter-to-wagon component is configured to repeatedly removably couple and decouple from the first adapter-to-seat component, wherein the second adapter-to-wagon component is configured to repeatedly removably couple and decouple from the second adapter-to-seat component.

23. The seat adapter of claim 22, wherein the first adapter-to-wagon component is configured to removably couple to a first sidewall of the wagon, and wherein the second adapter-to-wagon component is configured to removably couple to a second sidewall of the wagon.

24. The seat adapter of claim 22, wherein the first adapter-to-wagon component includes a mating feature that releasably couples to a corresponding mating feature on the wagon.

25. The seat adapter of claim 22, wherein the first adapter-to-wagon component is a latch component configured to removably couple to a wall of the wagon.

26. The seat adapter of claim 22, wherein the first adapter-to-wagon component is configured to removably couple to an alternative first adapter-to-seat component to removably couple to a different child seat.

27. The seat adapter of claim 26, wherein the second adapter-to-wagon component is configured to removably couple to an alternative second adapter-to-seat component to removably couple to the different child seat.

28. The seat adapter of claim 22, further comprising:
a first actuator for actuating the first adapter-to-wagon component between a locked and an unlocked position relative to the wagon; and
a second actuator for actuating the second adapter-to-wagon component between a locked and an unlocked position relative to the wagon.

29. The seat adapter of claim 22, further comprising:
a first rod member for supporting the child seat on the seat adapter; and
a second rod member for supporting the child seat on the seat adapter.

30. The seat adapter of claim 22, wherein the first adapter-to-seat component is elevated above the first adapter-to-wagon component and the second adapter-to-seat component is elevated above the second adapter-to-wagon component.

31. The seat adapter of claim 30, further comprising:
a first vertical extension member coupled to the first adapter-to-seat component to elevate the first adapter-to-seat component above the first adapter-to-wagon component; and
a second vertical extension member coupled to the second adapter-to-seat component to elevate the second adapter-to-seat component above the second adapter-to-wagon component.

* * * * *